(12) United States Patent
Ikeda et al.

(10) Patent No.: US 8,208,795 B2
(45) Date of Patent: Jun. 26, 2012

(54) PLAYBACK APPARATUS, PROGRAM, AND PLAYBACK METHOD

(75) Inventors: Wataru Ikeda, Osaka (JP); Tomoyuki Okada, Nara (JP); Yasushi Uesaka, Sanda (JP)

(73) Assignee: Panasonic Corporation, Osaka (JP)

( * ) Notice: Subject to any disclaimer, the term of this patent is extended or adjusted under 35 U.S.C. 154(b) by 571 days.

(21) Appl. No.: 12/436,690

(22) Filed: May 6, 2009

(65) Prior Publication Data

US 2009/0214180 A1   Aug. 27, 2009

Related U.S. Application Data

(62) Division of application No. 10/558,949, filed as application No. PCT/JP2004/008851 on Jun. 17, 2004, now Pat. No. 7,672,570.

(30) Foreign Application Priority Data

Jun. 18, 2003   (JP) .................................. 2003-173208

(51) Int. Cl.
    *G11B 27/00* (2006.01)
(52) U.S. Cl. ........................................................ 386/278
(58) Field of Classification Search ........................ None
    See application file for complete search history.

(56) References Cited

U.S. PATENT DOCUMENTS

| | | | |
|---|---|---|---|
| 5,745,643 A | 4/1998 | Mishina | |
| 5,805,762 A | 9/1998 | Boyce et al. | |
| 5,929,857 A | 7/1999 | Dinallo et al. | |
| 5,999,696 A | 12/1999 | Tsuga et al. | |
| 6,049,654 A | 4/2000 | Furuta et al. | |
| 6,377,747 B1 | 4/2002 | Murase et al. | |
| 7,672,570 B2 * | 3/2010 | Ikeda et al. | 386/234 |
| 2002/0059630 A1 | 5/2002 | Salo et al. | |
| 2003/0123351 A1 | 7/2003 | Sawabe et al. | |
| 2003/0169303 A1 | 9/2003 | Islam et al. | |
| 2004/0060063 A1 * | 3/2004 | Russ et al. | 725/46 |

FOREIGN PATENT DOCUMENTS

| | | |
|---|---|---|
| EP | 0 788 101 | 8/1997 |
| EP | 0 952 578 A2 | 10/1999 |
| EP | 0 973 166 A1 | 1/2000 |
| EP | 1 434 436 A1 | 6/2004 |
| EP | 1 608 165 A1 | 12/2005 |

(Continued)

OTHER PUBLICATIONS

The Supplementary European Search Report dated Aug. 27, 2009 for the corresponding EP Patent Application No. 04746329.4.

(Continued)

*Primary Examiner* — William C Vaughn, Jr.
*Assistant Examiner* — Daniel Tekle
(74) *Attorney, Agent, or Firm* — Panasonic Patent Center; Dhiren Odedra; Kerry Culpepper

(57) ABSTRACT

An Interactive Graphics Decoder 13 decodes a graphics stream, and overlays a Page including a plurality of Buttons on a moving picture. The Interactive Graphics Decoder 13 then executes a command corresponding to one of the plurality of Buttons on the Page, to thereby perform (1) a control of switching the Page to another Page and (2) a control of specifying a Button to be set in a selected state on the other Page. A judgment is made as to whether a button number of the specified Button is invalid. If the button number is invalid, an alternative value is written in a status register.

3 Claims, 59 Drawing Sheets

FOREIGN PATENT DOCUMENTS

| | | |
|---|---|---|
| EP | 0 898 279 A2 | 9/2009 |
| JP | 08-287616 | 1/1996 |
| JP | 9-270187 | 10/1997 |
| JP | 10-234016 | 9/1998 |
| JP | 10-271453 | 10/1998 |
| JP | 10-283155 | 10/1998 |
| JP | 11185389 | 7/1999 |
| JP | 11-225307 | 8/1999 |
| JP | 11-296997 | 10/1999 |
| JP | 2000-207874 | 7/2000 |
| JP | 2000-348442 | 12/2000 |
| JP | 2003-016764 | 1/2003 |
| JP | 2003-179859 | 6/2003 |
| JP | 2003-333503 | 11/2003 |
| KR | 1998-75486 | 11/1998 |
| KR | 10-0221423 | 9/1999 |
| KR | 2002-0066260 | 8/2002 |
| WO | WO 00/51610 | 8/2000 |

OTHER PUBLICATIONS

The extended European search reports of EP Application No. 08152149.4, dated Jun. 10, 2010 and EP Application No. 08152148.6, dated Jun. 10, 2010.

Supplementary European Search Report, corresponding application No. 04746320.3. dated Sep. 3, 2009.

"Digital Video Broadcasting (DVB); Subtitling systems; Final draft ETSI EN 300 743" ETSI Standards, LIS, Sophia Antipolis Cedex, France, vol. BC, No. V1.2.1, Jun. 1, 2002.

The Extended European Search Report dated Dec. 29, 2009 for the corresponding European Patent Application No. 09174937.4.

CD/DVD Player Operating Instructions DVP-NS530 DVP-NS730P, Japan, Sony Corporation, May 10, 2006 pp. 69-74 and its English version pp. 62-67.

* cited by examiner

FIG.8

STN_table

| number_of_video_stream_entries |
|---|
| number_of_audio_stream_entries |
| number_of_PG_textST_stream_entries |
| number_of_IG_stream_entries | video_stream { entry-attribute audio_stream {
- entry-attribute
- entry-attribute
- entry-attribute
- entry-attribute
- ⋮
- entry-attribute PG_TextST_stream {
- entry-attribute
- entry-attribute
- entry-attribute
- entry-attribute
- ⋮
- entry-attribute IG_stream {
- entry-attribute
- entry-attribute

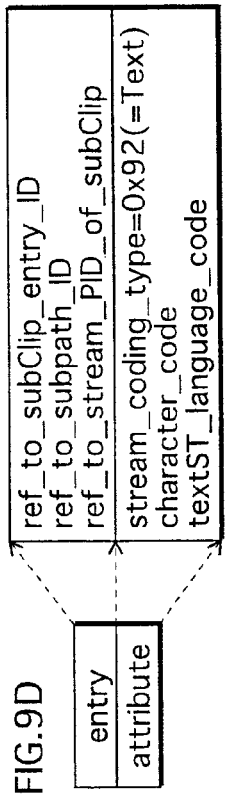
FIG.9D entry-attribute of text ST stream
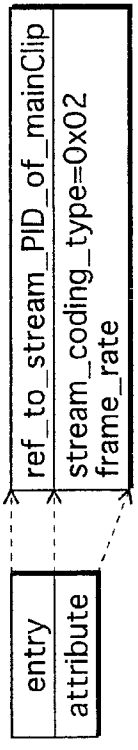
FIG.9A entry-attribute of video_stream
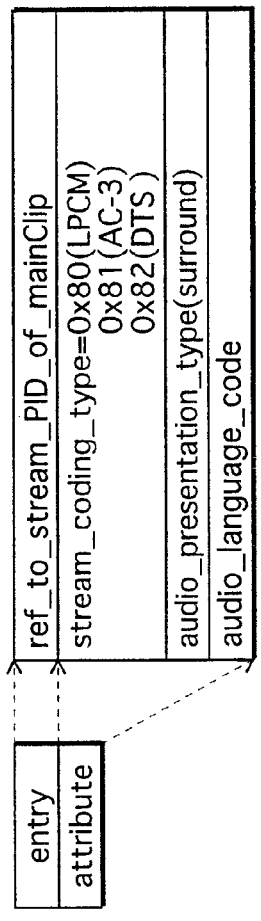
FIG.9B entry-attribute of audio_stream
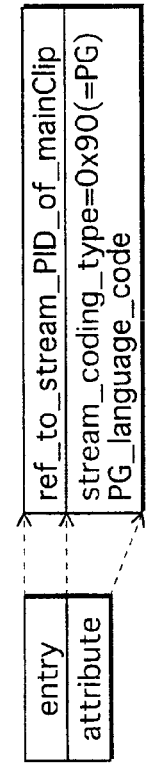
FIG.9C entry-attribute of PG stream
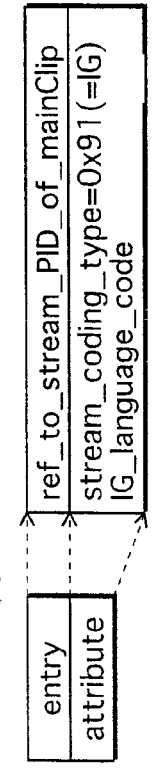
FIG.9E entry-attribute of IG_stream

FIG.14

| | |
|---|---|
| PSR 0 | Interactive Graphics |
| PSR 1 | Audio |
| PSR 2 | Presentation graphics and Text subtitle |
| PSR 3 | Angle |
| PSR 4 | Title |
| PSR 5 | Chapter |
| PSR 6 | PlayList |
| PSR 7 | PlayItem |
| PSR 8 | Presentation Time |
| PSR 9 | Timer |
| PSR 10 | Selected Button |
| PSR 11 | Menu Page |
| PSR 12 | Selected Style |
| PSR 13 | Parental |

PSR 4: 0 : Top Menu / 1 to 100 : Title number
PSR 5: 1 to 999 : Chapter number / 0xFFFF : Chapter number is invalid
PSR 6: 0 to 999 : PlayList id
PSR 7: 0 to 255 : PlayItem id
PSR 8: 0 to 0xFFFFFFFF : Presentation Time

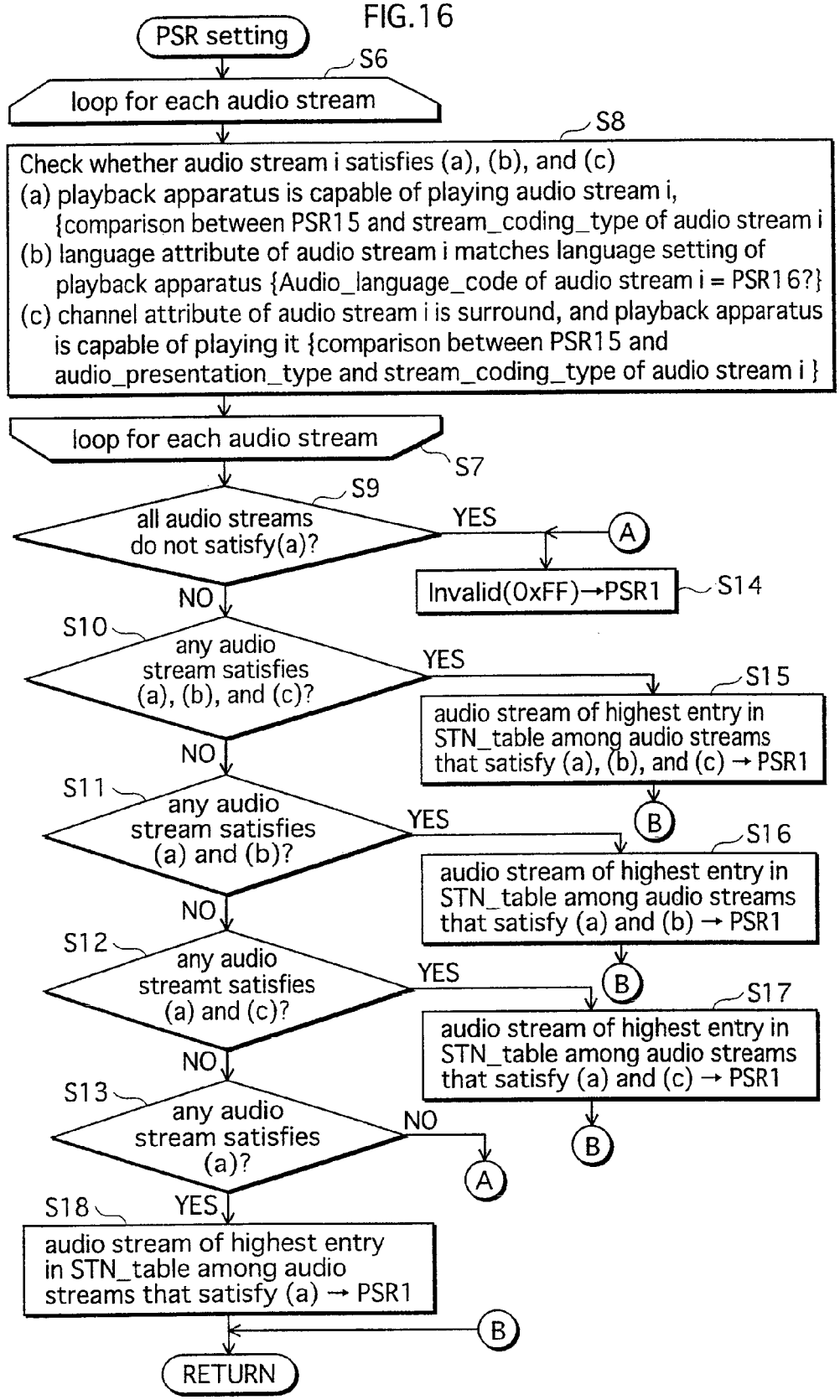

FIG.17

| channel attribute of Audio Stream | Presentation Capability of Player | |
|---|---|---|
| | stereo output | surround output |
| stereo | playable○ | playable○ |
| surround | playable after downmixing○ | playable○ ← the only combination that satisfies (c) |

FIG.20A

| Presentation Capability(PSR 15) = LPCM ○ AC-3 ○ DTS ✗ Language Setting (PSR 16) = Japanese Surround Capability(PSR 15) = capable |
|---|

FIG.20B

| | Codec | Channel | Language |
|---|---|---|---|
| Audio Stream 1 | AC-3 | 2ch | English |
| Audio Stream 2 | AC-3 | 5.1ch | English |
| Audio Stream 3 | DTS | 5.1ch | English |
| Audio Stream 4 | AC-3 | 2ch | Japanese |
| Audio Stream 5 | AC-3 | 5.1ch | Japanese |
| Audio Stream 6 | DTS | 5.1ch | Japanese |

FIG.20C

| | Codec | Channel | Language | Check Presentation capability(a) | Check language (b) | Check surround Capability(c) | Priority |
|---|---|---|---|---|---|---|---|
| Audio Stream 1 | AC-3 | 2ch | English | ○ | ✗ | ✗ | 4 |
| Audio Stream 2 | AC-3 | 5.1ch | English | ○ | ✗ | ○ | 3 |
| Audio Stream 3 | DTS | 5.1ch | English | ✗ | – | – | – |
| Audio Stream 4 | AC-3 | 2ch | Japanese | ○ | ○ | ✗ | 2 |
| Audio Stream 5 | AC-3 | 5.1ch | Japanese | ○ | ○ | ○ | 1 |
| Audio Stream 6 | DTS | 5.1ch | Japanese | ✗ | – | – | – |

FIG.21A

| Presentation Capability(PSR 15) = LPCM ○ AC-3 ○ DTS × |
| Language Setting (PSR 16) = Japanese |
| Surroud Capability(PSR 15) = incapable |

Author prefers original stereo playback to downmixed playback

FIG.21B

| | Codec | Channel | Language |
|---|---|---|---|
| Audio Stream 1 | AC-3 | 2ch | English |
| Audio Stream 2 | AC-3 | 5.1ch | English |
| Audio Stream 3 | DTS | 5.1ch | English |
| Audio Stream 4 | AC-3 | 2ch | Japanese |
| Audio Stream 5 | AC-3 | 5.1ch | Japanese |
| Audio Stream 6 | DTS | 5.1ch | Japanese |

FIG.21C

| | Codec | Channel | Language | Check Presentation capability(a) | Check language (b) | Check surround Capability(c) | Priority |
|---|---|---|---|---|---|---|---|
| Audio Stream 1 | AC-3 | 2ch | English | ○ | × | × | 2 |
| Audio Stream 2 | AC-3 | 5.1ch | English | ○ | × | × | 2 |
| Audio Stream 3 | DTS | 5.1ch | English | × | – | – | – |
| Audio Stream 4 | AC-3 | 2ch | Japanese | ○ | ○ | × | 1 |
| Audio Stream 5 | AC-3 | 5.1ch | Japanese | ○ | ○ | × | 1 |
| Audio Stream 6 | DTS | 5.1ch | Japanese | × | – | – | – |

Since there are two audio streams having same priority, Audio Stream 4 having higher entry in STN_Table is selected

FIG.22A

| Presentation Capability(PSR 15) = LPCM ○ AC-3 ○ DTS × |
| --- |
| Language Setting (PSR 16) = Japanese |
| Surround Capability(PSR 15) = incapable |

FIG.22B

| | Codec | Channel | Language |
| --- | --- | --- | --- |
| Audio Stream 2 | AC-3 | 5.1ch | English |
| Audio Stream 1 | AC-3 | 2ch | English |
| Audio Stream 3 | DTS | 5.1ch | English |
| Audio Stream 5 | AC-3 | 5.1ch | Japanese |
| Audio Stream 4 | AC-3 | 2ch | Japanese |
| Audio Stream 6 | DTS | 5.1ch | Japanese |

Author prefers downmixed playback to original stereo playback

FIG.22C

| | Codec | Channel | Language | Check Presentation capability(a) | Check language (b) | Check surround Capability(c) | Priority |
| --- | --- | --- | --- | --- | --- | --- | --- |
| Audio Stream 2 | AC-3 | 5.1ch | English | ○ | × | × | 2 |
| Audio Stream 1 | AC-3 | 2ch | English | ○ | × | × | 2 |
| Audio Stream 3 | DTS | 5.1ch | English | × | — | — | — |
| Audio Stream 5 | AC-3 | 5.1ch | Japanese | ○ | ○ | × | 1 |
| Audio Stream 4 | AC-3 | 2ch | Japanese | ○ | ○ | — | 1 |
| Audio Stream 6 | DTS | 5.1ch | Japanese | × | — | — | — |

Since there are two audio streams having same priority, Audio Stream 5 having higher entry in STN_Table is selected Status and Transition for PSR2 condition (A):
  playback apparatus
  is capable of playing
  PG_textST_Stream
  specified by PSR2

FIG.26A

| Presentation Capability(PSR 15) = PGstream ◯ TextSTStream ✕ Language Setting (PSR 16) = Japanese |
|---|

FIG.26B

| PG_TextST_stream1 | TextSTstream | English |
| PG_TextST_stream2 | PGstream | English |
| PG_TextST_stream3 | TextSTstream | Japanese |
| PG_TextST_stream4 | PGstream | Japanese |

FIG.26C

| | Coding_Type | Language | Check Presentation capability(a) | Check language (b) | Priority |
|---|---|---|---|---|---|
| PG_TextST_stream1 | TextSTstream | English | ✕ | — | — |
| PG_TextST_stream2 | PGstream | English | ◯ | ✕ | 2 |
| PG_TextST_stream3 | TextSTstream | Japanese | ✕ | — | — |
| PG_TextST_stream4 | PGstream | Japanese | ◯ | ◯ | 1 |

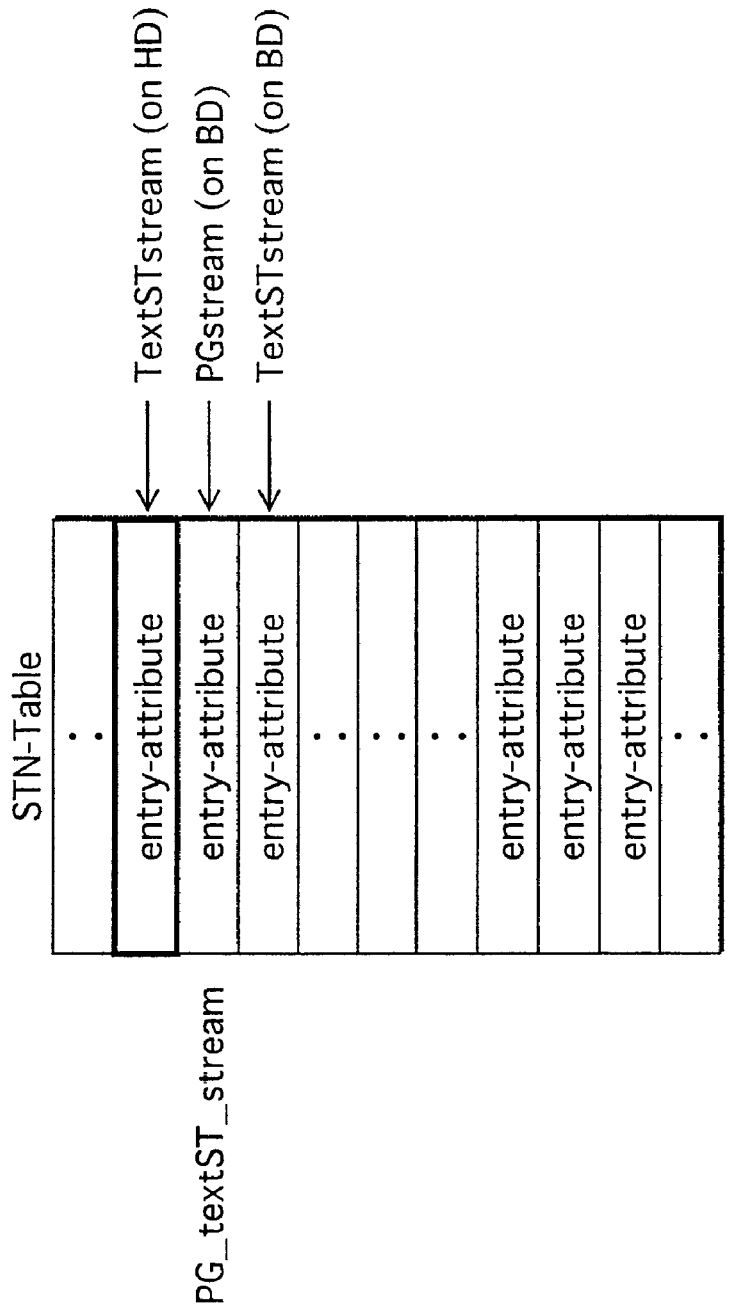

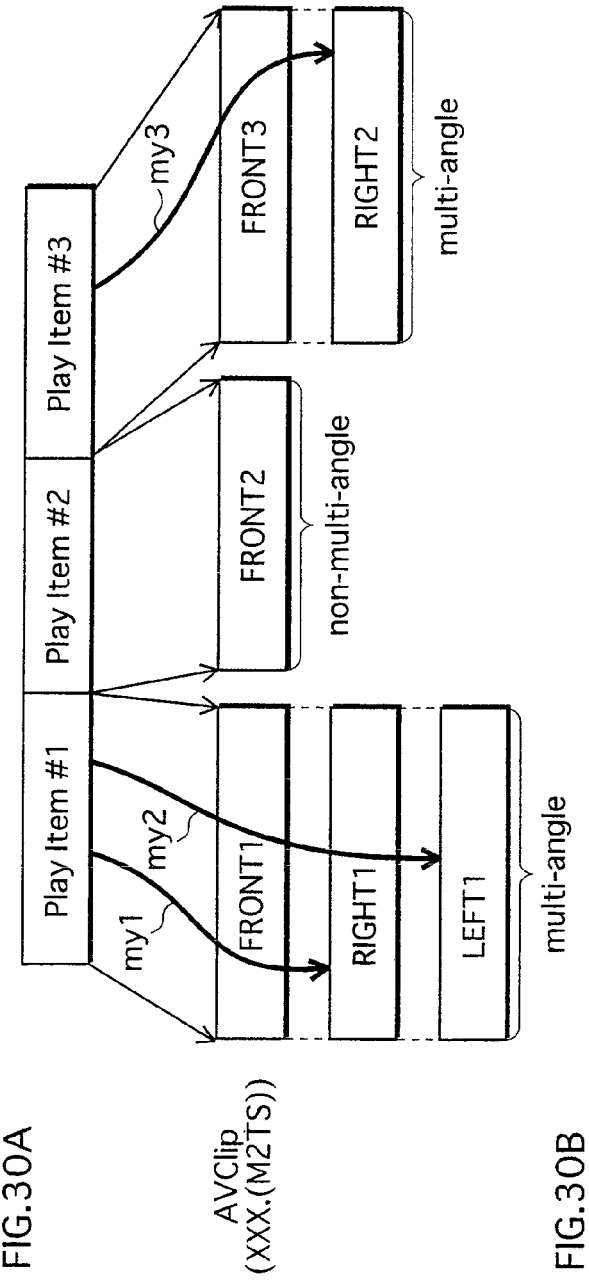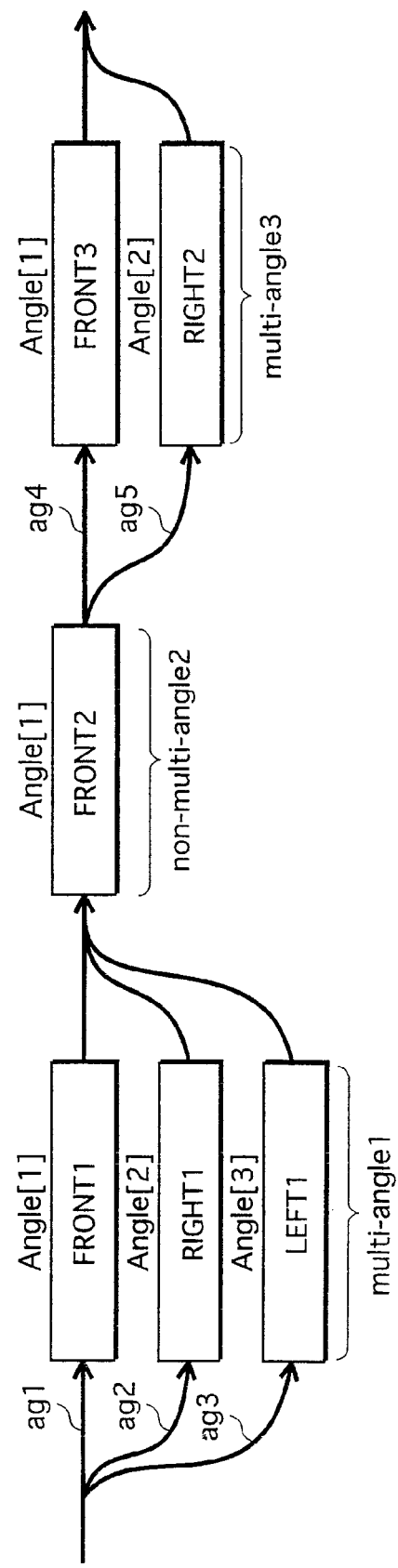
FIG.30A
FIG.30B

FIG.31

| | | |
|---|---|---|
| PSR 0 | Interactive Graphics | |
| PSR 1 | Audio | |
| PSR 2 | Presentation graphics and Text subtitle | |
| PSR 3 | Angle | 1 to 9 : Angle number |
| PSR 4 | Title | |
| PSR 5 | Chapter | |
| PSR 6 | PlayList | |
| PSR 7 | PlayItem | |
| PSR 8 | Presentation Time | |
| PSR 9 | Timer | |
| PSR 10 | Selected Button | |
| PSR 11 | Menu Page | |
| PSR 12 | Selected Style | |
| PSR 13 | Parental | |

FIG.32A  Status and Transition for PSR3
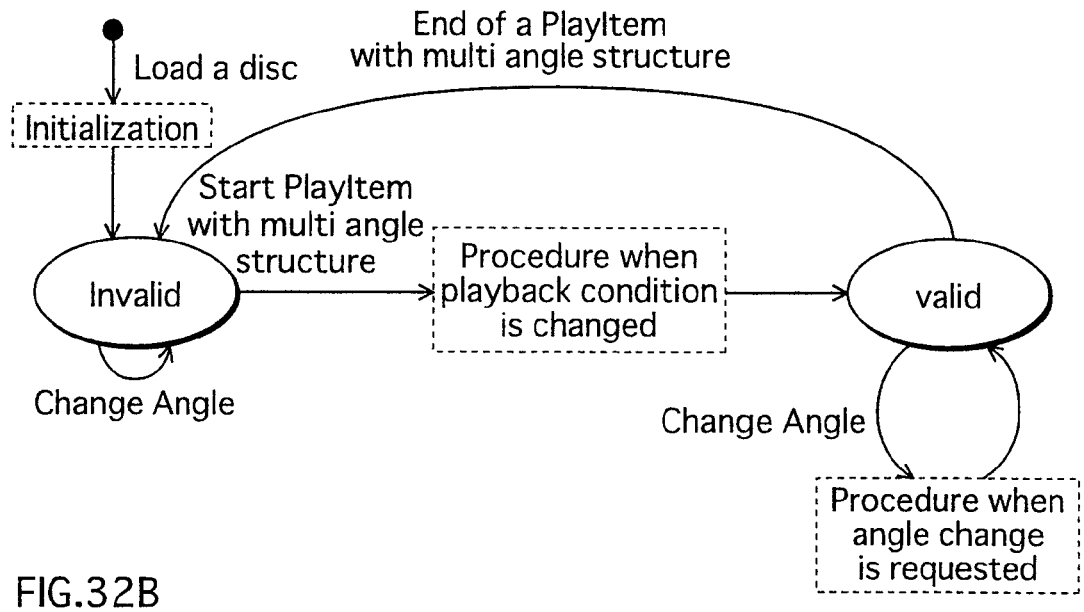
FIG.32B
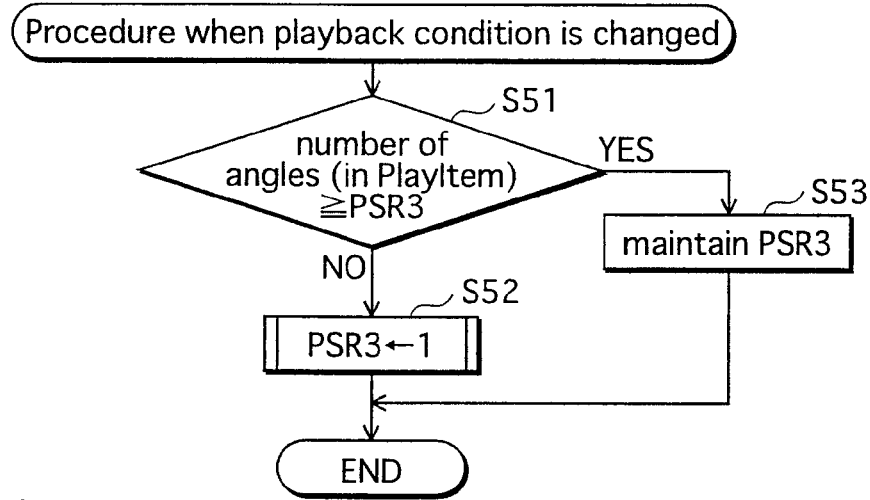
FIG.32C
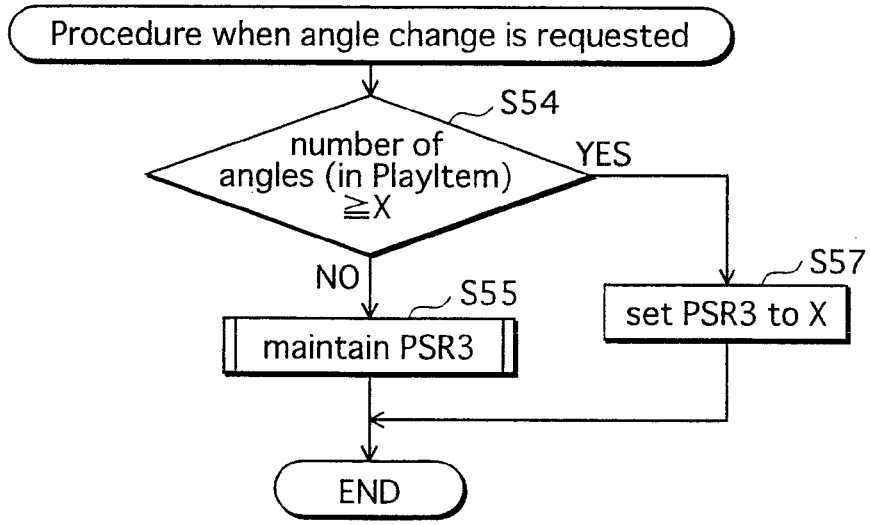

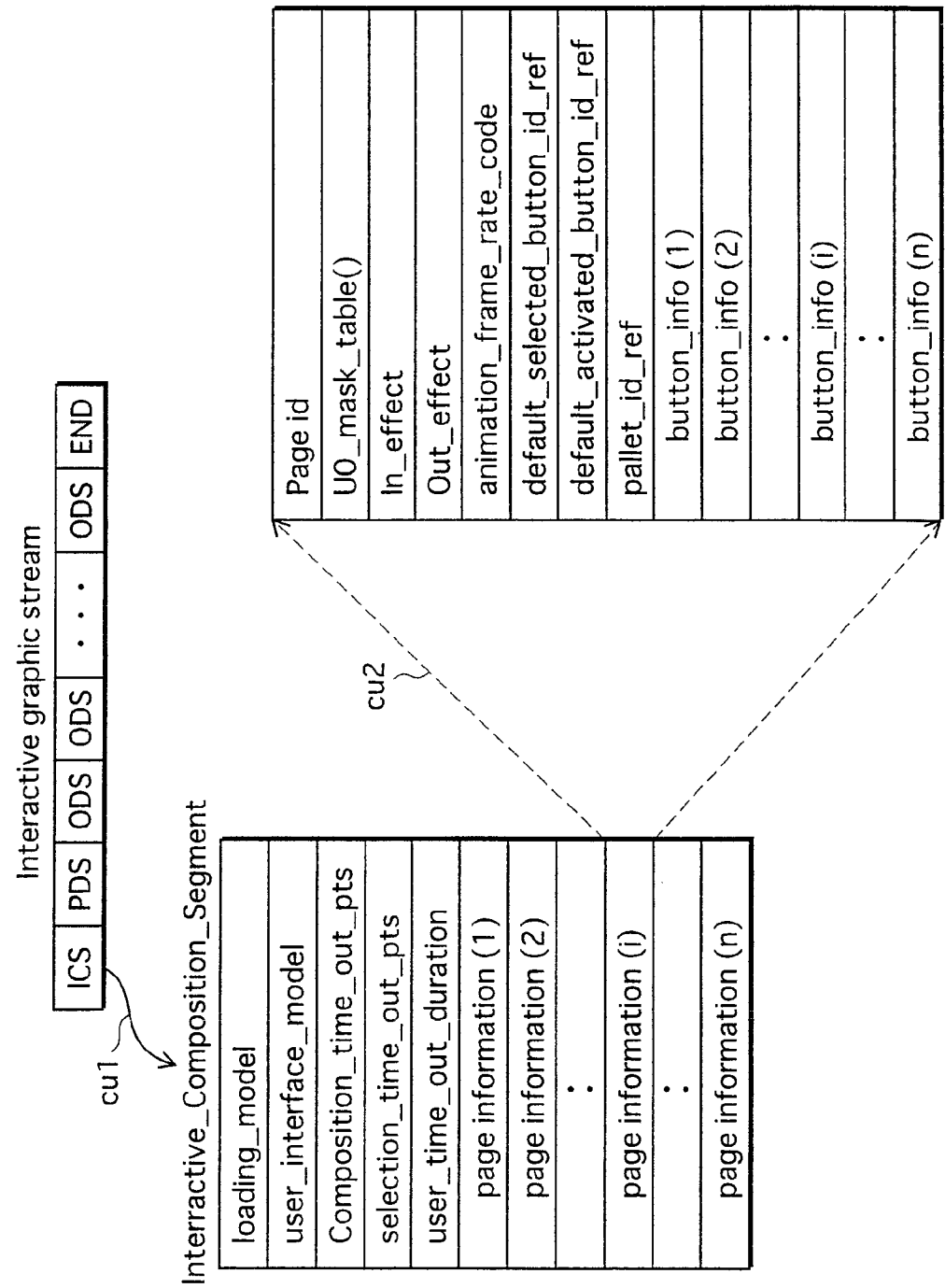

FIG.41

| PSR 0 | Interactive Graphics | 1 to 32 : Interactive Graphics Stream number |
| PSR 1 | Audio | |
| PSR 2 | Presentation graphics and Text subtitle | |
| PSR 3 | Angle | |
| PSR 4 | Title | |
| PSR 5 | Chapter | |
| PSR 6 | PlayList | |
| PSR 7 | PlayItem | |
| PSR 8 | Presentation Time | |
| PSR 9 | Timer | |
| PSR 10 | Selected Button | 0x0000 to 0x0FEF : Selected Button id<br>0xFFFF : Button id is invalid |
| PSR 11 | Menu Page | 0x00 to 0xFE : Page id |
| PSR 12 | Selected Style | |
| PSR 13 | Parental | |

PLAYBACK APPARATUS, PROGRAM, AND PLAYBACK METHOD

RELATED APPLICATIONS

The present application is a divisional application of U.S. Ser. No. 10/558,949 filed on Sep. 6, 2006 now U.S. Pat. No. 7,672,570, which is a 371 application of PCT/JP04/08851 filed Jun. 17, 2004.

TECHNICAL FIELD

The present invention relates to a playback apparatus for playing back a recording medium such as a BD-ROM, and in particular relates to improvements in a status setting function in the playback apparatus.

BACKGROUND ART

Status setting is performed by setting a predetermined value in a status register equipped in a playback apparatus. There are three methods for setting a value in a status register, namely, a method of setting according to static information recorded on a recording medium, a method of setting dynamically according to a command recorded on the recording medium, and a method of setting according to a predetermined procedure by a program preinstalled in the playback apparatus.

The setting method that uses the preinstalled program does not involve the author, and therefore there is no freedom to change the value of the status register in accordance with the contents of video recorded on the recording medium. Thus, this method cannot reflect ideas of the author.

The static setting method enables a value corresponding to the contents of video subjected to playback, to be set in the status register. However, once the static information has been written on the recording medium, the status register is set according to this static information irrespective of which condition the playback apparatus is in. Thus, this method lacks flexibility to change the value of the status register according to the operation of the playback apparatus.

The setting method according to a command string recorded on the recording medium enables an appropriate value to be set in the status register depending on variable factors such as what operations the user has made so far and which path the playback has taken to play back a digital stream. This allows the author to reflect its ideas. According to this method, however, the author needs to perform a programming debug test to ensure normal setting operations, which increases the burden on the author.

The need for a debug test causes a heavy burden on authors that produce movies with limited capital, though this may not be the case with large production companies. Such a burden could adversely affect content production that is the core business of the author.

DISCLOSURE OF INVENTION

The present invention aims to provide a playback apparatus that alleviates the burden on the author in status register setting.

The stated aim can be achieved by a playback apparatus including: a decoding unit operable to decode a graphics stream, and overlay a page including a plurality of graphics button members on a moving picture obtained by decoding a video stream; an execution unit operable to, when a selection of one of the plurality of button members is confirmed, execute a command corresponding to the button member, to thereby perform a first control of switching the page to another page and a second control of specifying a button member to be focused in the other page; a status register operable to hold a button number of the specified button member; a judgment unit operable to judge whether the button number in the status register is invalid; and a setting unit operable to, if the button number in the status register is judged as being invalid, set the status register to an alternative button number.

If the value of the status register is invalid, the playback apparatus sets the status register to an alternative value. Thus, recovery in the case where the status register holds an invalid value can be relied on the playback apparatus. Also, an operation of making the status register invalid can be relied on the playback apparatus.

Since part of procedures to be written in commands can be relied on the playback apparatus, the amount of coding for dynamic status setting is reduced, with it being possible to alleviate the burden on the author.

BRIEF DESCRIPTION OF DRAWINGS

FIG. 8 shows a structure of an STN_table.

FIG. 9A shows an entry-attribute combination corresponding to a video stream.

FIG. 9B shows an entry-attribute combination corresponding to an audio stream.

FIG. 9C shows an entry-attribute combination corresponding to a PG stream.

FIG. 9D shows an entry-attribute combination corresponding to textST stream.

FIG. 9E shows an entry-attribute combination corresponding to an IG stream.

FIG. 14 shows detailed settings of PSR4 to PSR8.

FIG. 16 is a flowchart of a detailed procedure of step S5.

FIG. 17 shows combinations of playback capabilities and stream attributes in a tabular form.

FIGS. 20A to 20C show a first specific example of audio stream selection according to "Procedure when playback condition is changed".

FIGS. 21A to 21C show a second specific example of audio stream selection according to "Procedure when playback condition is changed".

FIGS. 22A to 22C show a third specific example of audio stream selection according to "Procedure when playback condition is changed".

FIGS. 26A to 26C show a specific example of PG_textST_stream selection according to "Procedure when playback condition is changed".

FIG. 27 shows PG_textST_stream selection based on an order of entries in an STN_table.

FIGS. 30A and 30B show multi-angle and non-multi-angle blocks.

FIG. 31 shows detailed settings of PSR3.

FIG. 32A shows status transitions that can be made by PSR3.

FIG. 32B is a flowchart of "Procedure when playback condition is changed" for PSR3.

FIG. 32C is a flowchart of "Procedure when change is requested" for PSR3.

FIG. 34 shows an IG stream and an ICS in the IG stream.

FIG. 41 shows detailed settings of PSR0, PSR10, and PSR11.

BEST MODE FOR CARRYING OUT THE INVENTION

First Embodiment

Figure 1A:
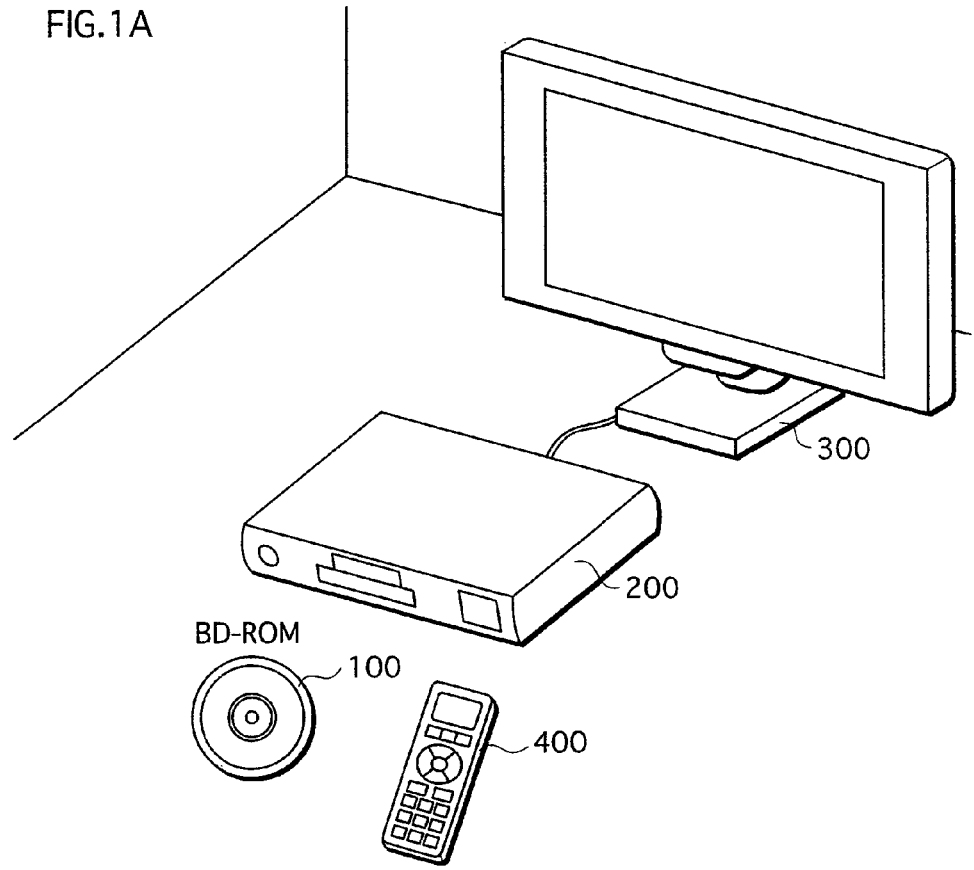
FIG. 1A shows an example of use of a playback apparatus to which the present invention relates.

The following describes embodiments of a playback apparatus to which the present invention relates. First, an example of an act of using the playback apparatus according to the present invention is explained. FIG. 1 shows an example of use of the playback apparatus according to the present invention. In the drawing, the playback apparatus according to the present invention is a playback apparatus 200, which constitutes a home theater system together with a television 300 and a remote control 400.

A BD-ROM 100 is used for providing a movie film in the home theater system that is constituted by the playback apparatus 200, the television 300, and the remote control 400.

Figure 1B:
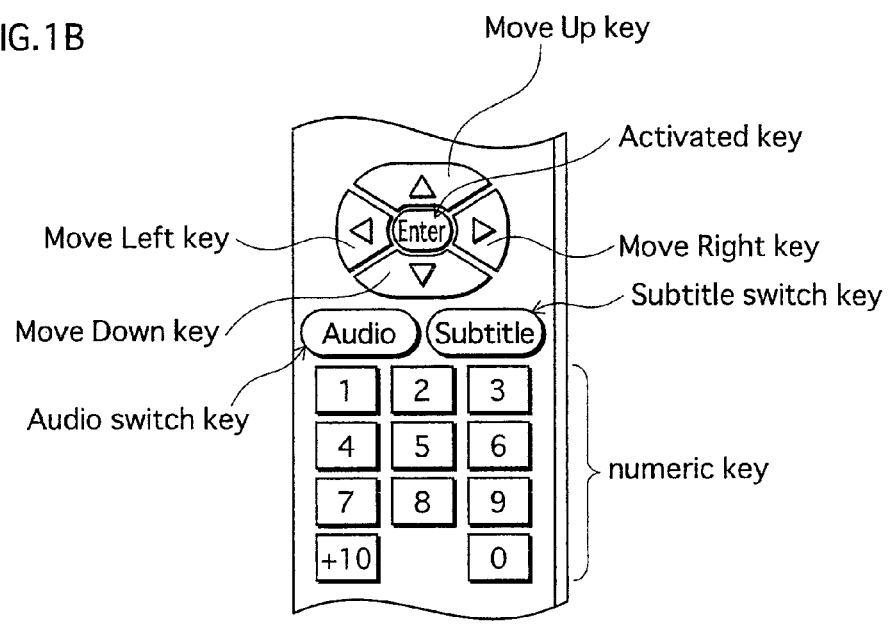
FIG. 1B shows keys on a remote control 400 for receiving a user operation on an Interactive Display.

The remote control 400 receives a user operation directed to the playback apparatus 200. FIG. 1B shows keys on the remote control 400 for receiving a user operation on an Interactive Display. As illustrated, the remote control 400 has a Move Up key, a Move Down key, a Move Right key, a Move Left key, an audio switch key for receiving an audio switching operation, a subtitle switch key for receiving a subtitle switching operation, and numeric keys "0" to "9".

This concludes the description of the act of using the playback apparatus according to the present invention.

Figure 2:
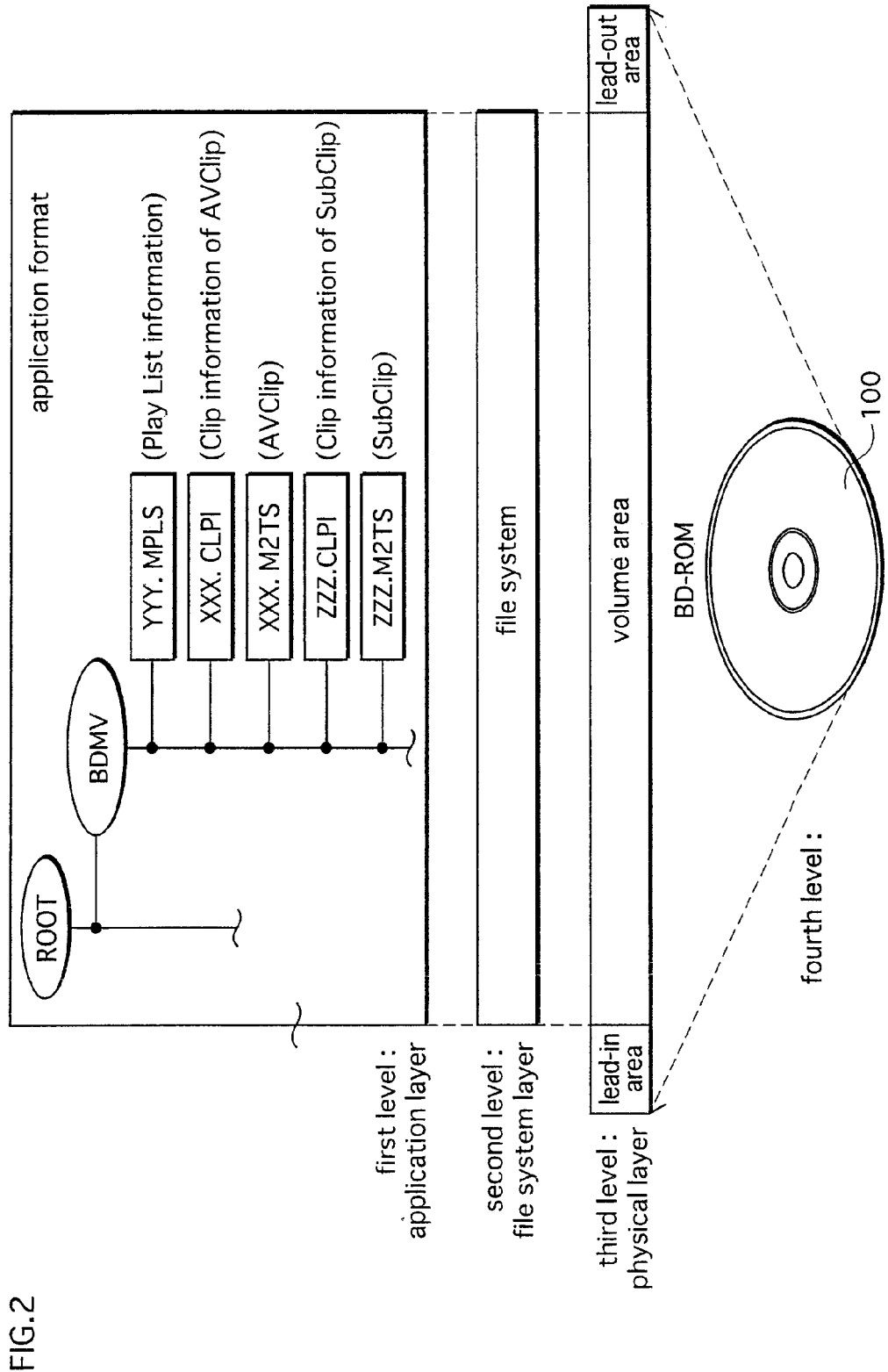
FIG. 2 shows a structure of a BD-ROM.

The BD-ROM which is a recording medium to be played back by the playback apparatus according to the present invention is described next. FIG. 2 shows a structure of the BD-ROM. In the drawing, the fourth level shows the BD-ROM, and the third level shows a track on the BD-ROM. The track is shown as being stretched out into a straight line, though in actuality the track spirals outwards from the center of the BD-ROM. The track includes a lead-in area, a volume area, and a lead-out area. The volume area has a layer model of a physical layer, a file system layer, and an application layer. The first level shows a format of the application layer (application format) of the BD-ROM in a directory structure. As illustrated, the BD-ROM has a BDMV directory below a ROOT directory. The BDMV directory contains files such as YYY.MPLS, XXX.CLPI, XXX.M2TS, ZZZ.M2TS, and ZZZ.CLPI. The XXX.M2TS file corresponds to an AV Clip, and the XXX.CLPI file corresponds to Clip information.

The recording medium according to the present invention can be realized by generating such an application format.

<Structure of the AV Clip>

The AV Clip which is one of the components (AV Clip and Clip information) of content of the movie film is described below.

Figure 3:
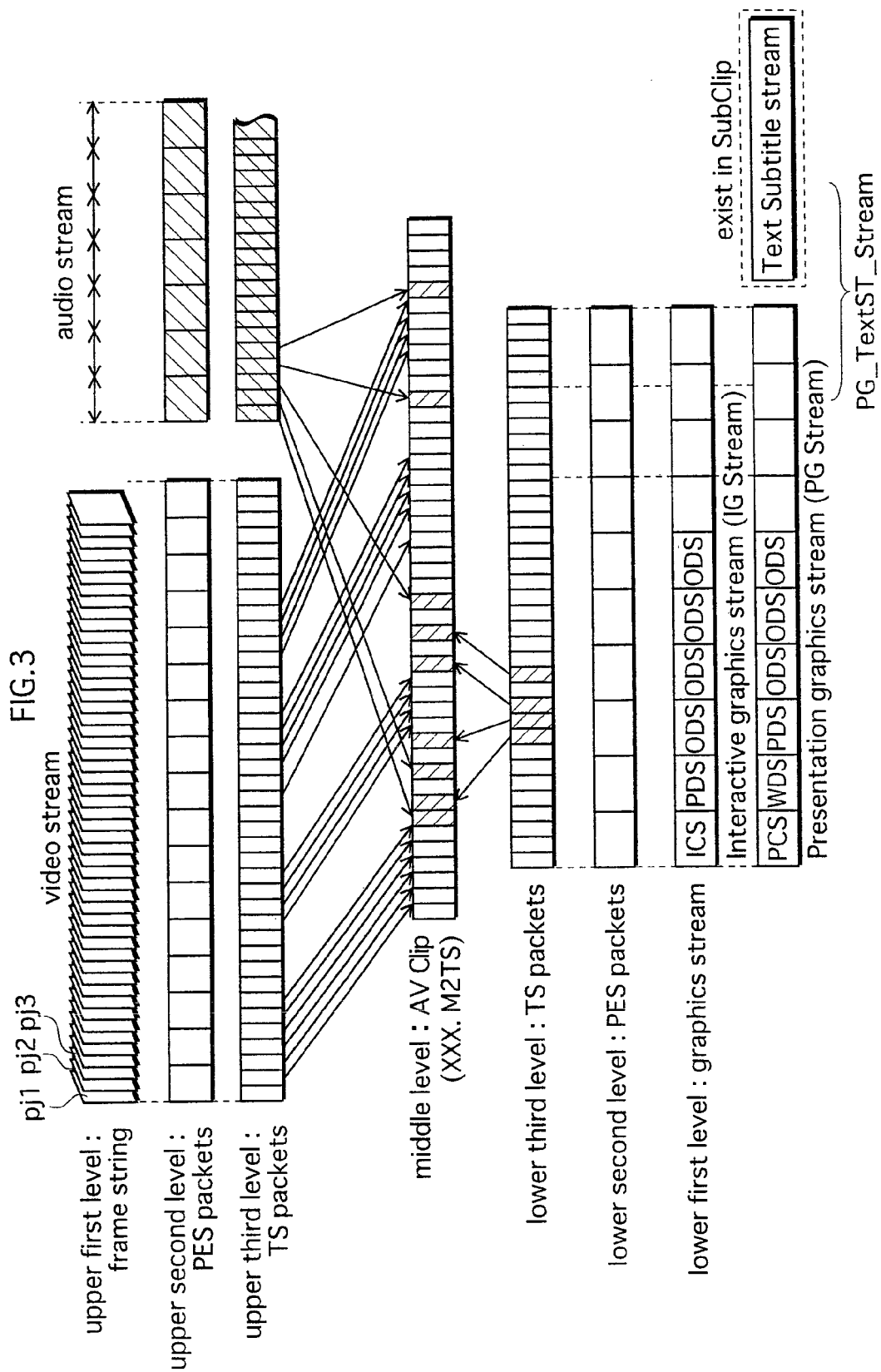
FIG. 3 shows a representation of how an AV Clip is formed.

FIG. 3 shows a representation of how the AV Clip is formed.

The AV Clip (middle level) can be created as follows. A video stream made up of a plurality of video frames (pictures pj1, pj2, pj3, . . . ) and an audio stream made up of a plurality of audio frames (upper first level) are each converted to PES packets (upper second level), and further converted to TS packets (upper third level). Likewise, a Presentation graphics stream (PG stream) for subtitles and an Interactive graphic stream (IG stream) for Interactive Displays (lower first level) are converted to PES packets (lower second level), and further converted to TS packets (lower third level). These TS packets of the video, audio, and PG and IG streams are then multiplexed to form the AV Clip.

Here, not only the PG stream multiplexed in the AV Clip but also a textST stream forms subtitles. The textST stream is a data string that represents subtitles by text data. The textST stream is called a subClip, and is recorded on the BD-ROM or an HD in the playback apparatus by a filename different from that of the AV Clip. The PG stream and the textST stream which form subtitles are both called a PG_textST_stream. This concludes the description of the AV Clip.

<Structure of the Clip Information>

The following describes the XXX.CLPI file.

Figure 4:
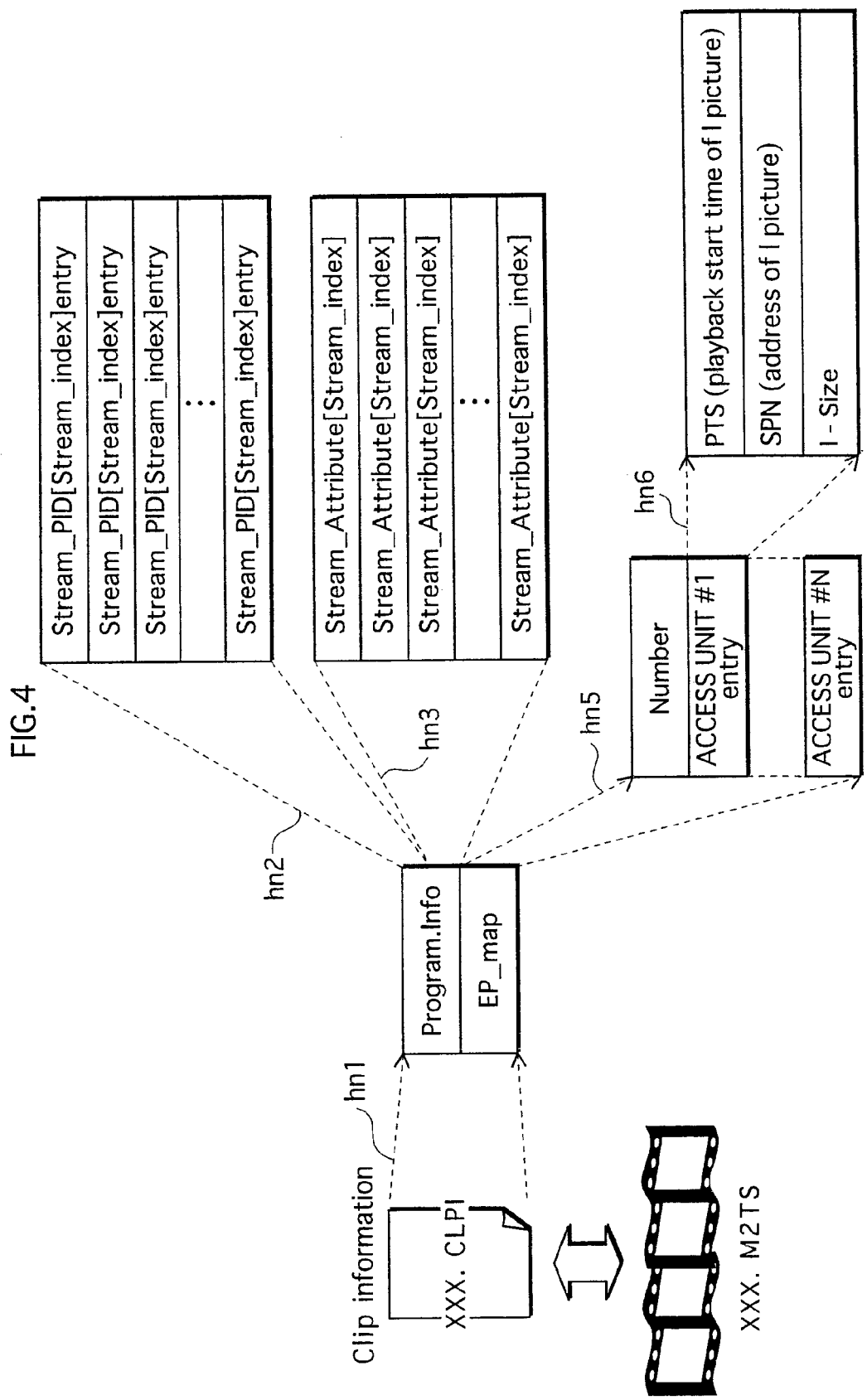
FIG. 4 shows a structure of Clip information.

The Clip information (XXX.CLPI) is management information for the individual AV Clip. FIG. 4 shows a structure of the Clip information. Dotted guidelines in the drawing indicate the structure of the Clip information in more detail. As indicated by guideline hn1, the Clip information (XXX-.CLPI) includes Program.Info and an EP_map used for searching the video stream for a start of an I picture.

The Program.Info is information showing a PID and an attribute of each individual elementary stream multiplexed in the AV Clip, in association with a Stream_index. The Stream_index is an index of each individual elementary stream multiplexed in the AV Clip corresponding to this Clip information. PIDs of the individual elementary streams identified by Stream_indices are shown in Stream_PID [Stream_index] entries indicated by guideline hn2.

Also, attributes of the individual elementary streams identified by the Stream_indices are shown in Stream_Attribute [Stream_index] entries indicated by guideline hn3. The attributes include video attributes, audio attributes, and graphics attributes. The video attributes show a method used for compressing a video stream (Coding), a resolution of picture data which composes the video stream (Resolution), an aspect ratio of the picture data (Aspect), a frame rate of the picture data (Framerate), and the like. The audio attributes show a method used for compressing an audio stream (Coding), a channel attribute of the audio stream (Ch.), a language attribute of the audio stream (Lang), and the like. Through the use of a stream_index, an attribute of an elementary stream can be retrieved from the Program.Info.

The EP_map is a reference table for indirect referencing of addresses of a plurality of locations to which a skip operation is likely to be made, using time information. As indicated by guideline hn5, the EP_map includes a plurality of entries (ACCESS UNIT #1 entry, ACCESS UNIT #2 entry, ACCESS UNIT #3 entry, . . . ) and the number of entries (Number).

As indicated by guideline hn6, each of the entries shows a playback start time of a corresponding I picture, together with an address of the I picture and a size of the I picture (I-Size). The playback start time of the I picture is expressed using a time stamp (Presentation Time Stamp) of the I picture. The address of the I picture is expressed using a serial number (SPN (Source Packet Number)) of a TS packet corresponding to the I picture. It should be noted here that the filename XXX of the Clip information XXX.CLPI is the same as the filename of the AV Clip corresponding to the Clip information. Which is to say, the filename XXX of the Clip information in FIG. 4 means the Clip information corresponds to the AV Clip XXX.M2TS. This concludes the description of the Clip information.

<ZZZ.M2TS and ZZZ.CLPI>

The following describes the ZZZ.M2TS file and the ZZZ.CLPI file. The subClip (ZZZ.M2TS) is a file storing a stream that is played synchronously with the AV Clip. A representative of such a subClip is the aforementioned textST stream. Other subClips include an audio stream and an IG stream. The AV Clip shown in FIG. 3 is hereafter also called a main Clip, to distinguish it from the subClip.

The Clip information (ZZZ.CLPI) is Clip information corresponding to the subClip.

<Structure of the PlayList Information>

Figure 5:
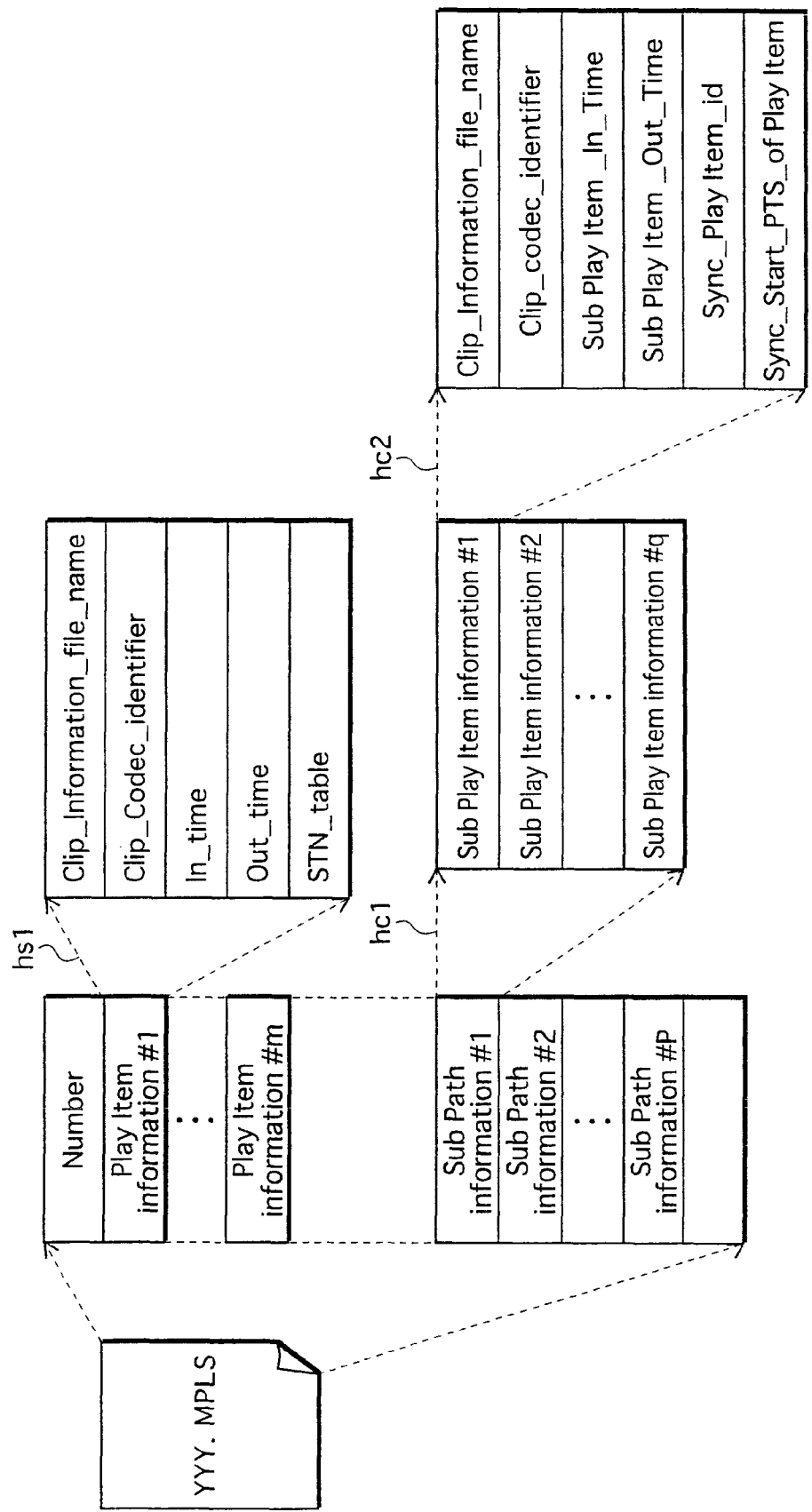
FIG. 5 shows a structure of PlayList information.

The following describes the YYY.MPLS file. The PlayList information (YYY.MPLS) is information which defines a combination of two types of playback paths that are a main path and a SubPath, as a PlayList (PL). FIG. 5 shows a data structure of the PlayList information. As shown in the drawing, the PlayList information includes PlayItem information #1, #2, . . . , #m for defining the main path and SubPath information #1, #2, . . . , #p each for defining the SubPath.

The main path is a playback path defined on an AV Clip which is the main Clip, whereas the SubPath is a playback path defined on a subClip.

The main path is explained first. The main path is defined by a plurality of sets of PlayItem information (PlayItem information #1, #2, #3, . . . , #m) and the number of sets of PlayItem information (Number). PlayItem information defines at least one logical playback section included in the main path. Guideline hs1 indicates a detailed structure of the PlayItem information. As illustrated, the PlayItem information includes a Clip_Information_file_name field showing a filename of Clip information of the AV Clip to which an IN point and an OUT point of the playback section belong, a Clip_codec_identifier field showing a coding method of the AV Clip, an IN_time field which is time information indicating a start of the playback section, an OUT_time field which is time information indicating an end of the playback section, and an STN_table field showing, among the elementary streams in the AV Clip and its related subClip, elementary streams from which the playback apparatus can select for presentation of the PlayItem.

Figure 6:
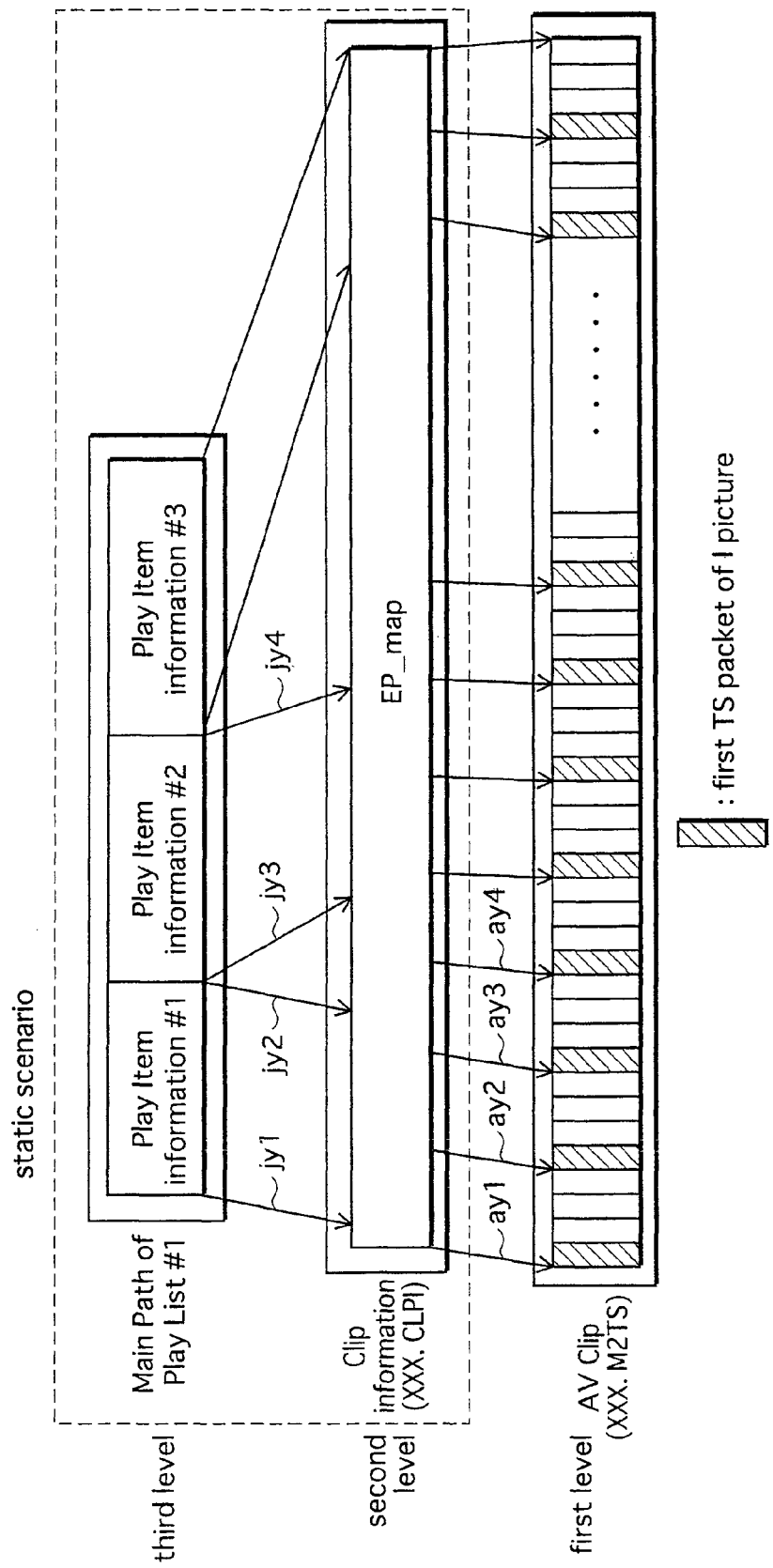
FIG. 6 shows a representation of indirect referencing by PlayList information.

The PlayItem information has a feature of being written based on conversion from time information to an addresses. In other words, the playback section is defined in the form of indirect referencing that uses the EP_map as a reference table. FIG. 6 shows a representation of indirect referencing by PlayList information. In the drawing, the AV Clip is composed of a plurality of TS packets. The EP_map in the Clip information specifies sector addresses of TS packets that correspond to starts of I pictures, as indicated by arrows ay1, ay2, ay3, ay4, . . . . Arrows jy1, jy2, jy3, jy4, . . . indicate a representation of referencing of TS packets by PlayItem information. It can be understood from the drawing that the referencing by the PlayItem information (indicated by arrows jy1, jy2, jy3, jy4, . . . ) is indirect referencing that specifies addresses of TS packets in the AV Clip through the EP_map.

A playback section on the BD-ROM, which is obtained by a combination of PlayItem information, Clip information, and an AV Clip, is called a PlayItem. The movie film recorded on the BD-ROM is composed of PlayItems. Since the movie film recorded on the BD-ROM is composed of logical playback units, "sharing", i.e. an AV Clip which forms a scene of one movie film being referenced by another movie film, can be efficiently conducted.

The variation in movie films can be widened just by defining various kinds of PlayList information, which enables movie film producers to extend the range of expression. This is a greatest advantage of static scenario. Playback units of BD-ROMs include not only a PlayItem but also a Title and a Chapter. The Title is a playback unit corresponding to one movie film, and is composed of at least one set of PlayList information. The Chapter is a playback unit corresponding to one chapter of a movie film, and is defined by information called Mark information.

The filename YYY of the PlayList information represents a three-digit ID number assigned to the PlayList information in the BD-ROM. Which is to say, the PlayList information shown in FIG. 6 is uniquely identified by this ID number YYY. The use of "YYY" as the ID number of the PlayList information indicates that the ID number of the PlayList information has a different numbering system from the ID number XXX of the AV Clip and the Clip information (though the number of digits of the ID number is three in this example, the number of digits is not limited to such).

This concludes the description of the main path. The SubPath is described next.

<SubPath>

Guideline hc1 in FIG. 5 indicates a structure of SubPath information in detail. As illustrated, the SubPath information is made up of at least one set of SubPlayItem information. SubPlayItem information includes a Clip_Information_file_name field, a Clip_codec_identifier field, a SubPlayItem_IN_time field, a SubPlayItem_OUT_time field, a sync_PlayItem_id field, and a sync_start_PTS_of_PlayItem field, as indicated by guideline hc2.

The Clip_Information_file_name field shows a filename of Clip information of a subClip corresponding to the SubPlayItem, to thereby uniquely identify the subClip.

The Clip_codec_identifier field shows a coding method of the subClip.

The SubPlayItem_IN_time field is time information indicating a start of the SubPlayItem on a playback time axis of the subClip.

The SubPlayItem_OUT_time field is time information indicating an end of the SubPlayItem on the playback time axis of the subClip.

The sync_PlayItem_id field uniquely identifies one of the PlayItems in the main path with which the SubPlayItem is to be synchronized. The SubPlayItem_IN_time is present on a playback time axis of the PlayItem identified by the sync_PlayItem_id.

The sync_start_PTS_of_PlayItem field specifies the start of the SubPlayItem indicated by the SubPlayItem_IN_time, on the playback time axis of the PlayItem identified by the sync_PlayItem_id. When the current playback time has reached a point specified by this sync_start_PTS_of_PlayItem on the playback time axis of the PlayItem, the playback of the SubPlayItem is launched.

Figure 7:
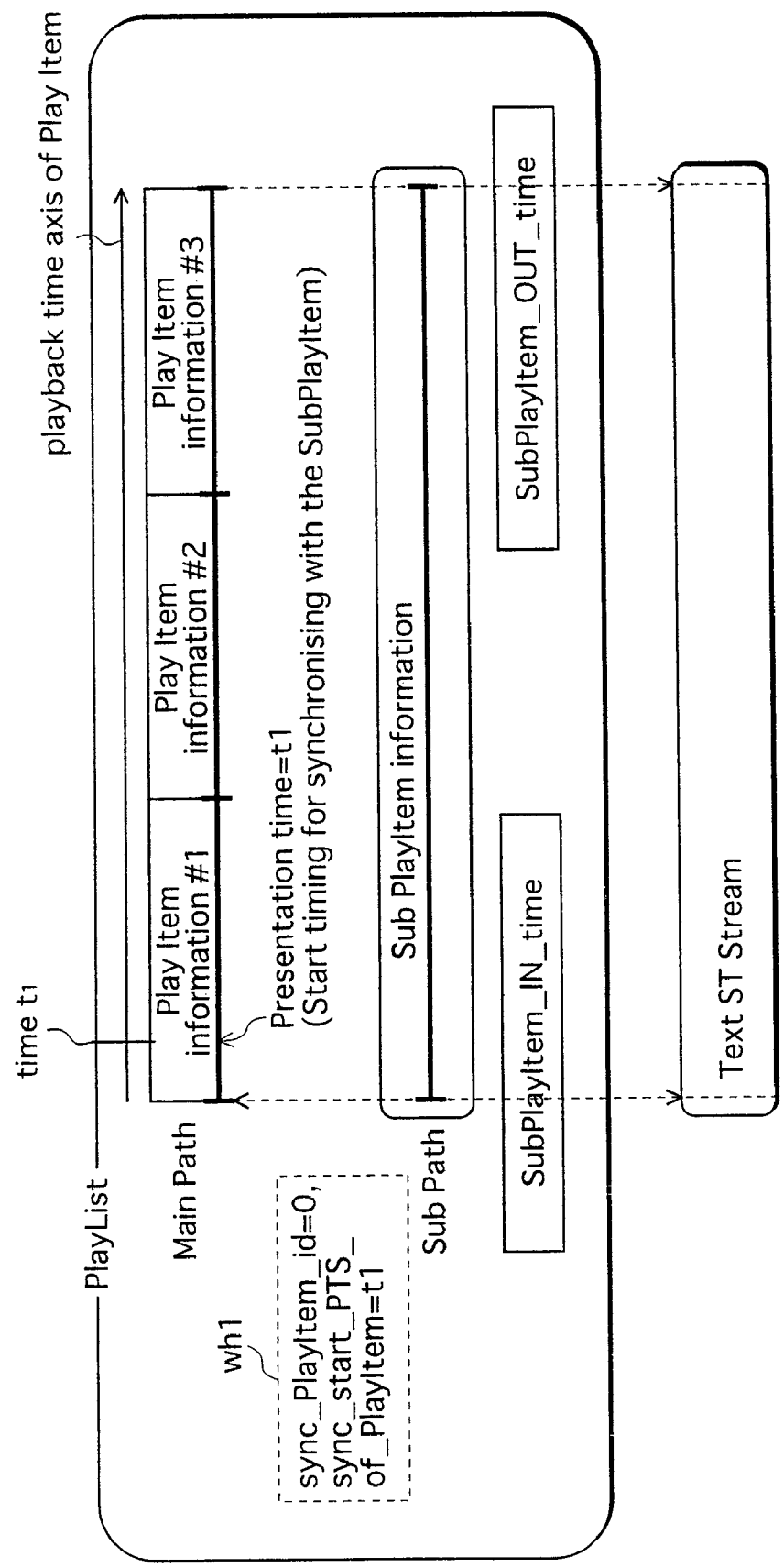
FIG. 7 shows a representation of synchronization of a SubPlayItem using a sync_PlayItem_id and a synch_start_PTS_of_PlayItem.

FIG. 7 shows a representation of synchronization of the SubPlayItem according to the sync_PlayItem_id and the sync_start_PTS_of PlayItem. In the drawing, the main path is made up of PlayItems #1, #2, and #3. The sync_PlayItem_id and the sync_start_PTS_of_PlayItem of the SubPlayItem which forms a SubPath are set as shown in dotted box wh1. In detail, the sync_PlayItem_id is set to specify PlayItem #1, and the sync_start_PTS_of_PlayItem is set to specify time t1 on the playback time axis of PlayItem #1. This being the case, when the current playback time has reached t1 on the playback time axis of PlayItem #1, playback of a part of the subClip (textST stream), specified by the Clip_Information_file_name, from the SubPlayItem_IN_time to the SubPlayItem_OUT_time is launched. As a result, the part of the textST stream from the SubPlayItem_IN_time to the SubPlayItem_OUT_time is played synchronously with the AV Clip. This concludes the description of the SubPath information.

The STN_table field included in the PlayItem information described above provides information used for status settings, and is an essential feature of the present invention. The following describes the STN_table in detail.

<STN_Table>

The STN_table shows elementary streams available for presentation, among elementary streams multiplexed in the AV Clip specified by the Clip_Information_file_name of the PlayItem and elementary streams in a subClip specified by the Clip_Information_file_name of a SubPlayItem relating to the PlayItem. The STN_table is formed by associating an entry of each elementary stream with its attribute. An elementary stream available for presentation is mainly an elementary stream multiplexed in the AV Clip specified by the PlayItem, but may also include an elementary stream (textST stream) recorded separately from the AV Clip but played together with the AV Clip.

FIG. 8 shows a structure of the STN_table. As shown in the drawing, the STN_table includes a plurality of combinations of entries and attributes (entry-attribute), and the numbers of entry-attribute combinations (number_of_video_stream_entries, number_of_audio_stream_entries, number_of_PG_textST_stream_entries, and number_of_IG_stream_entries).

The entry-attribute combinations correspond to a video stream, audio streams, PG_textST_streams, and IG streams that are available for presentation in the PlayItem, as indicated by the parenthesis "{".

The entry-attribute combinations are explained in detail below. FIGS. 9A to 9D show the entry-attribute combinations in detail.

FIG. 9A shows an entry-attribute combination corresponding to a video stream.

An entry in this entry-attribute combination corresponding to the video stream includes a ref_to_stream_PID_of_mainClip field showing a PID used for extracting the video stream when demultiplexing the AV Clip.

An attribute in the entry-attribute combination corresponding to the video stream includes a stream_coding_type field which is set to 0x02, and a frame_rate field showing a display rate of the video stream.

FIG. 9B shows an entry-attribute combination corresponding to an audio stream.

An entry in the entry-attribute combination corresponding to the audio stream includes a ref_to_stream_PID_of_mainClip field showing a PID used for extracting the audio stream when demultiplexing the AV Clip.

An attribute in the entry-attribute combination corresponding to the audio stream includes a stream_coding_type field which is set to one of 0x80 (Linear PCM), 0x81 (AC-3), and 0x82 (DTS) to indicate a coding type of the audio stream, an audio_presentation_type field showing a channel structure of the audio stream and indicating whether surround output is possible, and an audio_language_code field showing a language attribute of the audio stream.

FIG. 9C shows an entry-attribute combination corresponding to a PG stream.

An entry in the entry-attribute combination corresponding to the PG stream includes a ref_to_stream_PID_of_mainClip field showing a PID used for extracting the PG stream when demultiplexing the AV Clip.

An attribute in the entry-attribute combination corresponding to the PG stream includes a stream_coding_type field which is set to 0x90 indicating a PG stream codec, and a PG_language_code field showing a language attribute of the PG stream.

FIG. 9D shows an entry-attribute combination corresponding to a textST stream.

An entry in the entry-attribute combination corresponding to the textST stream includes a ref_to_subClip_entry_id field showing an entry identifier of a subClip storing the textST stream, a ref_to_SubPath_id field showing an ID of SubPath information, and a ref_to_stream_PID_of_subClip field showing a PID of the textST stream.

An attribute in the entry-attribute combination corresponding to the textST stream includes a stream_coding_type field which is set to 0x92 indicating a textST stream codec, a character_code field showing a character code of the textST stream, and a textST_language_code field showing a language attribute of the textST stream.

FIG. 9E shows an entry-attribute combination corresponding to an IG stream.

An entry in the entry-attribute combination corresponding to the IG stream includes a ref_to_stream_PID_of_mainClip field showing a PID used for extracting the IG stream when demultiplexing the AV Clip.

An attribute in the entry-attribute combination corresponding to the IG stream includes a stream_coding_type field which is set to 0x91 indicating an IG stream codec, and an IG_language_code field showing a language attribute of the IG stream. This concludes the description of the data structure of the entry-attribute combination of each elementary stream. The order of entries in the STN_table is interpreted as the order of priorities in stream selection. Also, entries of textST streams and PG streams are put in one group in the STN_table in order to treat the PG streams and the textST streams on an equal basis and determine which stream out of the PG streams and the textST streams has a higher priority. For example, if a textST stream has a higher entry than a PG stream in the group of entries for PG_textST_streams in the STN_table, the textST stream is selected over the PG stream. Conversely, if the PG stream has a higher entry than the textST stream in the STN_table, the PG stream is selected over the textST stream.

The above STN_table is provided for each set of PlayList information. Therefore, there may be a case where an entry of one elementary stream is high in an STN_table of one set of PlayList information but low in an STN_table of another set of PlayList information.

Figure 10:
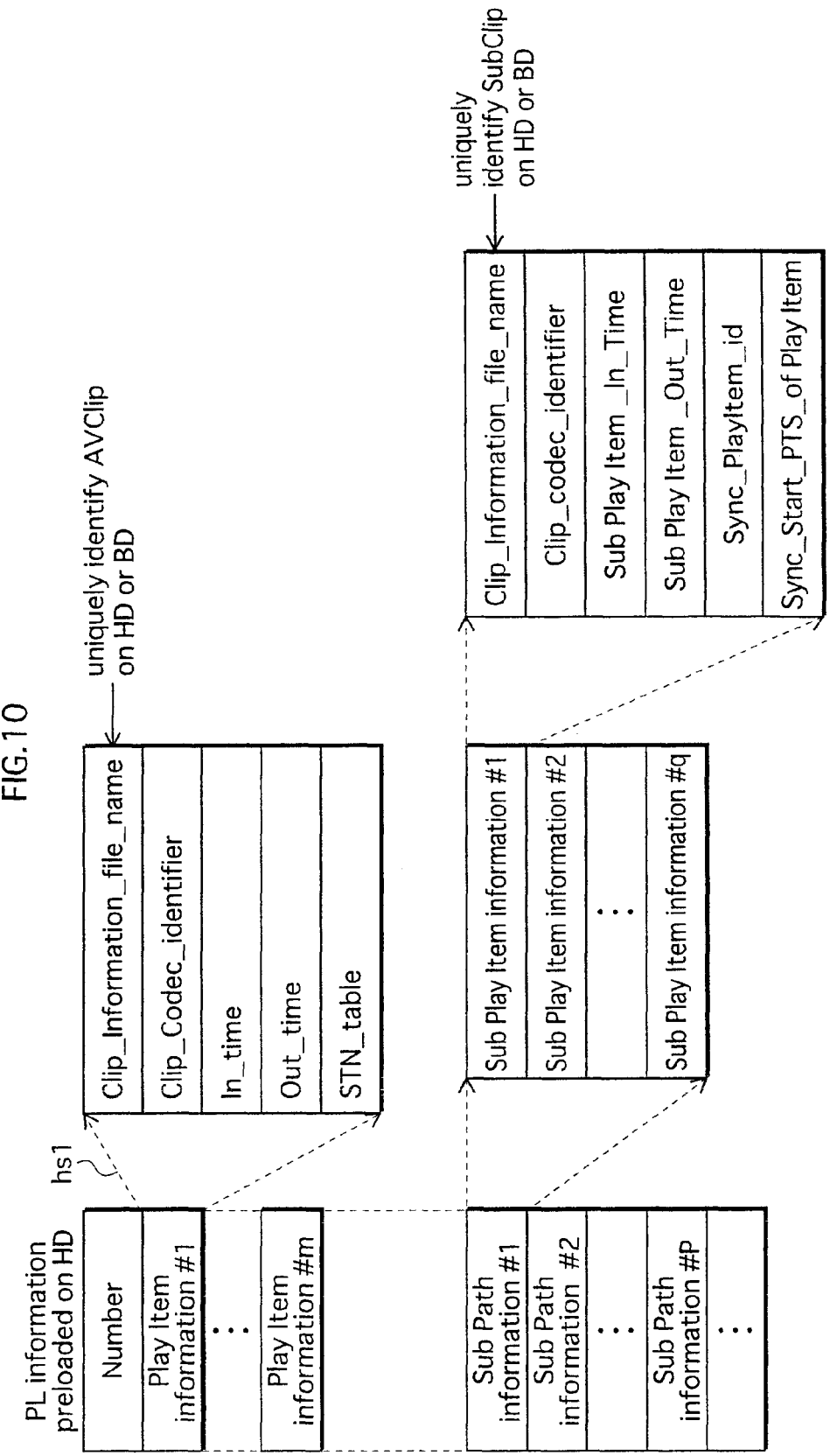
FIG. 10 shows a structure of PlayList information preloaded on an HD.
Figure 11:
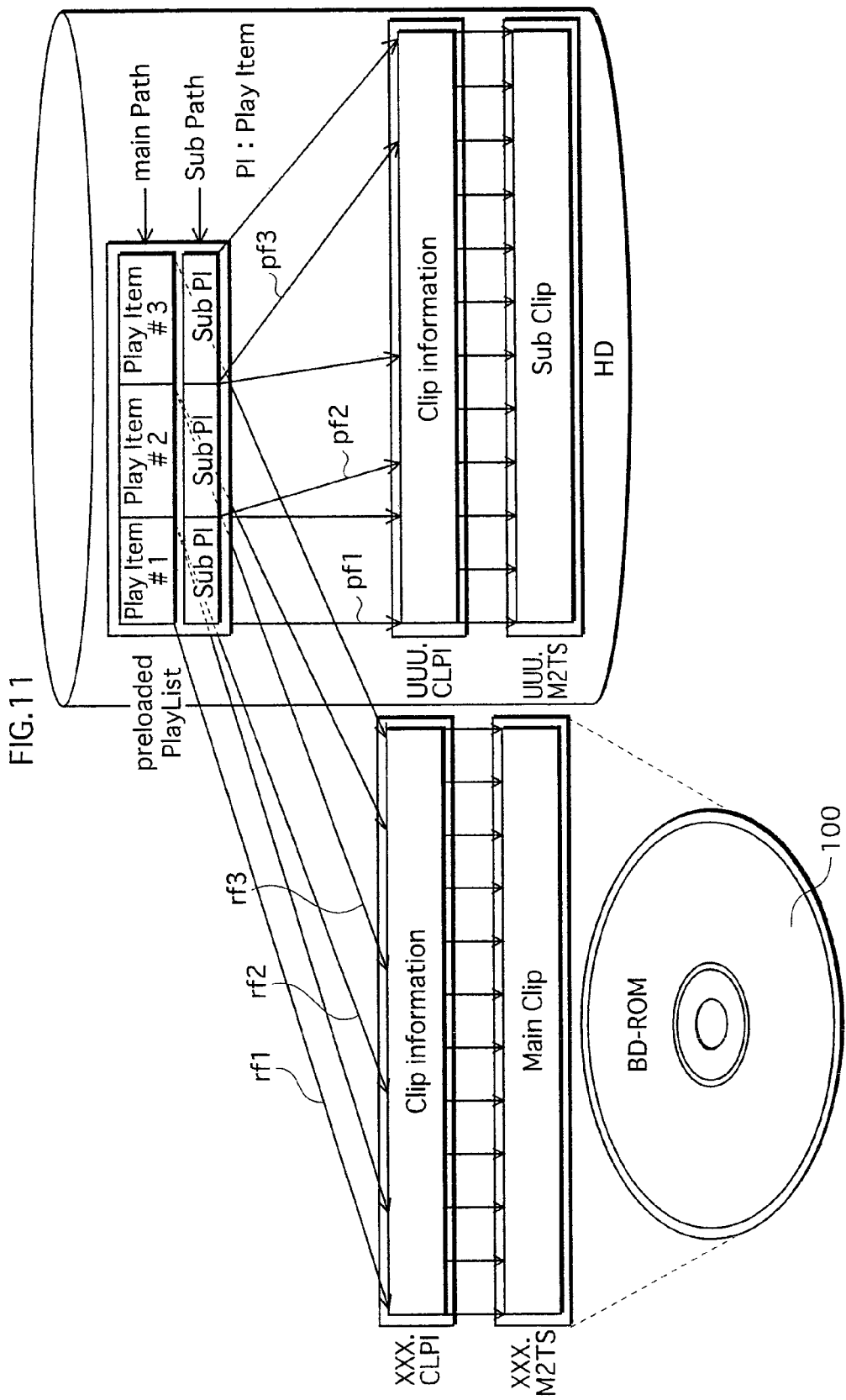
FIG. 11 shows file designation by Clip_Information_file_names in the PlayList information on the HD.

This concludes the description of the data structure of the application format in the BD-ROM. It should be noted here that the recording medium to be played back by the playback apparatus according to the present invention is not limited to the BD-ROM, but also includes the HD in the playback apparatus. Data recorded on the HD is explained below. The HD stores a file containing a subClip, a file containing Clip information, and a file containing PlayList information, too. These files are preloaded onto the HD via a network. FIG. 10 shows a structure of such preloaded PlayList information. As shown in the drawing, the preloaded PlayList information has a similar structure to the PlayList information on the BD-ROM shown in FIG. 5. The difference from the one shown in FIG. 5 lies in that a Clip_Information_file_name in PlayItem information and a Clip_Information_file_name in SubPlayItem information can each designate Clip information on any of the BD-ROM and the HD. To designate Clip information on the BD-ROM, a full path of a file on the BD-ROM needs not be used in the preloaded PlayList information. This is because the playback apparatus recognizes the BD-ROM and the HD together as one virtual drive (called a virtual package). Accordingly, a Clip_Information_file_name in PlayItem information and a Clip_Information_file_name in SubPlayItem information in the preloaded PlayList information can designate an AV Clip on any of the HD and BD-ROM, by using a file body, such as XXX or ZZZ, of a file containing Clip information. FIG. 11 shows designation of files by Clip_Information_file_names in PlayList information on the HD. In the drawing, arrows rf1, rf2, and rf3 indicate file designation by Clip_Information_file_names in PlayItem information in the PlayList information, and arrows pf1, pf2, and pf3 indicate file designation by Clip_Information_file_names in SubPlayItem information in the PlayList information. Through such file designation by Clip_Information_file_names, a SubPath defined on a subClip on the HD can be played synchronously with a main path defined on a main Clip on the BD-ROM.

Note that the data structures explained above are instances of class structures written in a programming language. The author writes the class structures to create these data structures on the BD-ROM.

Figure 12:
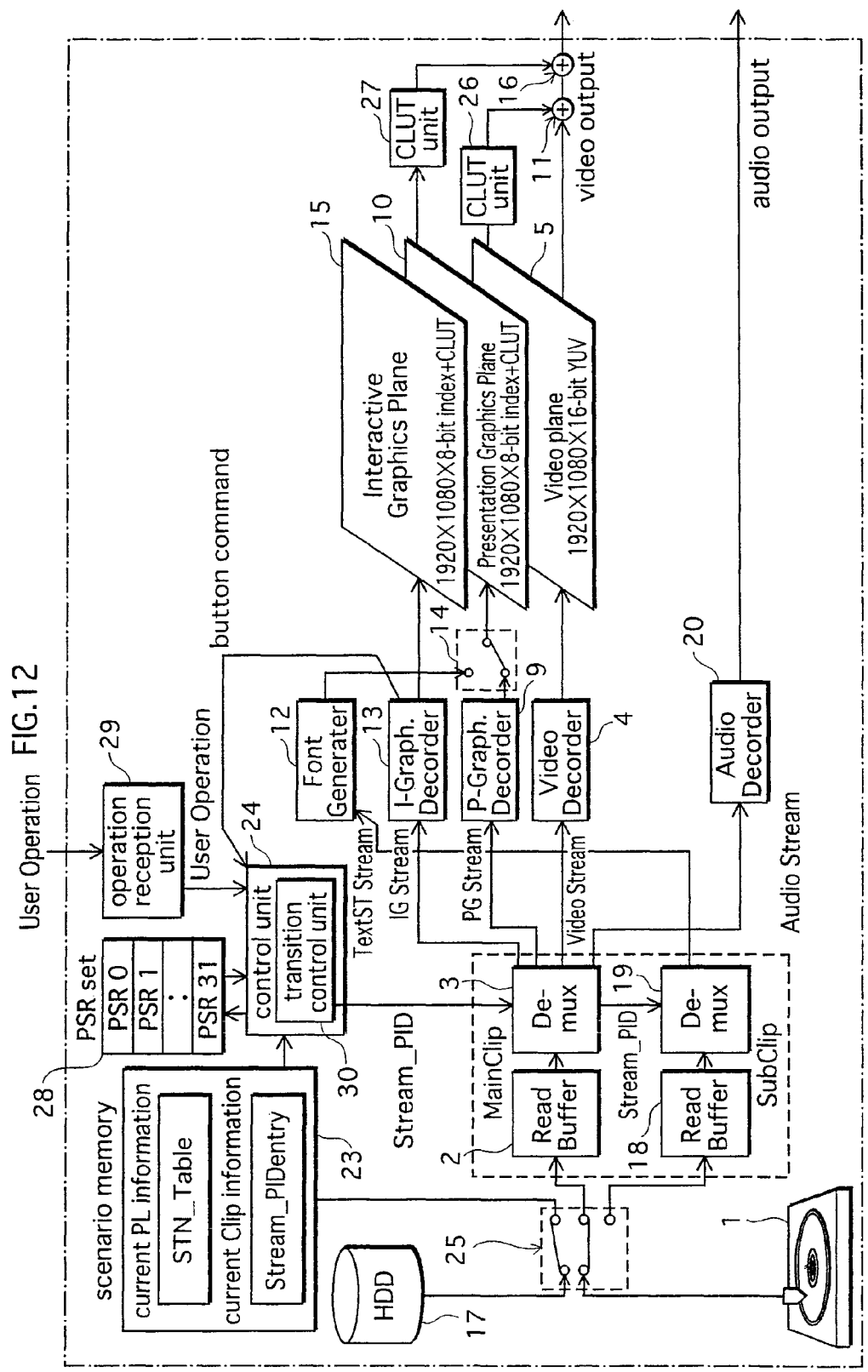
FIG. 12 shows an internal construction of the playback apparatus to which the present invention relates.

This concludes the description of the recording medium. The following describes the playback apparatus according to the present invention. FIG. 12 shows an internal construction of the playback apparatus according to the present invention. The playback apparatus according to the present invention is manufactured based on this internal construction. The playback apparatus is roughly made up of two parts that are a system LSI and a drive device. The playback apparatus can be manufactured by mounting these parts on a cabinet and substrate of the apparatus. The system LSI is an integrated circuit including various processing units for achieving the functions of the playback apparatus. The playback apparatus includes a BD drive 1, a Read Buffer 2, a Demultiplexer 3, a Video Decoder 4, a Video Plane 5, a Presentation Graphics Decoder 9, a Presentation Graphics Plane 10, an adder 11, a Font Generator 12, an Interactive Graphics Decoder 13, a switch 14, an Interactive Graphics Plane 15, an adder 16, an HDD 17, a Read Buffer 18, a Demultiplexer 19, an Audio Decoder 20, a scenario memory 23, a control unit 24, a switch 25, a CLUT unit 26, a CLUT unit 27, a PSR set 28, and an operation reception unit 29. The control unit 24 includes a transition control unit 30.

The BD drive 1 performs loading and ejecting of the BD-ROM, and accesses to the BD-ROM.

The Read Buffer 2 is a FIFO memory. Accordingly, TS packets read from the BD-ROM are removed from the Read Buffer 2 in a same order as they arrive.

The Demultiplexer (Demux) 3 reads TS packets from the Read Buffer 2 and converts the TS packets to PES packets. The Demultiplexer 3 outputs PES packets having a stream ID designated by the control unit 24 to one of the Video Decoder 4, the Audio Decoder 20, the Presentation Graphics Decoder 9, and the Interactive Graphics Decoder 13.

The Video Decoder 4 decodes PES packets output from the Demultiplexer 3 to obtain uncompressed pictures, and writes the uncompressed pictures to the Video Plane 5.

The Video Plane 5 is a plane for storing uncompressed pictures. Here, a plane is a memory area used for storing one screen of pixel data in the playback apparatus. By providing the playback apparatus with a plurality of planes and adding the storage contents of these planes for corresponding pixels, an image output in which a plurality of images are overlaid on each other can be produced. The Video Plane 5 has a resolution of 1920×1080, and picture data stored on the Video Plane 5 is composed of pixel data expressed by 16-bit YUV values.

The Presentation Graphics Decoder 9 decodes a graphics stream read from the BD-ROM or the HD to obtain uncompressed graphics, and writes the uncompressed graphics to the Presentation Graphics Plane 10. As a result of decoding the graphics stream, subtitles are displayed on the screen.

The Presentation Graphics Plane 10 is a memory having one screen of area, and is capable of storing one screen of uncompressed graphics. The Presentation Graphics Plane 10 has a resolution of 1920×1080, and each pixel in the uncompressed graphics on the Presentation Graphics Plane 10 is expressed by an 8-bit index color. By converting the index color using a CLUT (Color Lookup Table), the uncompressed graphics on the Presentation Graphics Plane 10 is presented for display.

The adder 11 overlays the storage contents of the Presentation Graphics Plane 10 on uncompressed picture data (i).

The Font Generator 12 develops text code included in a textST stream to a bitmap, using a character font.

The Interactive Graphics Decoder 13 decodes an IG stream read from the BD-ROM or the HD to obtain uncompressed graphics, and writes the uncompressed graphics to the Interactive Graphics Plane 15.

The switch 14 selectively writes one of a font string generated by the Font Generator 12 and graphics generated by the Presentation Graphics Decoder 9, to the Presentation Graphics Plane 10.

The Interactive Graphics Plane 15 is used for storing uncompressed graphics obtained by the Interactive Graphics Decoder 13.

The adder 16 overlays the storage contents of the Interactive Graphics Plane 15, on picture data (ii) which is generated by overlaying the storage contents of the Presentation Graphics Plane 10 on the uncompressed picture data (i).

The HDD 17 is the aforementioned HD included in the playback apparatus. By reading the storage contents of the HDD 17 and dynamically combining them with the storage contents of the BD-ROM, a graphics stream or a textST stream not recorded on the BD-ROM can be presented.

The Read Buffer 18 is a FIFO memory. Accordingly, TS packets read from the HDD 17 are removed from the Read Buffer 18 in the same order as they arrive.

The Demultiplexer (Demux) 19 reads TS packets from the Read Buffer 18 and converts the TS packets to PES packets. The Demultiplexer 19 outputs PES packets having a stream ID designated by the control unit 24, to the Font Generator 12.

The Audio Decoder 20 decodes PES packets output from the Demultiplexer 3, and outputs uncompressed audio data.

The scenario memory 23 is used for storing current PlayList information and current Clip information. The current PlayList information refers to PlayList information that relates to the current playback, among a plurality of sets of PlayList information recorded on the BD-ROM. The current Clip information refers to Clip information that relates to the current playback, among a plurality of sets of Clip information recorded on the BD-ROM.

The control unit 24 controls reading of an AV Clip from the BD-ROM and playback of the AV Clip, according to the current PlayList information and the current Clip information on the scenario memory 23. In detail, the control unit 24 detects the current PlayItem in the current PlayList information. With reference to the current Clip information identified by a Clip_Information_file_name of the current PlayItem, the control unit 24 controls the BD-ROM drive 1 to read TS packets from an IN_time to an OUT_time of the current PlayItem, from an AV Clip specified by the current Clip information. The read TS packets are output selectively to the Video Decoder 4, the Presentation Graphics Decoder 9, the Interactive Graphics Decoder 13, and the Audio Decoder 20 via the Demultiplexer 3, to play the AV Clip.

If the current PlayList information includes a SubPlayItem to be synchronized with the current PlayItem, the control unit 24 plays a subClip specified by the SubPlayItem synchronously with the main Clip. This synchronization is conducted by playing back data from a SubPlayItem_IN_time to a SubPlayItem_OUT_time of the SubPlayItem when picture data corresponding to a sync_start_PTS_of PlayItem of the SubPlayItem is read from the main Clip.

The switch 25 selectively feeds various data read from the BD-ROM and the HD to the Read Buffer 2, the Read Buffer 18, and the scenario memory 23.

The CLUT unit 26 converts index colors of the uncompressed graphics stored on the Video Plane 5, to Y, Cr, and Cb values.

The CLUT unit 27 converts index colors of the uncompressed graphics stored on the Interactive Graphics Plane 15, to Y, Cr, and Cb values.

The PSR set 28 is a register equipped in the playback apparatus, and is composed of 64 Player Status Registers (PSRs) and 4096 General Purpose Registers (GPRs). A definition of a value of each PSR will be explained in detail later.

The operation reception unit 29 outputs, when an operation of selecting a stream or the like is made on the remote control or a front panel of the playback apparatus, user operation information indicating the operation to the control unit 24.

The transition control unit 30 is included in the control unit 24. The transition control unit 30 extracts a stream_PID of an entry-attribute combination corresponding to a PSR from an STN_table in the current PlayItem information, and outputs the extracted stream_PID to the Demultiplexer 3 or 19. Since the setting of the Stream_PID in the Demultiplexer 3 or 19 is based on the PSR, the transition control unit 30 performs a setting operation on the PSR in accordance with a condition change in or a change request to the playback apparatus.

In detail, when a condition change occurs in the playback apparatus, the transition control unit 30 judges whether a value of the PSR is Valid, Invalid, or undefined. If the value is Valid, the transition control unit 30 maintains the value. If the value is Invalid or undefined, the transition control unit 30 sets an optimal value in the PSR.

When a change of the PSR is requested by user operation information output from the operation reception unit 29 or a button command output from the Interactive Graphics Decoder 13, the transition control unit 30 determines a value (value X) to be set in the PSR according to the user operation information or the button command, and performs a PSR update operation based on value X. If the user operation information indicates that the audio switch key or the subtitle switch key has been pressed, the transition control unit 30 determines a sum of the PSR and 1 as value X. If the user operation information indicates that one of the numeric keys has been pressed, the transition control unit 30 determines a number corresponding to the pressed numeric key as value X. If the button command instructs to set the PSR, on the other hand, the transition control unit 30 determines a value specified by an argument of the button command as value X. Once value X has been determined in this way, the transition control unit 30 judges whether value X is Valid, Invalid, or undefined, and performs a PSR update operation depending on a result of the judgment. In detail, if value X is Valid, the transition control unit 30 overwrites the PSR with value X. If value X is undefined, the transition control unit 30 selects an optimal value and sets the optimal value in the PSR. If value X is Invalid, the transition control unit 30 maintains the value of the PSR.

<PSRs>

Figure 13:
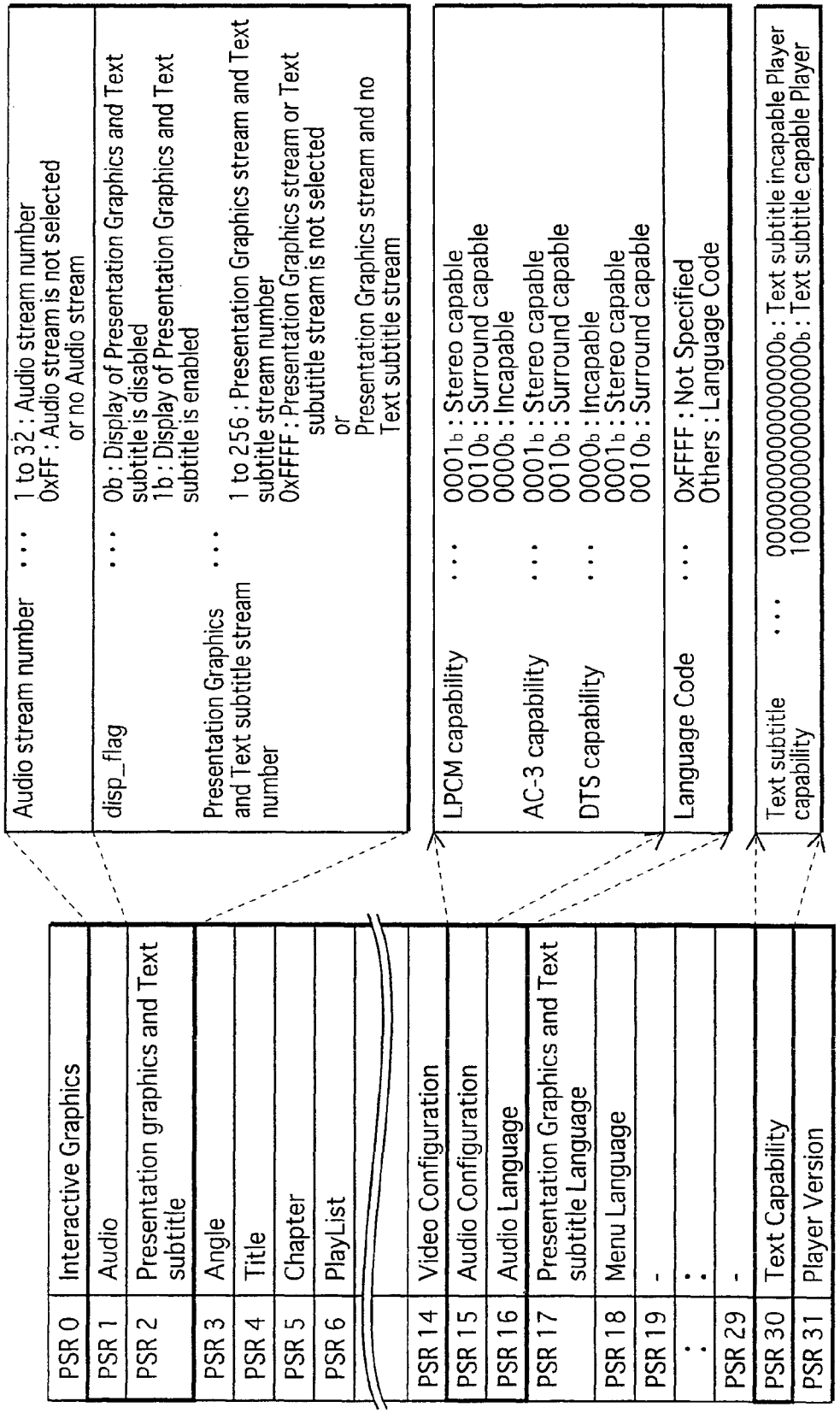
FIG. 13 shows detailed settings of PSR1, PSR2, PSR15, PSR16, and PSR30.

This concludes the description of the construction of the playback apparatus according to the present invention. The following describes individual PSRs in the PSR set 28. In the PSR set 28, PSR1, PSR2, PSR15, PSR16, and PSR30 relate to selection of audio and subtitles, capabilities of decoding and presenting audio and subtitles, and a language setting in the playback apparatus. FIG. 13 shows detailed settings of PSR1, PSR2, PSR15, PSR16, and PSR30.

PSR1 specifies an audio stream currently selected by the playback apparatus.

PSR2 includes a disp_flag field, and specifies a PG_textST_stream currently selected by the playback apparatus. The disp_flag field is set to 0 to indicate that display of a PG stream and a textST stream is disabled, and 1 to indicate that display of a PG stream and a textST stream is enabled.

PSR15 includes an LPCM capability field, an AC-3 capability field, and a DTS capability field. The LPCM capability field is set to $0001_b$ to indicate that the playback apparatus is capable of playing LPCM stereo, and $0010_b$ to indicate that the playback apparatus is capable of playing LPCM surround.

The AC-3 capability field is set to $0001_b$ to indicate that the playback apparatus is capable of playing AC-3 stereo, and $0010_b$ to indicate that the playback apparatus is capable of playing AC-3 surround.

The DTS capability field is set to $0001_b$ to indicate that the playback apparatus is capable of playing DTS stereo, $0010_b$ to indicate that the playback apparatus is capable of playing DTS surround, and $0000_b$ to indicate that the playback apparatus is incapable of decoding a DTS audio stream.

PSR16 is set to a value other than 0xFFFF to indicate an audio stream language attribute, and set to 0xFFFF to indicate that no audio stream language attribute is specified.

A most significant bit of PSR30 is set to 0 to indicate that the playback apparatus is incapable of displaying text subtitles, and set to 1 to indicate that the playback apparatus is capable of displaying text subtitles.

This concludes the explanation of FIG. 13. The following describes PSR4 to PSR8 with reference to FIG. 14. FIG. 14 shows detailed settings of PSR4 to PSR8.

PSR4 is set to one of the values 1 to 100 to indicate a number of a Title corresponding to the current playback time, and set to 0 to indicate that the current playback time corresponds to a top menu.

PSR5 is set to one of the values 1 to 999 to indicate a number of a Chapter corresponding to the current playback time, and set to 0xFFFF to indicate that a Chapter number is invalid in the playback apparatus.

PSR6 is set to one of the values 0 to 999 to indicate a number of a PlayList corresponding to the current playback time (current PlayList).

PSR7 is set to one of the values 0 to 255 to indicate a number of a PlayItem corresponding to the current playback time (current PlayItem).

PSR8 is set to one of the values 0 to 0xFFFFFFFF to indicate the current playback time with a time accuracy of 45 KHz (current PTM). This concludes the explanation of PSR4 to PSR8.

<Status Transitions of PSR1>

The following describes status transitions of PSR1 in detail.

PSR1 specifies one of a plurality of audio streams which are listed as entries in the STN_table of the current PlayItem. When PSR1 changes, the playback apparatus plays back an audio stream specified by the changed PSR1. PSR1 is initially set to 0xFF, and can be reset to any of the values 1 to 32 by the playback apparatus. The value 0xFF is an undefined value, indicating that no audio stream is present or no audio stream is selected. The values 1 to 32 are interpreted as audio stream numbers.

Figure 15A:
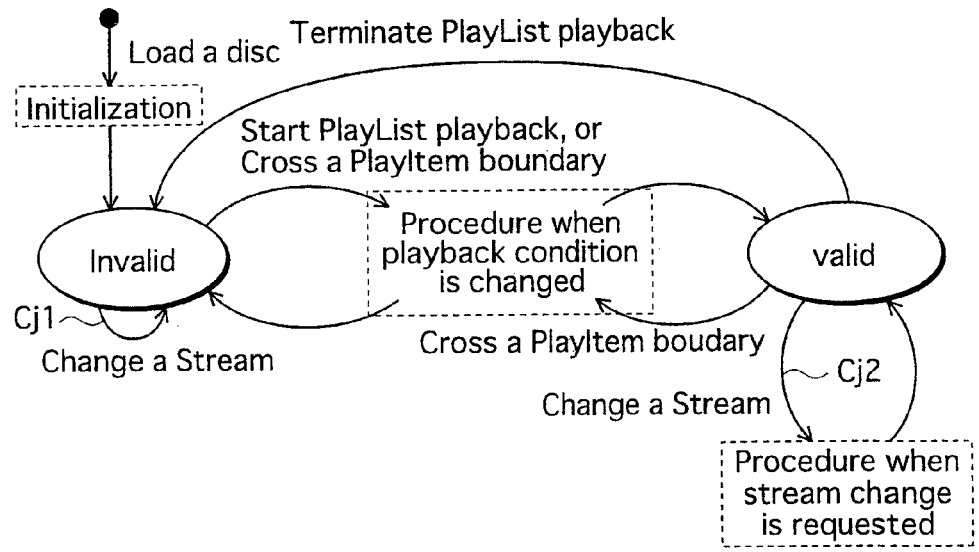
FIG. 15A shows status transitions that can be made by PSR1.

FIG. 15A shows status transitions that can be made by PSR1. In the drawing, the term "Valid" denotes a state where PSR1 is no greater than the number of entries in the STN_table of the current PlayItem and also the playback apparatus is capable of playing the audio stream.

Meanwhile, the term "Invalid" denotes a state where PSR1 is 0 or greater than the number of entries in the STN_table of the current PlayItem. There may be a case where even if PSR1 is no greater than the number of entries in the STN_table of the current PlayItem, the playback apparatus is incapable of decoding the audio stream.

Procedures for setting PSR1 upon a status transition are schematically shown in dotted boxes in FIG. 15A. There are two types of PSR setting procedures, namely, "Procedure when playback condition is changed" and "Procedure when change is requested".

"Procedure when playback condition is changed" is a procedure to run when the condition of the playback apparatus changes due to the occurrence of some kind of event.

"Procedure when YYY change is requested" is a procedure to run when the user requests some kind of change (stream change in the case of FIG. 15).

"Procedure when playback condition is changed" and "Procedure when change is requested" shown in the dotted boxes are the stream selection procedures that constitute the principal features of the present invention, and will be explained in detail later with reference to flowcharts.

Each arrow in FIG. 15A represents a status transition of PSR1.

A comment accompanying each arrow denotes an event which triggers a status transition. In detail, when any of "Load a disc", "Change a Stream", "Start PlayList playback", "Cross a PlayItem boundary", and "Terminate PlayList playback" occurs, PSR1 undergoes a status transition. In view of this notation, it can be understood from FIG. 15A that none of the above procedures is performed upon a status transition from Invalid to Invalid and a status transition from Valid to Invalid. On the other hand, each of a status transition from Invalid to Valid and a status transition from Valid to Valid passes one of the procedures. In other words, to set Valid PSR1, "Procedure when playback condition is changed" or "Procedure when change is requested" is carried out.

The events which trigger status transitions are explained below.

"Load a disc" is an event of loading the BD-ROM to the playback apparatus. Upon loading, PSR1 is initially set to an undefined value (0xFF).

"Start PlayList playback" is an event of starting playback based on a PlayList. When this event occurs, "Procedure when playback condition is changed" is performed, and PSR1 becomes Valid.

"Terminate PlayList playback" is an event of ending playback based on a PlayList. When this event occurs, "Procedure when playback condition is changed" is not performed, and PSR1 becomes Invalid.

"Change XXX" is an event of receiving a user request to switch XXX (stream in the case of FIG. 15). When this event occurs while PSR1 is Invalid (Cj1 in FIG. 15A), PSR1 is set to a value requested by the user. Even if this set value shows a valid audio stream number, PSR1 is treated as Invalid. Thus, a PSR which is Invalid never changes to Valid by "Change XXX".

When "Change a Stream" occurs while PSR1 is Valid (Cj2), on the other hand, "Procedure when change is requested" is performed and a new value is assigned to PSR1. The value assigned to PSR1 here may not be the value requested by the user. This is because "Procedure when change is requested" has a function of excluding an invalid value. PSR1 which is Valid never changes to Invalid by "Change a Stream", since "Procedure when change is requested" ensures not to make PSR1 Invalid.

"Cross a PlayItem boundary" is an event where playback crosses over a PlayItem boundary. The PlayItem boundary refers to here is a point between an end of one PlayItem and a beginning of an immediately succeeding PlayItem. When this event occurs while PSR1 is Valid, "Procedure when playback condition is changed" is performed. After "Procedure when playback condition is changed", PSR1 either returns to Valid or moves to Invalid. Since an STN_table is provided for each PlayItem, playable elementary streams change when the current PlayItem changes. Accordingly, "Procedure when playback condition is changed" is performed for each PlayItem so as to set PSR1 to a value optimal for the PlayItem.

Figure 15B:
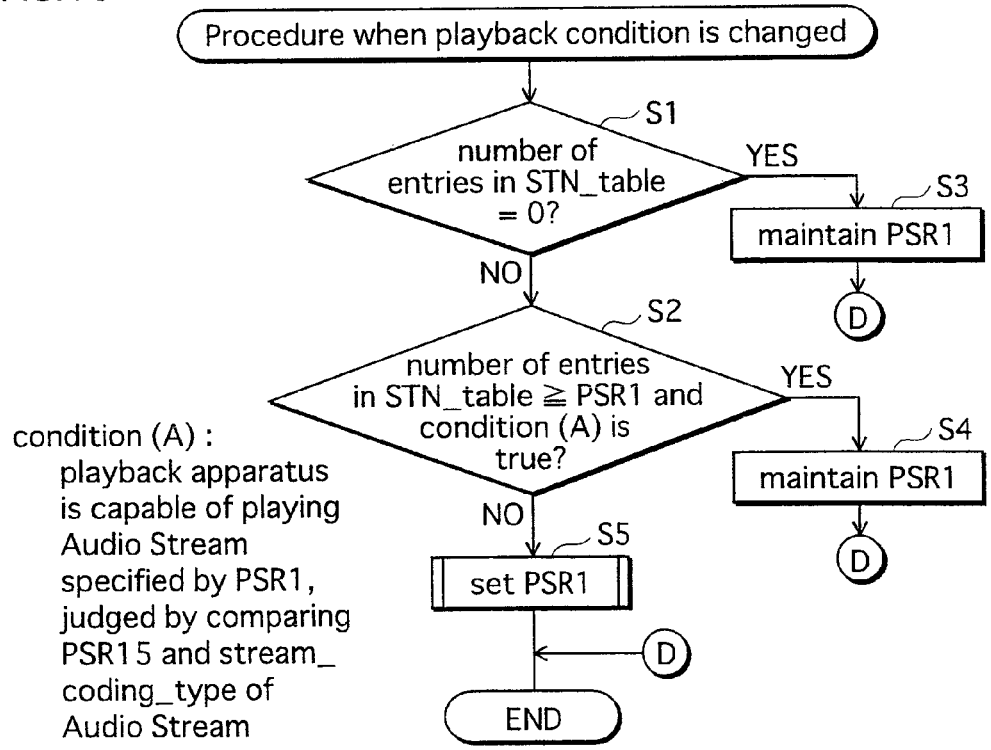
FIG. 15B is a flowchart of "Procedure when playback condition is changed" for PSR1.

FIG. 15B is a flowchart of "Procedure when playback condition is changed" for PSR1. This procedure sets PSR1 through a combination of two judgment steps S1 and S2.

First, a judgment is made as to whether the number of entries in the STN_table is 0 (S1). If the number of entries in the STN_table is 0, the value of PSR1 is maintained (S3).

When the number of entries in the STN_table is not 0, a judgment is made as to whether the number of entries in the STN_table is no smaller than PSR1 and also condition (A) is true (S2). Condition (A) is that the playback apparatus has a capability of playing an audio stream specified by PSR1. If the judgment in step S2 is YES, the value of PSR1 is maintained (S4). If PSR1 is greater than the number of entries in the STN_table or Condition (A) is false, PSR1 is set to a new value (S5).

FIG. 16 is a flowchart of a detailed procedure of step S5.

Steps S6 and S7 form a loop in which step S8 is performed for each audio stream listed in the STN_table. In this loop, an audio stream subjected to processing is called audio stream i. A judgment is made as to whether audio stream i satisfies three conditions (a), (b), and (c) (S8).

Condition (a) is that the playback apparatus has a capability of playing audio stream i. This judgment is made by comparing PSR15 and a stream_coding_type of audio stream i shown in the STN_table.

Condition (b) is that a language attribute of audio stream i is same as the language setting of the playback apparatus. This judgment is made by checking whether an audio_language_code of audio stream i shown in the STN_table matches PSR16.

Condition (c) is that a channel attribute of audio stream i is surround and the playback apparatus has a surround output capability. This judgment is made by comparing PSR15 with an audio_presentation_type and the stream_coding_type of audio stream i shown in the STN_table.

The following explains a case where condition (c) is satisfied, with reference to FIG. 17. FIG. 17 shows combinations of capabilities of the playback apparatus and stream attributes in a tabular form. The capabilities of the playback apparatus include stereo output and surround output. The stream attributes include stereo and surround.

When the playback apparatus has a stereo output capability and the attribute of audio stream i is stereo, audio stream i can be played back.

When the playback apparatus has a surround output capability and the attribute of audio stream i is stereo, audio stream i can be played back.

When the playback apparatus has a surround output capability and the attribute of audio stream i is surround, audio stream i can be played back.

When the playback apparatus has a stereo output capability and the attribute of audio stream i is surround, audio stream i can still be played back if the playback apparatus downmixes AC-3 (5.1 ch) to AC-3 (2 ch). Thus, audio stream i can be play back with any of the four combinations of the capabilities of the playback apparatus and the channel attributes of audio stream i. However, condition (c) is defined to be true only with one of the four conditions, namely, the playback apparatus has a surround output capability and the channel attribute of audio stream i is surround. Thus, a strict condition is given as condition (c).

Though condition (c) is defined to be true only with the above combination, this is merely one example, and condition (c) may be defined to be true also with the combination in which the playback apparatus has a stereo output capability and the channel attribute of audio stream i is stereo. In this case, if the playback apparatus is only capable of stereo output or has been set to prioritize stereo output over surround output, stereo playback of a 2 ch audio stream is selected over downmixed playback of a 5.1 ch audio stream.

Based on a pattern of conditions audio stream i satisfies, that is, which conditions and how many conditions audio stream i satisfies among the three conditions, a priority is given to audio stream i.

After the loop is performed for each audio stream, steps S9 to S13 are performed. A judgment is made as to whether no audio stream satisfies condition (a) (S9). If there is no audio stream which satisfies condition (a), PSR1 is set to the undefined value (0xFF) (S14).

A judgment is made as to whether there is any audio stream that satisfies all conditions (a), (b), and (c) (S10). If there is such an audio stream, PSR1 is set to a stream number of that audio stream (S15).

Here, if there are two or more audio streams that satisfy conditions (a), (b), and (c), these audio streams are equal in priority. In such a case, one of the audio streams is selected according to the order of entries in the STN_table (S15). Which is to say, if there are two or more audio streams that have a same combination of codec, language attribute, and channel attribute, one of the audio streams which has a highest entry in the STN_table is selected as a highest-priority audio stream.

Figure 18:
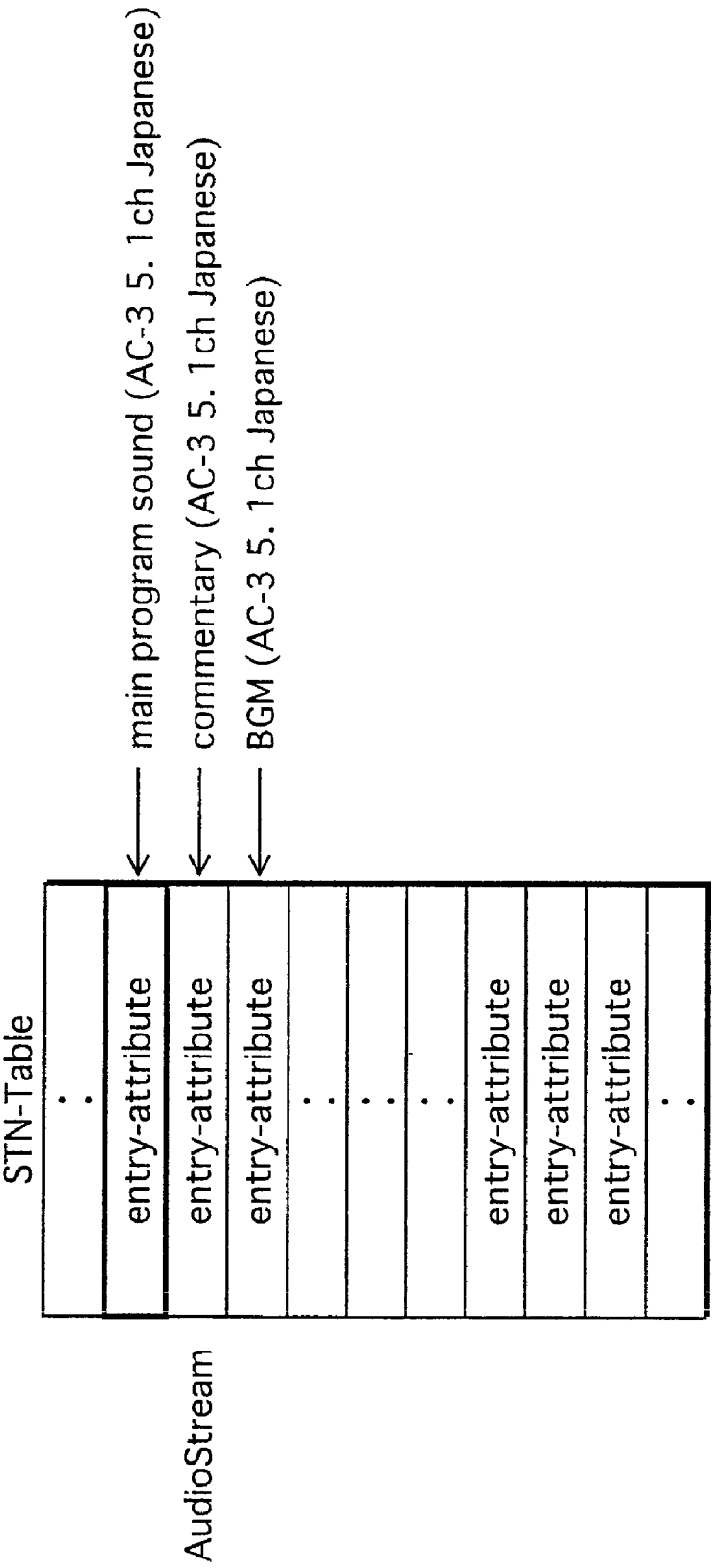
FIG. 18 shows audio stream selection based on an order of entries in an STN_table.

Suppose there are three audio streams that have a same combination of codec, language attribute, and channel attribute and respectively correspond to main program sound, commentary sound, and BGM. In this case, an entry of the audio stream corresponding to the main program sound is placed first in the STN_table, which is followed by an entry of the audio stream corresponding to the commentary sound and an entry of the audio stream corresponding to the BGM, as shown in FIG. 18. As a result, the main program sound is selected automatically over the commentary sound and the BGM.

Thus, by adjusting the order of audio stream entries in the STN_table, the author can exercise audio stream selection control, i.e. the author can specify which audio stream is selected for playback.

When there is no audio stream that satisfies all conditions (a), (b), and (c), a judgment is made as to whether there is any audio stream that satisfies conditions (a) and (b) (S11). If there is any audio stream that satisfies conditions (a) and (b), PSR1 is set to a stream number of an audio stream having a highest entry in the STN_table among the audio streams satisfying conditions (a) and (b) (S16).

When there is no audio stream that satisfies all conditions (a), (b), and (c) and no audio stream that satisfies conditions (a) and (b), a judgment is made as to whether there is any audio stream that satisfies conditions (a) and (c) (S12). If there is any audio stream that satisfies conditions (a) and (c), PSR1 is set to a stream number of an audio stream having a highest entry in the STN_table among the audio streams satisfying conditions (a) and (c) (S17).

When there is no audio stream that satisfies all conditions (a), (b), and (c), no audio stream that satisfies conditions (a) and (b), and no audio stream that satisfies conditions (a) and (c), a judgment is made as to whether there is any audio stream that satisfies condition (a) (S13). If there is any audio stream that satisfies condition (a), PSR1 is set to a stream number of an audio stream having a highest entry in the STN_table among the audio streams satisfying condition (a) (S18).

Figure 19:
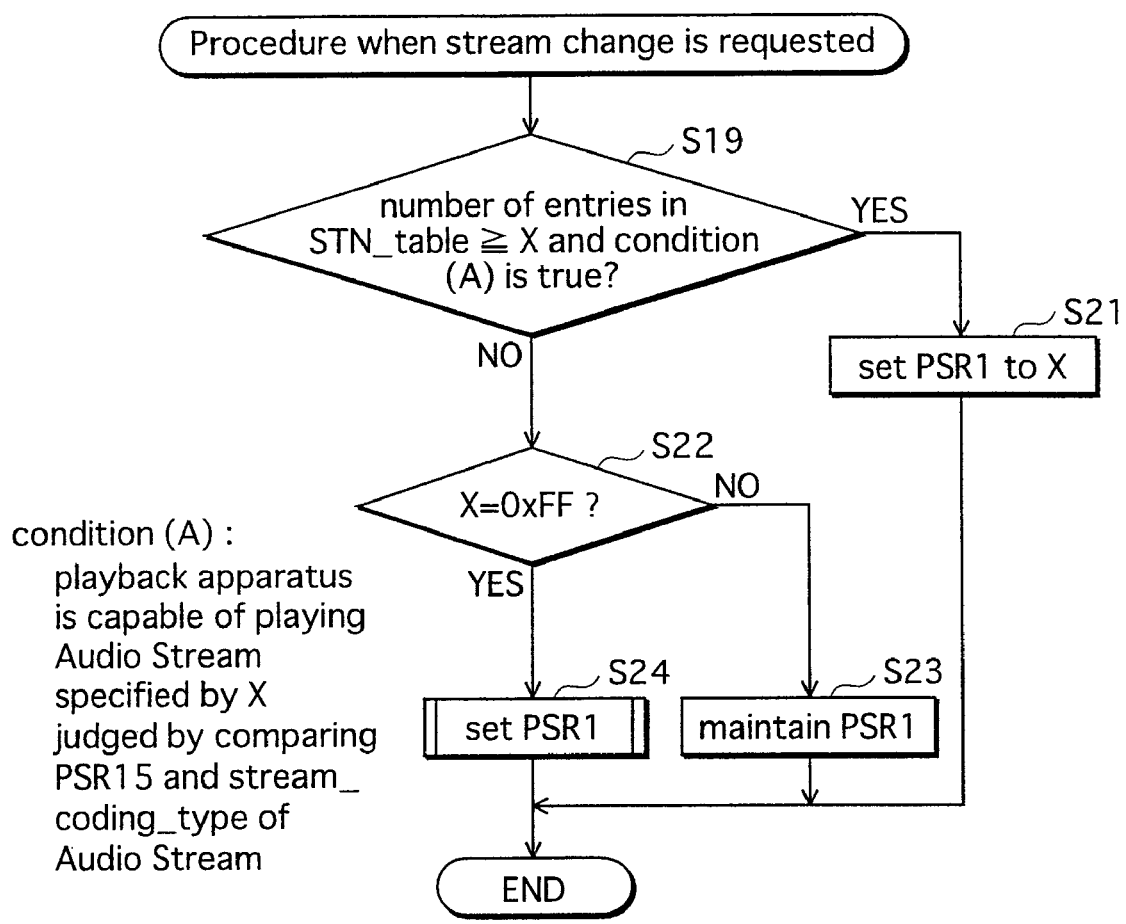
FIG. 19 is a flowchart of "Procedure when change is requested" for PSR1.

This completes "Procedure when playback condition is changed". The following describes "Procedure when change is requested". FIG. 19 is a flowchart of "Procedure when change is requested" for PSR1. The difference between this flowchart and the flowchart of FIG. 15B lies in that X is subjected to judgment instead of PSR1. The value X is based on user operation information output from the operation reception unit 29 or a button command output from the Interactive Graphics Decoder 13.

A judgment is made as to whether the number of entries in the STN_table is no smaller than X and also condition (A) is true (S19). Condition (A) is that the playback apparatus is capable of playing an audio stream specified by X. This judgment is made by comparing PSR15 and a stream_coding_type of the audio stream shown in the STN_table. If the judgment in step S19 is YES, PSR1 is set to X (S21).

If X is greater than the number of entries in the STN_table or condition (A) is false, a judgment is made as to whether X is 0xFF (S22). If X is not 0xFF, it means the audio stream number requested by the user is invalid, so that the value of PSR1 is maintained with the user-designated value X being ignored (S23).

If PSR1 is 0xFF, PSR1 is set to a new value (S24). A procedure of step 24 is similar to the procedure of step S5 shown in FIG. 16, except for the following. The judgment of step S9 is not needed in "Procedure when change is requested", because "Procedure when change is requested" maintains the value of PSR1 without setting PSR1 to the user-designated value X if there is no audio stream that satisfies any of conditions (a), (b), and (c).

According to the above "Procedure when playback condition is changed" and "Procedure when change is requested", an audio stream that is playable by the playback apparatus and that makes full use of both the features of the BD-ROM and the playback apparatus can be selected.

SPECIFIC EXAMPLES OF PSR1 SETTING

The procedures shown in the above flowcharts are explained using specific examples below.

In one specific example, the playback apparatus is a middle-level playback apparatus. The middle-level playback apparatus referred to here does not have a DTS decoding capability but has an LPCM decoding capability and an AC-3 surround output capability. Also, the language setting of the playback apparatus is Japanese.

Suppose the BD-ROM on which an STN_table shown in FIG. 20B is recorded is loaded to this playback apparatus. This STN_table lists entries of six audio streams.

This being the case, for each audio stream, a judgment is made as to whether conditions (a), (b), and (c) are satisfied in step S8 in FIG. 16. For example, audio stream 1 which is listed first in the STN_table satisfies only condition (a). Audio stream 2 which is listed second in the STN_table satisfies conditions (a) and (c).

The judgment on all audio streams reveals that audio stream 5 satisfies all conditions (a), (b), and (c), audio stream 4 satisfies conditions (a) and (b), audio stream 2 satisfies conditions (a) and (c), and audio stream 1 satisfies condition (a). The other audio streams are excluded from selection since they do not satisfy condition (a).

Based on this result, a highest priority is given to audio stream 5 that satisfies all conditions (a), (b), and (c), as shown in FIG. 20C. Hence audio stream 5 is selected and played together with a video stream.

In the above example, the audio stream that satisfies all conditions (a), (b), and (c) is selected. The following considers a case where the playback apparatus does not have a surround output capability. Suppose the playback apparatus does not have a surround output capability, and an AC-3 (2 ch) audio stream and an AC-3 (5.1 ch) audio stream are multiplexed in an AV Clip on the BD-ROM. According to FIG. 17, both of the audio streams are playable. Therefore, when these audio streams undergo the judgment in the procedure shown in FIG. 16, the audio streams will end up being equal in priority.

In such a case, the STN_table is referenced to select one of the audio streams. Even if the playback apparatus is incapable of surround output, the playback apparatus can still play back the AC-3 (5.1 ch) audio stream by downmixing it to AC-3 (3 ch). Such downmixing, however, may result in a lower audio quality at the time of playback than the one intended by the author. On the other hand, the AC-3 (2 ch) audio stream is originally intended for stereo output. In view of this, the author may prefer AC-3 (2 ch) playback to downmixed AC-3 (5.1 ch) playback.

In this case, the author places an entry of the AC-3 (2 ch) audio stream above an entry of the AC-3 (5.1 ch) audio stream in the STN_table.

As a result, the playback apparatus without a surround output capability plays not downmixed AC-3 (5.1 ch) audio but AC-3 (2 ch) audio. With regard to a bit rate, on the other hand, the AC-3 (5.1 ch) audio stream has a bit rate of 384 Kbps whereas the AC-3 (2 ch) audio stream has a bit rate of 192 Kbps. Thus, the AC-3 (5.1 ch) audio stream has a higher bit rate than the AC-3 (2 ch) audio stream. The author may consider this more important than the audio quality, and prefer downmixed AC-3 (5.1 ch) playback to AC-3 (2 ch) playback. In this case, the author places the entry of the AC-3 (5.1 ch) audio stream above the entry of the AC-3 (2 ch) audio stream in the STN_table.

As a result, the playback apparatus without a surround output capability plays not AC-3 (2 ch) audio but downmixed AC-3 (5.1 ch) audio.

The following gives an example of STN_table description and audio stream selection when the author prefers AC-3 (2 ch) playback to downmixed AC-3 (5.1 ch) playback, by referring to FIG. 21.

In this example, the playback apparatus does not have a surround output capability, so that PSR15 and PSR16 are set as shown in FIG. 21A. Meanwhile, the STN_table has the same contents as the one in FIG. 20B, as shown in FIG. 21B. In such a case, audio stream 4 and audio stream 5 that satisfy conditions (a) and (b) have the same priority "1", and audio stream 1 and audio stream 2 that satisfy condition (a) have the same priority "2". Since audio streams 4 and 5 are equal in priority, the playback apparatus selects one of audio streams 4 and 5 based on the order of entries in the STN_table. Since the author prefers AC-3 (2 ch) playback to downmixed AC-3 (5.1 ch) playback, the entry of the AC-3 (2 ch) audio stream is higher than the entry of the AC-3 (5.1 ch) audio stream in the STN_table shown in FIG. 21B. In other words, audio stream 4 has a higher entry than audio stream 5 in the STN_table. Therefore, the playback apparatus selects audio stream 4 and plays audio stream 4.

The following explains an example of STN_table description and audio stream selection when the author prefers downmixed AC-3 (5.1 ch) playback to AC-3 (2 ch) playback, by referring to FIG. 22.

Since the author prefers downmixed AC-3 (5.1 ch) playback, the AC-3 (5.1 ch) audio streams (audio streams 2 and 5) respectively have higher entries than the AC-3 (2 ch) audio streams (audio streams 1 and 4) in the STN_table shown in FIG. 22B. Which is to say, audio stream 5 is placed above audio stream 4 in the STN_table. Accordingly, when audio streams 4 and 5 satisfy the same conditions (a) and (b), the playback apparatus selects audio stream 5 and plays audio stream 5, as shown in FIG. 22C.

Thus, the author can determine which of AC-3 (2 ch) playback and downmixed AC-3 (5.1 ch) playback is performed when the playback apparatus does not have a surround output capability. This makes it possible to realize playback control that reflects the preference of the author. This concludes the description of the status control regarding PSR1.

<Status Transitions of PSR2>

Figure 23A:
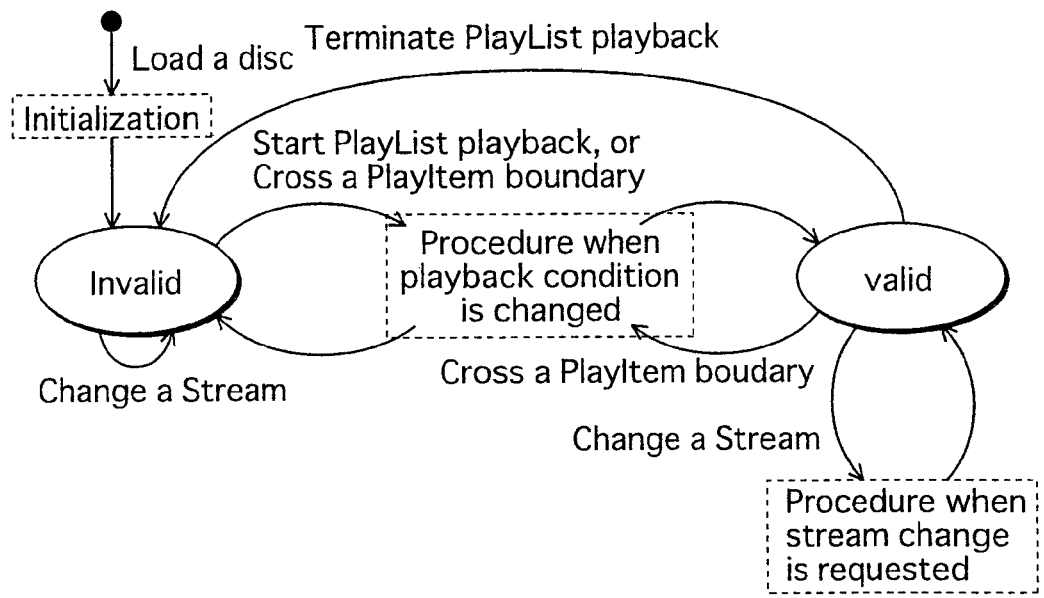
FIG. 23A shows status transitions that can be made by PSR2.
Figure 23B:
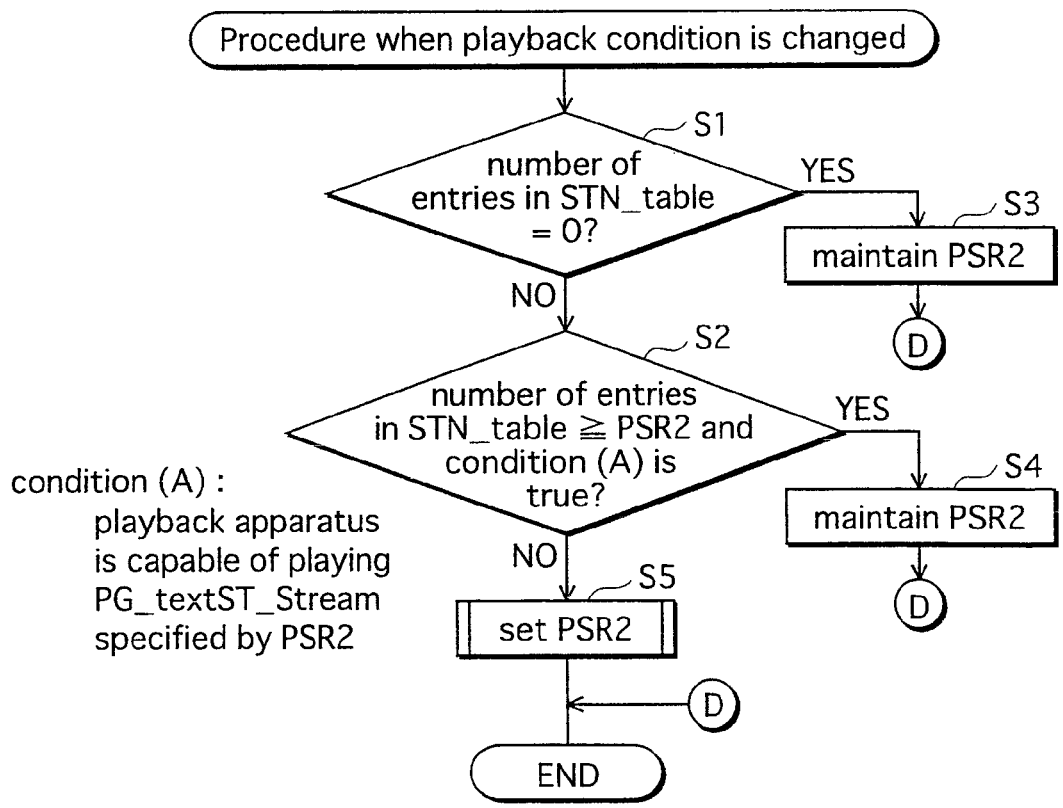
FIG. 23B is a flowchart of "Procedure when playback condition is changed" for PSR2.
Figure 24:
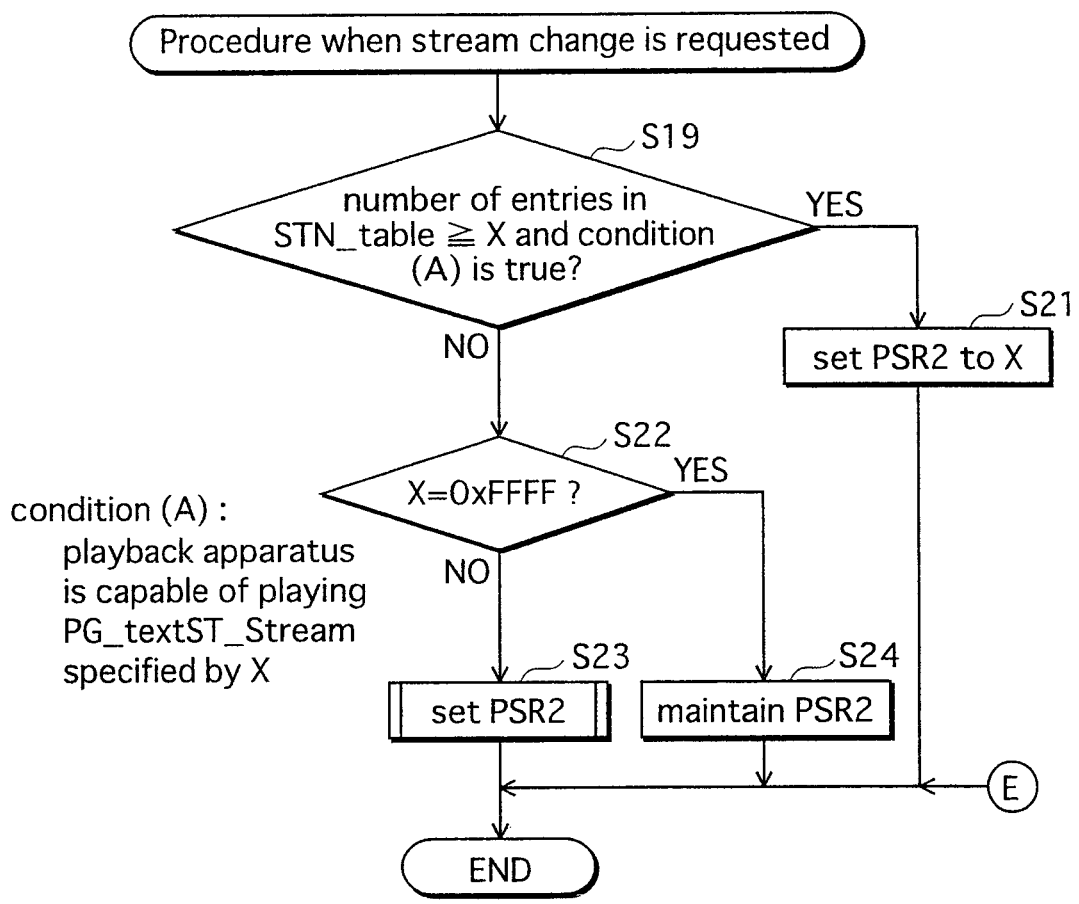
FIG. 24 is a flowchart of "Procedure when change is requested" for PSR2.

The following describes PSR2. PSR2 is used to specify which of a plurality of PG streams and textST streams listed as entries in the STN_table of the current PlayItem is to be played. When PSR2 is changed, the playback apparatus plays back a PG stream or a textST stream specified by the changed PSR2. PSR2 is initially set to an undefined value, and can be set to one of the values 1 to 255 by the playback apparatus. The undefined value is 0xFFFF, indicating that no PG stream or textST stream is present or no PG stream or textST stream is selected. The values 1 to 255 are interpreted as PG_textST_ stream numbers. FIG. 23A shows status transitions that can be made by PSR2. The status transitions shown in FIG. 23A are same as those shown in FIG. 15A. FIG. 23B is a flowchart of "Procedure when playback condition is changed" for PSR2, and FIG. 24 is a flowchart of "Procedure when change is requested" for PSR2. These flowcharts are respectively similar to those in FIGS. 15B and 19, but substantially differ in a PSR2 setting procedure in steps S5 and S23.

Figure 25:
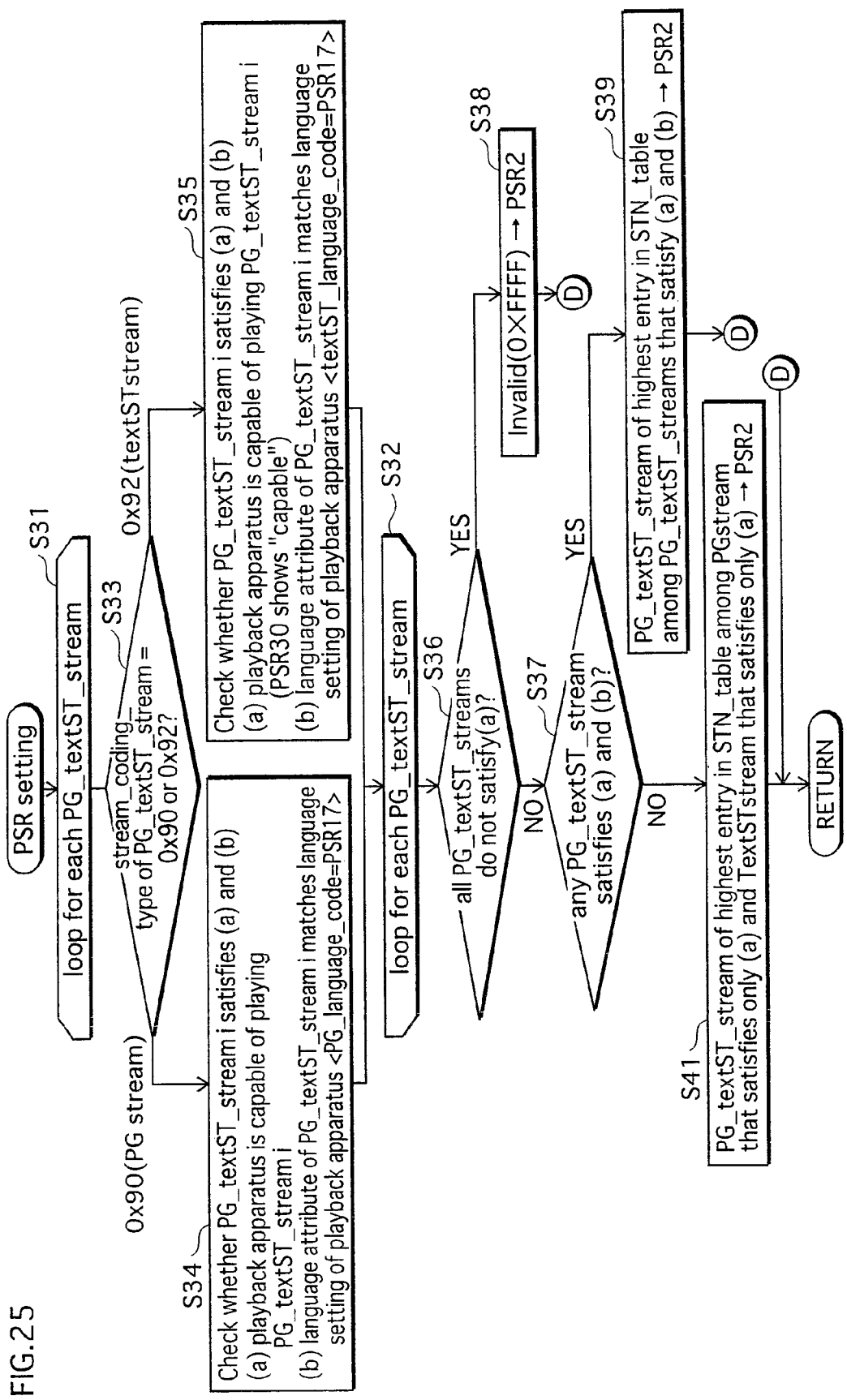
FIG. 25 is a flowchart of an operation of setting PSR2.

FIG. 25 is a flowchart of the PSR2 setting procedure.

In the drawing, steps S31 and S32 form a loop in which steps S33 to S35 are performed for each PG_textST_stream listed in the STN_table. In this loop, the PG_textST_stream subjected to processing is called PG_textST_stream i. A judgment is made as to whether a stream_coding_type of PG_textST_stream i shown in the STN_table is 0x90 or 0x92 (S33). If the stream_coding_type is 0x90, the procedure advances to step S34.

A judgment is made as to whether PG_textST_stream i satisfies the following conditions (a) and (b) (S34).

Condition (a) is that the playback apparatus is capable of playing PG stream i.

Condition (b) is that a language attribute of PG stream i matches the language setting of the playback apparatus.

The judgment for condition (b) is made by checking whether a PG_language_code of PG stream i shown in the STN_table matches PSR17.

If the stream_coding_type is 0x92, a judgment is made as to whether PG_textST_stream i satisfies the following conditions (a) and (b) (S35).

Condition (a) is that the playback apparatus is capable of playing textST stream i.

Condition (b) is that a language attribute of textST stream i matches the language setting of the playback apparatus.

The judgment for condition (a) is made by checking whether PSR30 shows "capable". The judgment for condition (b) is made by checking whether a textST_language_code of textST stream i shown in the STN_table matches PSR17.

After steps S33 to S35 are performed for all PG_textST_ streams, the procedure advances to steps S36 to S41.

A judgment is made as to whether there is no PG_textST_ stream that satisfies condition (a) (S36). If there is no PG_textST_stream that satisfies condition (a), PSR2 is set to an invalid value (0xFFFF) (S38).

A judgment is made as to whether there is any PG_textST_ stream that satisfies conditions (a) and (b) (S37). If there is such a PG_textST_stream, PSR2 is set to a stream number of a PG_textST_stream having a highest entry in the STN_table among PG_textST_streams satisfying conditions (a) and (b) (S39).

If the judgment in step S37 is NO, PSR2 is set to a stream number of a stream having a highest entry in the STN_table among PG streams satisfying condition (a) and textST_ streams satisfying condition (a) (S41). The procedure of this flowchart is explained in more detail below, using specific examples.

SPECIFIC EXAMPLES OF PSR2 SETTING

In one specific example, the playback apparatus is capable of decoding a PG stream but incapable of decoding a textST stream, as shown in FIG. 26A. Also, the language setting of the playback apparatus is Japanese.

Suppose the BD-ROM on which an STN_table shown in FIG. 26B is recorded is loaded to this playback apparatus. The STN_table has entries of two textST streams (PG_textST_ streams 1 and 3) and two PG streams (PG_textST_streams 2 and 4).

This being the case, steps S34 and S35 are performed to judge, for each PG_textST_stream, whether conditions (a) and (b) are satisfied, as shown in FIG. 26C. Here, PG_textST_ streams 1 and 3 do not satisfy condition (a), PG_textST_ stream 2 satisfies only condition (a), and PG_textST_stream 4 satisfies both conditions (a) and (b).

The judgment on all PG_textST_streams in the STN_table reveals that PG_textST_stream 4 satisfies conditions (a) and (b) and PG_textST_stream 2 satisfies condition (a). PG_textST_streams 1 and 3 do not satisfy condition (a) and so are excluded from selection.

As a result, PG_textST_stream 4 is given a highest priority.

If there are two or more PG_textST_streams that satisfy same conditions, on the other hand, these PG_textST _ streams are equal in priority. In such a case, one of the PG_textST_streams is selected based on the order of entries in the STN_table.

A specific example of PG_textST_stream selection according to the order of entries in the STN_table is given below, by referring to FIG. 27. In this specific example, the playback apparatus is capable of decoding both a PG stream and a textST stream. When there are a PG stream and a textST stream that have a language attribute which matches the language setting of the playback apparatus, the PG stream and the textST stream are equal in priority. In this case, the author places an entry of a preferred stream above an entry of the other stream in the STN_table. If the author prefers the textST stream to the PG stream, the author places an entry of the textST stream above an entry of the PG stream in the STN_table. As a result, the textST stream is selected automatically over the PG stream.

Thus, by adjusting the order of entries in the STN_table, the author can exercise selection control of which stream is to be selected at the time of playback.

<Modifications>

The first embodiment describes the case where if X is invalid in "Procedure when change is requested", the transition control unit 30 maintains the value of PSR1 or PSR2. This process is not desirable, however, in the case where the user presses the audio switch key or the subtitle switch key. When the audio switch key or the subtitle switch key is pressed, X should be PSR+1. If, despite this, the value of PSR1 or PSR2 is maintained on the ground that X is invalid, the user may think that the playback apparatus malfunctions.

In view of this, when the audio switch key or the subtitle switch key is pressed, the transition control unit 30 performs the following process in addition to "Procedure when change is requested". In this process, when executing "Procedure when change is requested", the value of the PSR before "Procedure when change is requested" is compared with the value of the PSR after "Procedure when change is requested". If the two values are equal, X is incremented by 1, and "Procedure when change is requested" is performed again. X is incremented until the value of the PSR is updated by "Procedure when change is requested".

Once the value of the PSR has been updated by "Procedure when change is requested", the comparison of the two values results in a mismatch. The value of the PSR obtained by "Procedure when change is requested" at this point is used for stream selection.

This process is explained briefly below, using a specific example where PSR1 is set to 3 and stream numbers 4 and 5 are invalid. The transition control unit 30 adds 1 to PSR1, and sets 4 as X. The transition control unit 30 then performs "Procedure when change is requested". Since the stream number 4 is invalid, PSR1 remains 3. When PSR1 is unchanged like this, the transition control unit 30 increments X by 1, to thereby set X to 5. Having done so, the transition control unit 30 performs "Procedure when change is requested" again. Since the stream number 5 is invalid, PSR1 remains 3. When PSR1 is unchanged like this, the transition control unit 30 increments X by 1, to thereby set X to 6. Having done so, the transition control unit 30 performs "Procedure when change is requested" again. Since the stream number 6 is valid, the stream number 6 is automatically selected as a result of "Procedure when change is requested". By performing the above process when the audio switch key is pressed, smooth audio switching can be achieved without making the user notice the existence of an invalid stream number.

Second Embodiment

Figure 28:
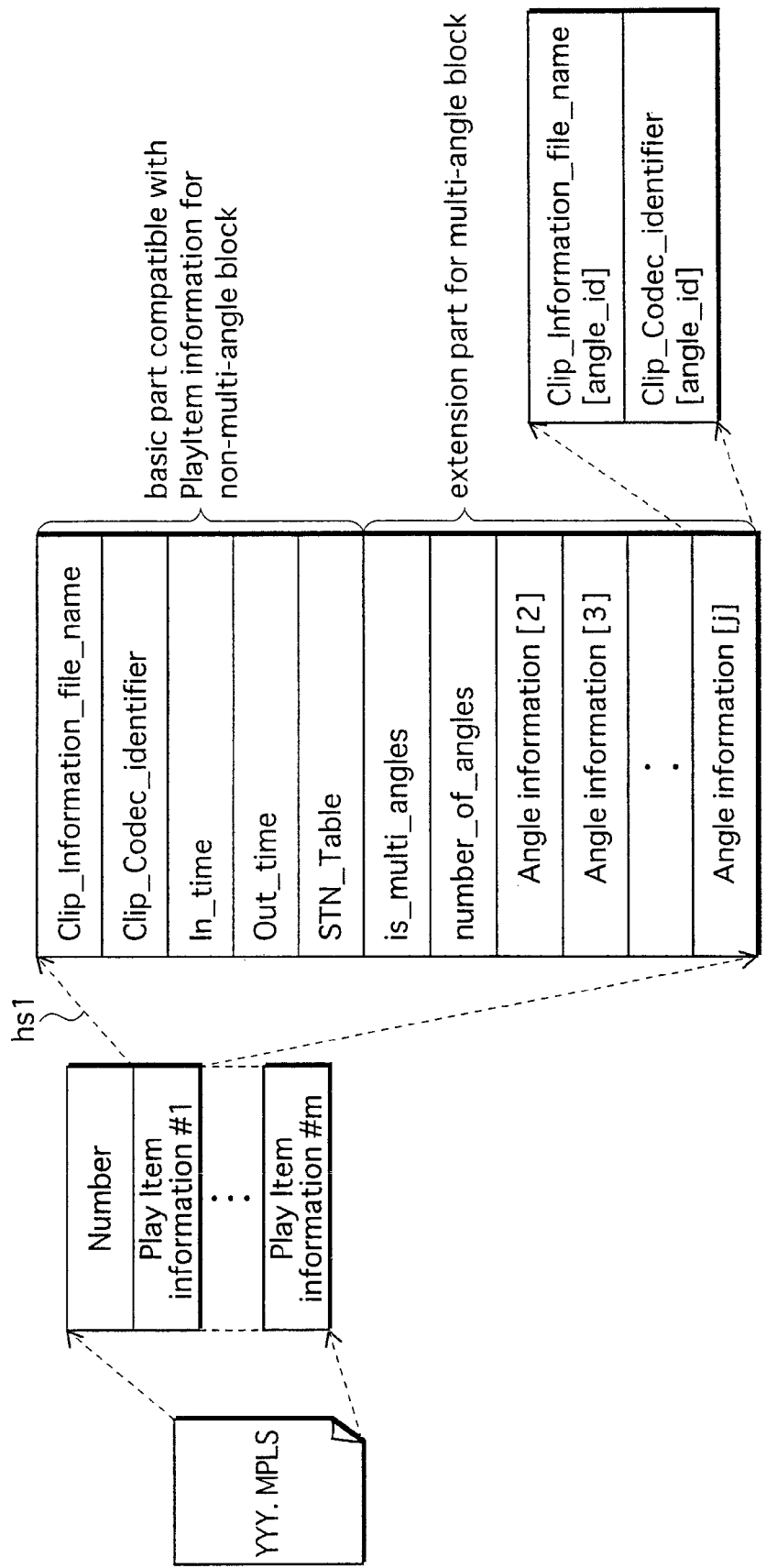
FIG. 28 shows a structure of PlayList information in a second embodiment of the present invention.

A second embodiment of the present invention relates to status settings for multi-angle blocks. A data structure for realizing a multi-angle block can be provided in the PlayItem information shown in FIG. 5. FIG. 28 shows a data structure of PlayItem information corresponding to a multi-angle block. In the drawing, the PlayItem information is made up of a basic part that is compatible with PlayItem information corresponding to a non-multi-angle block, and an extension part for realizing the multi-angle block. The basic part has a same data structure as the one shown in FIG. 5, and includes a Clip_Information_file_name field, a Clip_codec_identifier field, an IN_time field, an OUT_time field, and an STN_table field. In the multi-angle block, an AV Clip specified by this basic part is treated as a first angle block. In this way, even if a playback apparatus that does not support multi-angle (a playback apparatus that corresponds only to a BD-RE data structure) reads PlayItem information corresponding to a multi-angle block, the playback apparatus can play the first angle block by referencing the basic part. Meanwhile, the extension part is made up of an is_multi_angles field, a number_of_angles field, and Angle information [2], ..., [j].

The is_multi_angles field shows whether a playback section corresponding to the PlayItem information is a multi-angle block or a non-multi-angle block.

The number_of_angles field shows, when the is_multi_angles field shows a multi-angle block, the number of angles in the multi-angle block.

The Angle information [2], ..., [j] is information for each individual angle block in the multi-angle block, and includes a Clip_Information_file_name field and a Clip_codec_identifier field.

The Clip_Information_file_name field shows a filename of an AV Clip that forms the angle block.

The Clip_codec_identifier field shows a coding method of the AV Clip specified by the filename shown by the Clip_Information_file_name field in the Angle information.

As shown in the drawing, the Angle information does not have an IN_time field and an OUT_time field. This is because a beginning and end of each angle block except the first angle block are specified by the IN_time field and the OUT_time field in the basic part. In other words, a playback time of the AV Clip specified by the Clip_Information_file_name field in the Angle information needs to be same as a playback time of the AV Clip specified by the Clip_Information_file_name field in the basic part. Also, time stamps (System Time Clock) which specify presentation timings on the AV Clip playback time axis need to be equal for the two AV Clips.

Figure 29:
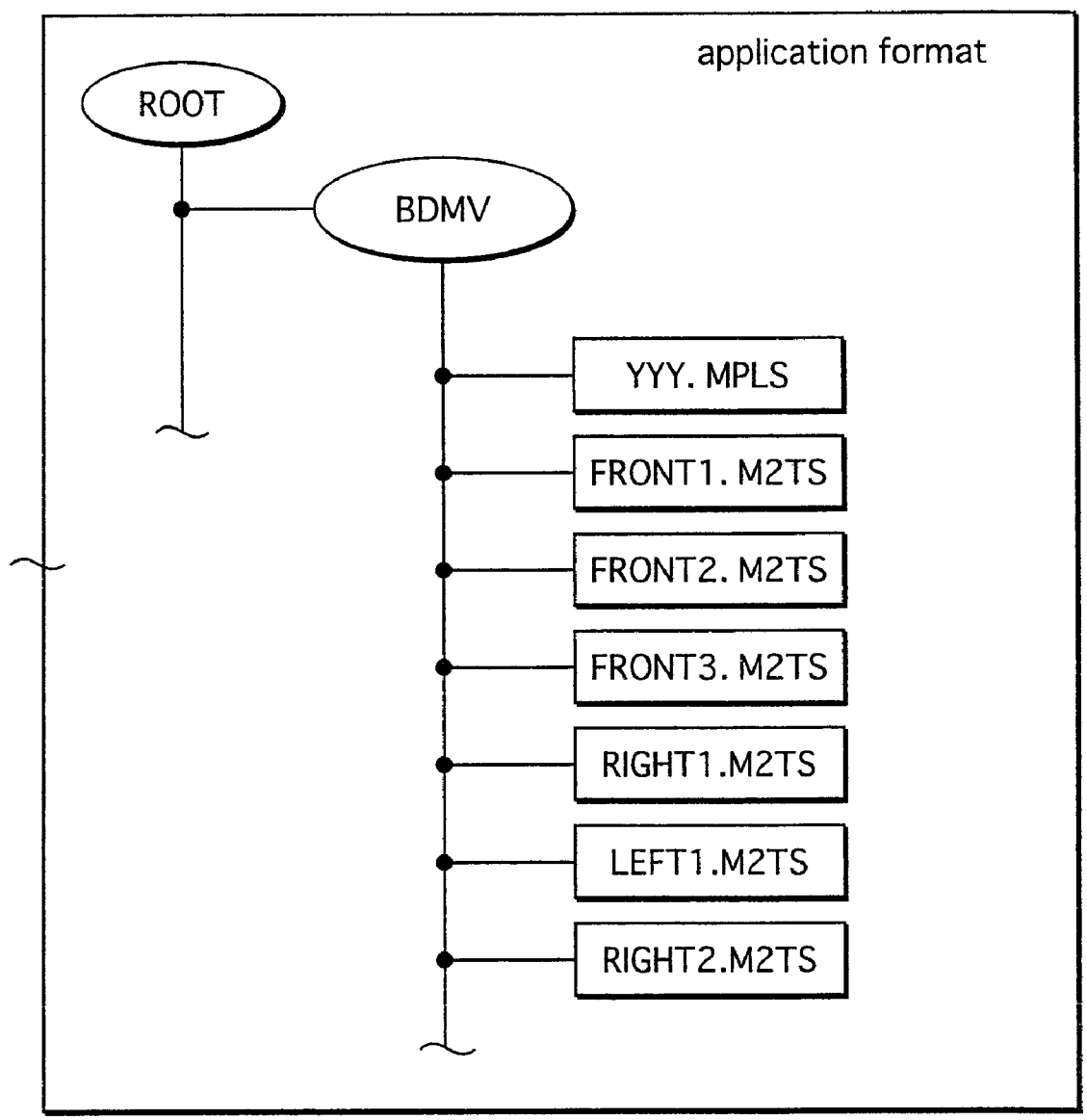
FIG. 29 shows a file structure in the second embodiment.

A specific example of a PlayItem corresponding to a multi-angle block is given below. In this specific example, three PlayItems (PlayItems #1, #2, and #3) are used. Of these PlayItems, PlayItems #1 and #3 constitute multi-angle blocks, whereas PlayItem #2 constitutes a non-multi-angle block. Also, a plurality of AV Clips shown in FIG. 29 (FRONT1, RIGHT1, LEFT1, FRONT2, FRONT3, and RIGHT 2) are recorded on the BD-ROM. Clip_Information_file_names of PlayItem #1 specify FRONT1, LEFT1, and RIGHT1, a Clip_Information_file_name of PlayItem #2 specifies FRONT2, and Clip_Information_file_names of PlayItem #3 specify FRONT3 and RIGHT2. These PlayItems define a main path that is made up of a multi-angle block, a non-multi-angle block, and a multi-angle block in this order. FIGS. 30A and 30B show the multi-angle blocks and non-multi-angle block defined in this way. In the drawing, arrows my1 and my2 indicate designation by two sets of Angle information in PlayItem #1, and arrow my3 indicates designation by one set of Angle information in PlayItem #3. According to the designation my1 and my2 by the two sets of Angle information in PlayItem #1, one of RIGHT1 and LEFT1 can be selected for playback instead of part of the AV Clip. Likewise, according to the designation my3 by the set of Angle information in PlayItem #3, RIGHT2 can be selected for playback instead of part of the AV Clip.

FIG. 30B shows a progress of playback of the multi-angle blocks and non-multi-angle block. As indicated by arrows ag1, ag2, and ag3, one of the three angle blocks can be selected in multi-angle block 1. Also, as indicated by arrows ag4 and ag5, one of the two angle blocks can be selected in multi-angle block 3. This concludes the description of the improvements in the recording medium of the second embodiment.

The following describes improvements in the playback apparatus of the second embodiment. In the playback apparatus, PSR3 specifies an angle block. In the second embodiment, the control unit 24 controls angle block selection and playback according to PSR3.

In detail, the control unit 24 references PSR3, upon playback of the current PlayItem in the current PlayList. If PSR3=1, the control unit 24 controls the BD-ROM drive 1 to access an AV Clip specified by a Clip_Information_file_name in the basic part of the current PlayItem and read TS packets of the AV Clip from an IN_time to an OUT_time in the current PlayItem. The read TS packets are fed to the Video Decoder 4 to play an angle block.

If PSR3 is 2 or more, the control unit 24 controls the BD-ROM drive 1 to access an AV Clip (aforementioned RIGHT1, LEFT1, or RIGHT2) specified by a Clip_Information_file_name in Angle Information in the extension part of the current PlayItem, and read TS packets of the AV Clip. The read TS packets are fed to the Video Decoder 4 to play an angle block. Thus, by accessing a different AV Clip depending on the value of PSR3, selective playback of angle blocks can be achieved.

PSR3 which specifies an angle block is explained below. FIG. 31 shows settings of PSR3. PSR3 specifies a number of an angle block that is currently selected. PSR3 takes one of the values 1 to 9, to specify one of angle blocks 1 to 9.

Status transitions of PSR3 are explained below. FIG. 32A shows status transitions that can be made by PSR3. When comparing this drawing with FIG. 15A, it can be understood that there is no status transition triggered by "Cross a PlayItem boundary". Also, "Start PlayList playback" and "Terminate PlayList playback" have been replaced respectively with "Start PlayItem with multi angle structure" and "End of a PlayItem with multi angle structure". Further, "Procedure when change is requested" has been changed from "stream change is requested" to "angle change is requested". Apart from these differences, the status transitions of PSSR3 are same as those shown in FIG. 15A.

The number of audio streams differs for each PlayItem. Accordingly, when playback of a PlayList starts and each time the playback crosses a PlayItem boundary, "Procedure when playback condition is changed" needs to be performed to set PSR1. On the other hand, PSR3 is used only in a multi-angle block, and so there is no need to perform "Procedure when playback condition is changed" each time a PlayItem, boundary is crossed. Therefore, a status transition from Invalid to Valid is triggered by a start of playback of a multi-angle block, and a status transition from Valid to Invalid is triggered by an end of playback of a multi-angle block.

In this embodiment, the value of PSR3 is maintained upon the status transition from Valid to Invalid. Which is to say, when a multi-angle block and a non-multi-angle block appear alternately (e.g. FIG. 30), only the state of PSR3 is changed from Valid to Invalid and vice versa, without changing the value of PSR3. This concludes the description of the status transitions of PSR3. The following describes "Procedure when playback condition is changed" and "Procedure when change is requested" for PSR3.

FIG. 32B is a flowchart of "Procedure when playback condition is changed" for PSR3. This flowchart has a similar algorithm to the one shown in FIG. 15B. A judgment is made as to whether the number of angles in the current PlayItem is no smaller than PSR3 (S51). If the number of angles in the current PlayItem is no smaller than PSR3, the value of PSR3 is maintained (S53). Otherwise, PSR3 is set to an initial value "1" (S52).

FIG. 32C is a flowchart of "Procedure when change is requested" for PSR3. This flowchart has a similar algorithm to the one shown in FIG. 19. A judgment is made as to whether the number of angles in the current PlayItem is no smaller than X (S54). If the number of angles in the current PlayItem is no smaller than X, PSR3 is set to X (S57). Otherwise, the value of PSR3 is maintained (S55).

Angle block selection performed when playing the multi-angle block, the non-multi-angle block, and the multi-angle block in this order according to the three PlayItems shown in FIG. 30 is explained below, by referring to FIG. 33.

Figure 33A:
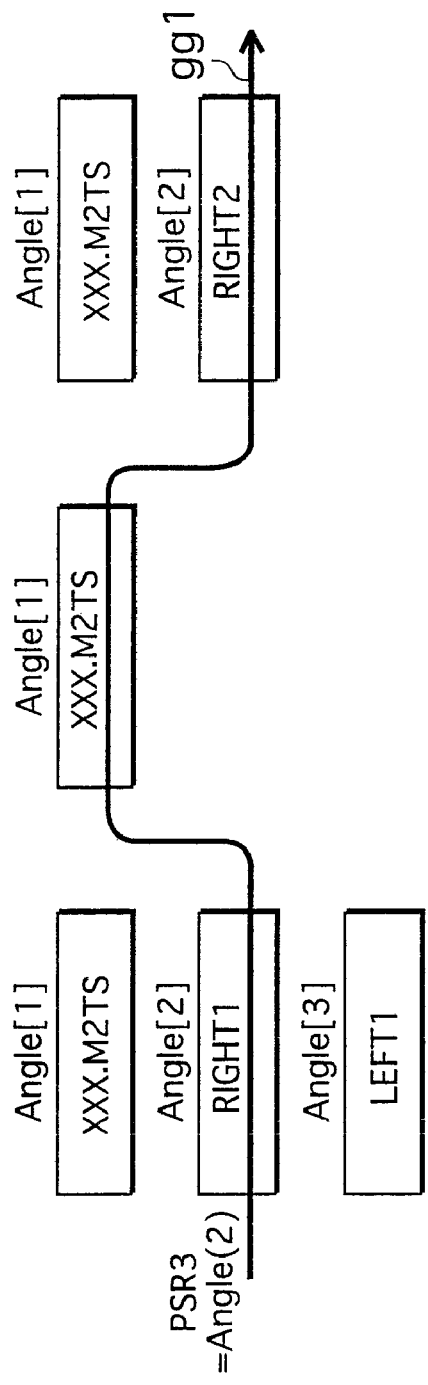
FIGS. 33A and 33B show how angle blocks are selected.

In FIG. 33A, PSR3 is set to 2. This being so, when playback of PlayItem #1 starts, the control unit 24 selects an angle block (RIGHT1) specified by PSR3=2 and plays the selected angle block. Once the playback of RIGHT1 ends, PSR3 is changed to Invalid while being held at 2.

Multi-angle block #1 specified by PlayItem #1 is followed by non-multi-angle block #2 specified by PlayItem #2. Since this is a non-multi-angle block, PSR3 remains Invalid. Which is to say, PSR3 is treated as Invalid while being held at 2. Since PSR3 is Invalid, the control unit 24 plays part of the AV Clip (XXX.M2TS) from an IN_time to an OUT_time of PlayItem #2, irrespective of the value of PSR3.

Non-multi-angle block #2 is followed by multi-angle block #3 specified by PlayItem #3. When playback of multi-angle block #3 begins, PSR3 is changed from Invalid to Valid while being held at 2. Since PSR3 becomes Valid, an angle block specified by PSR3 is selected. Here, PSR3=2, so that the control unit 24 selects an angle block (RIGHT2) specified by PSR3=2 and plays the selected angle block. Arrow gg1 in FIG. 33A indicates a course of angle block selection described above.

Figure 33B:
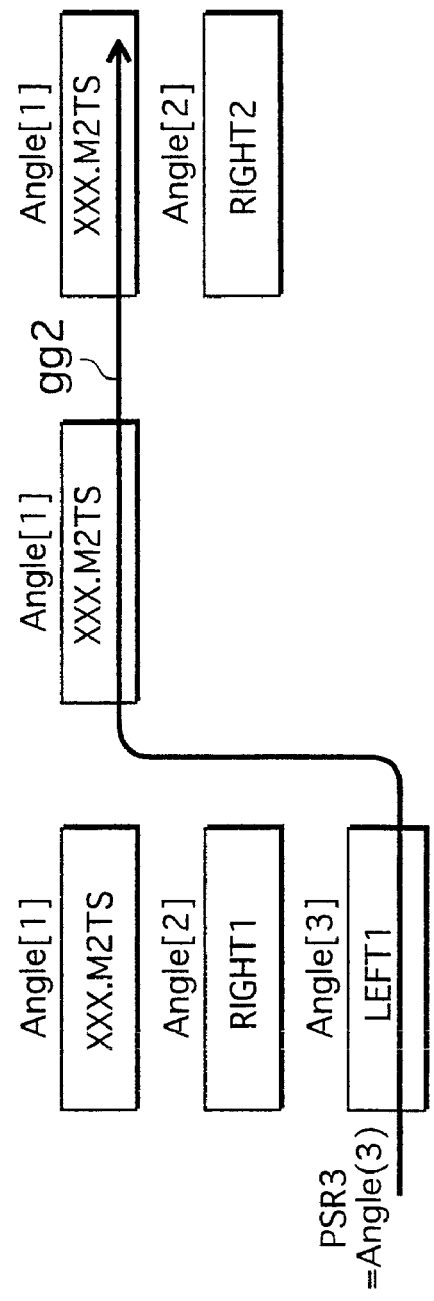

The above concerns the case where PSR3 is set to 2. The following explains the case where PSR3 is set to 3. In FIG. 33B, playback of multi-angle block #1 is performed as in FIG. 33A. After this, PSR3 is changed to Invalid while being held at 3 as a result of the status transition shown in FIG. 32A, and playback of non-multi-angle block #2 is performed in this state. After the playback of non-multi-angle block #2, playback of multi-angle block #3 starts. Since this is the "Start PlayItem with multi angle structure" event, "Procedure when playback condition is changed" is performed. In step S51 in FIG. 32B, a judgment is made as to whether PSR3 exceeds the number of angles in PlayItem #3. Since the number of angles in PlayItem #3 is 2, PSR3=3 exceeds the number of angles. Accordingly, PSR3 is set to 1 (S52). As a result, the AV Clip XXX.M2TS corresponding to the first angle block in PlayItem #3 is selected and played back, as shown in FIG. 33B. Arrow gg2 in FIG. 33B indicates a course of angle block selection in this case.

According to the second embodiment, PSR3 makes such status transitions that avoid selecting a nonexistent angle block. Accordingly, even when switching from a multi-angle block to a non-multi-angle block and vice versa occur frequently, a wrong number will not be set in PSR3. This ensures the accuracy in angle selection, with it being possible to facilitate distribution of movie films that incorporate multi-angle.

Third Embodiment

A third embodiment of the present invention relates to status settings when executing an interactive function. The interactive function referred to here provides a plurality of Pages, places graphics Button members on each Page, and receives a user operation. When executing the interactive function, this embodiment performs status settings about which Page is to be displayed and which Button on that Page is to be focused.

<Data Structure for the Interactive Function>

A data structure for displaying a plurality of Pages and Buttons can be provided in the IG stream described in the first embodiment. The IG stream is explained below, with reference to FIG. 34. The IG stream includes an ICS, a PDS, and an ODS. The ODS is graphics data for displaying a Button graphically. The PDS is pallet data for specifying a color of the Button.

The ICS is control information for displaying a Page synchronously with a moving picture. The synchronization with the moving picture is designated by a DTS and a PTS in a PES packet carrying the ICS. That is, the DTS in the PES packet carrying the ICS shows a beginning of a period during which the interactive function is valid (a period during which the ICS is Valid).

Arrow cu1 in FIG. 34 indicates a structure of the ICS in detail. As illustrated, the ICS includes a loading_model field, a user_interface_model field, a composition_time_out_pts field, a selection_time_out_pts field, a user_time_out_duration field, and page information (1), (2), ..., (i), ..., (n) which each correspond to a different one of a plurality of Pages available for presentation.

The loading_model field shows whether the IG stream is multiplexed in the AV Clip or is preloaded in the playback apparatus separately from the AV Clip.

The user_interface_model field shows whether a Page is constantly displayed (Always-on) or popped up based on a user operation (Pop-up), during the playback of the moving picture.

The composition_time_out_pts field shows an end of the period during which the interactive function is valid.

The user_time_out_duration field shows a period of time after which Page display is to time-out if there is no user operation.

The page information is explained below. Arrow cu2 in FIG. 34 indicates a structure of the page information in detail. As illustrated, the page information includes a page_id field, a UO_mask_table field, an in_effects field, an out_effects field, an animation_frame_rate_code field, a default_selected_button_id_ref field, a default_activated_button_id_ref field, a pallet_id_ref field, and button_info (1), (2), . . . , (i), . . . , (n) each corresponding to a different one of a plurality of Buttons.

The page_id field shows an identifier uniquely identifying a Page corresponding to the page information.

The UO_mask_table field shows permissions/prohibitions of user operations in a Display Set (DS) to which the ICS belongs. If this mask field is set to "Prohibited" for a user operation, that user operation to the playback apparatus is invalid.

The in_effects field shows a display effect to be presented immediately before the Page is displayed.

The out_effects field shows a display effect to be presented immediately after the Page is removed from display.

The animation_frame_rate_code field shows a frame rate to be applied to an animated Button.

The default_selected_button_id_ref field shows whether a Button to be set in a selected state as default when the presentation of the Interactive Display (Page) begins is determined dynamically or statically. When this field is set to 0xFF, the Button to be set in the selected state as default is determined dynamically. In this case, a PSR in the playback apparatus is used preferentially, so that a Button specified by PSR10 is put in the selected state. When this field is not set to 0xFF, on the other hand, the Button to be set in the selected state is determined statically. In this case, PSR10 is set to a button number shown by the default_selected_button_id_ref, and a Button specified by PSR10 is put in the selected state.

The default_activated_button_id_ref shows a Button to be automatically set in an activated state if the user does not activate any Button before a time defined by the selection_time_out_pts. When this field is set to FF, the Button currently in the selected state is automatically set in the activated state at the time defined by the selection_time_out_pts. When this field is set to 00, no Button is auto-activated. When this field is set to a value that is neither 00 nor FF, the value is interpreted as a valid button number specifying a Button to be auto-activated.

The pallet_id_ref field shows an identifier of a Pallet to be set in a CLUT unit for producing the Interactive Display.

Figure 35:
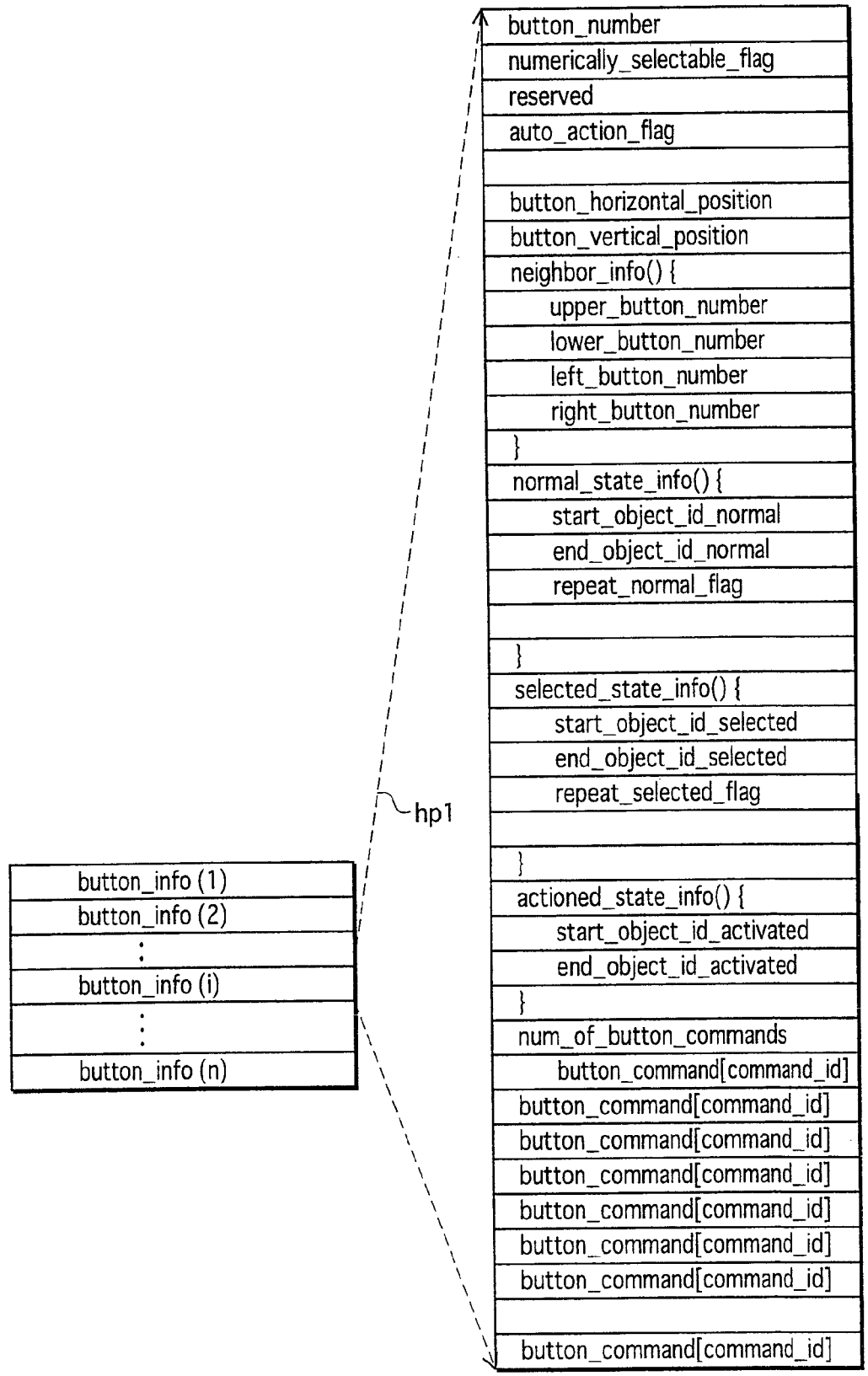
FIG. 35 shows a structure of button_info.

The button_info field defines a Button to be presented on the Interactive Display. FIG. 35 shows a structure of the button_info. Guideline hp1 in the drawing shows a structure of button_info i of Button i controlled by the ICS, in detail. Each individual Button presented on the Page has three states that are a normal state, a selected state, and an activated state. The normal state is a state where the Button is simply displayed. The selected state is a state where the Button is focused according to a user operation but the selection of the Button is not confirmed yet. The activated state is a state where the selection of the Button has been confirmed. Since Button i has these three states, button_info i has the following fields.

A button_number field specifies a number uniquely identifying Button i in the ICS.

A numerically_selectable_flag field shows a flag indicating whether numeric selection is available for Button i.

An auto_action_flag field shows whether Button i is to be automatically set in the activated state. When the auto_action_flag field is set to ON (bit value "1"), Button i is changed not to the selected state but directly to the activated state, when Button i becomes selected. If the auto_action_flag field is set to OFF (bit value "0"), Button i is changed not directly to the activated state but to the selected state, when Button i becomes selected.

A button_horizontal_position field and a button_vertical_position field respectively show a horizontal position and a vertical position of a top left pixel of Button i in the Interactive Display.

An upper_button_number field shows a button number of a Button to receive the selected state when a user operation of pressing the Move Up key is made while Button i is in the selected state. If this field shows the button number of Button i, then a user operation of pressing the Move Up key is ignored.

A lower_button_number field, a left_button_number field, and a right_button_number field respectively show button numbers of Buttons to receive the selected state when user operations of pressing the Move Down key, the Move Left key, and the Move Right key are performed while Button i is in the selected state. If any of these fields shows the button number of Button i, then a corresponding user operation is ignored.

A start_object_id_normal field specifies a beginning one of object_ids that are serially assigned to a sequence of ODSs used to present the normal state of Button i in animation.

An end_object_id_normal field specifies a last one of the object_ids that are serially assigned to the sequence of ODSs used to present the normal state of Button i in animation. If the end_object_id_normal field specifies the same ID as the start_object_id_normal field, a static image of a graphics Object identified by this ID is presented as Button i.

A repeat_normal_flag field specifies whether the animation of Button i in the normal state is to be continuously repeated.

A start_object_id_selected field specifies a beginning one of object_ids that are serially assigned to a sequence of ODSs used to present the selected state of Button i in animation.

An end_object_id_selected field specifies a last one of the object_ids that are serially assigned to the sequence of ODSs used to present the selected state of Button i in animation. If the end_object_id_selected field specifies the same ID as the start_object_id_selected field, a static image of a graphics Object identified by this ID is presented as Button i.

A repeat_selected_flag field specifies whether the animation of Button i in the selected state is to be continuously repeated. If the start_object_id_selected field and the end_object_id_selected field have a same value, the repeat_selected_flag field is set to 00.

A start_object_id_activated field specifies a beginning one of object_ids that are serially assigned to a sequence of ODSs used to present the activated state of Button i in animation.

An end_object_id_activated field specifies a last one of the object_ids that are serially assigned to the sequence of ODSs used to present the activate state of Button i in animation.

The following describes button commands.

A button command (button_command) is a command that is executed when Button i is activated. The following commands (i) to (iv) are used as button commands, to write a value to a PSR or a GPR or read a value from a PSR or a GPR.

(i) Get value of Player Status Register command (written as "Get value of Player Status Register (augment)")

This function acquires a value from a PSR specified by the augment.

(ii) Set value of Player Status Register command (written as "Set value of Player Status Register (augment 1, augment 2)")

This function sets a value specified by augment 2, to a PSR specified by augment 1.

(iii) Get value of General Purpose Register command (written as "Get value of General Purpose Register (augment)")

This function acquires a value from a GPR specified by the augment.

(iv) Set value of General Purpose Register command (written as "Set value of General Purpose Register (augment 1, augment 2)")

This function sets a value specified by augment 2, to a GPR specified by augment 1.

SPECIFIC EXAMPLE

Figure 36:
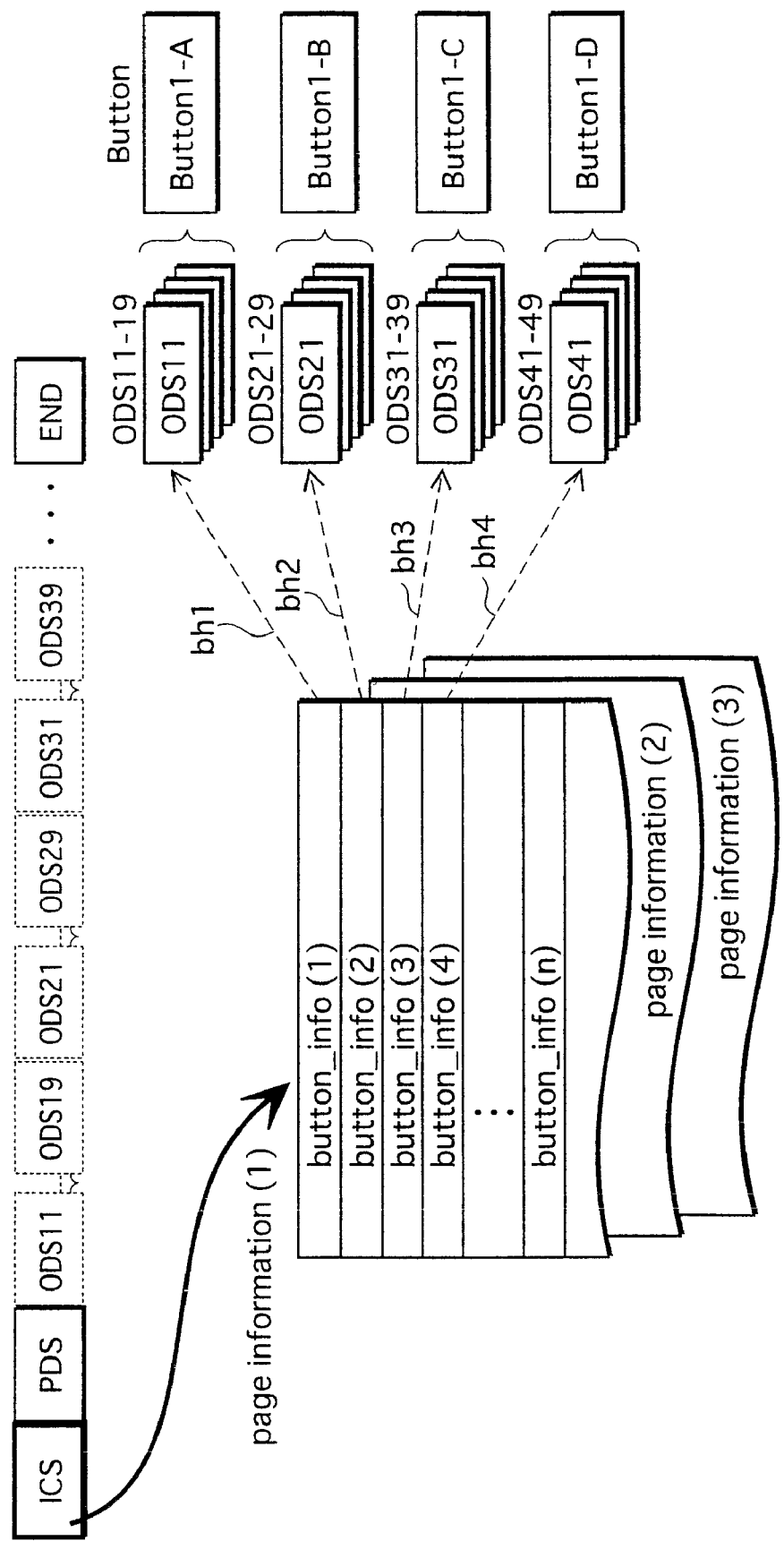
FIG. 36 show a relationship between an ICS and ODSs in DSn.

This concludes the description of the structure of the ICS. A specific example of interactive control by the ICS is given below. This specific example uses an ICS and ODSs shown in FIG. 36. FIG. 36 shows a relationship between the ICS and the ODSs included in DSn. The ODSs are made up of ODS11 to ODS19, ODS21 to ODS29, ODS31 to ODS39, and ODS41 to ODS49. ODS11 to ODS19 represent each state of Button 1-A, ODS21 to ODS29 represent each state of Button 1-B, ODS31 to ODS39 represent each state of Button 1-C, and ODS41 to ODS49 represent each state of Button 1-D, as indicated by the parenthesis "}" in the drawing. The ICS contains page information (1), (2), and (3) corresponding to three Pages 1 to 3. Status control of Buttons 1-A to 1-D is defined in button_info (1), (2), (3), and (4) in page information (1) of Page 1 (as indicated by arrows bh1, bh2, bh3, and bh4 in the drawing).

Figure 37:
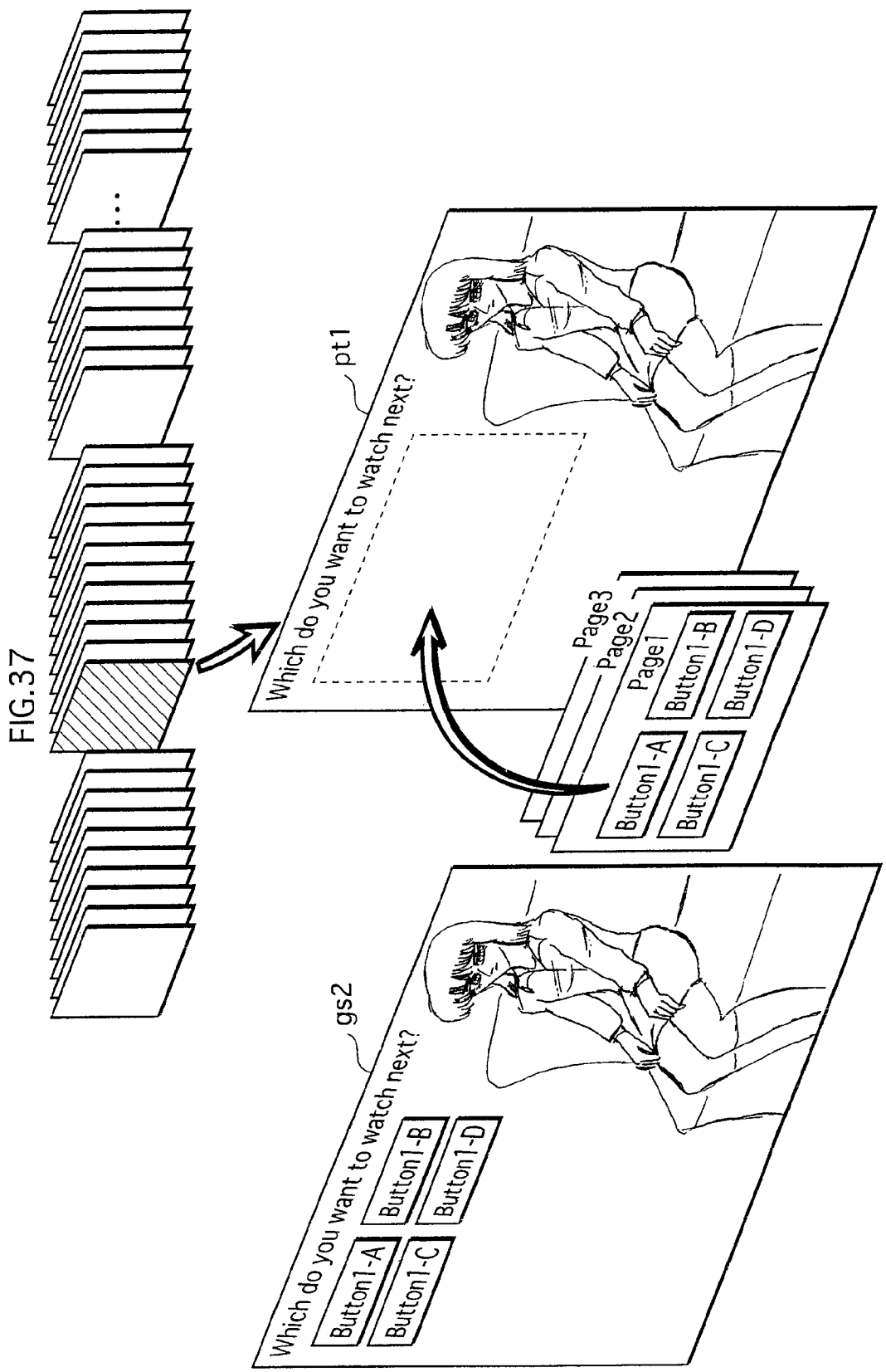
FIG. 37 shows overlaying performed with a presentation timing of picture data pt1.

When timing of the control by the ICS matches presentation timing of picture data pt1 of a moving picture shown in FIG. 37, Page 1 out of the three Pages (Pages 1 to 3) available for presentation by the ICS is overlaid on picture data pt1 and displayed (gs2). Thus, an Interactive Display provided with a plurality of Buttons is presented in correspondence with the contents of the moving picture. In this way, realistic presentation using Buttons can be achieved through the use of an ICS.

Figure 38:
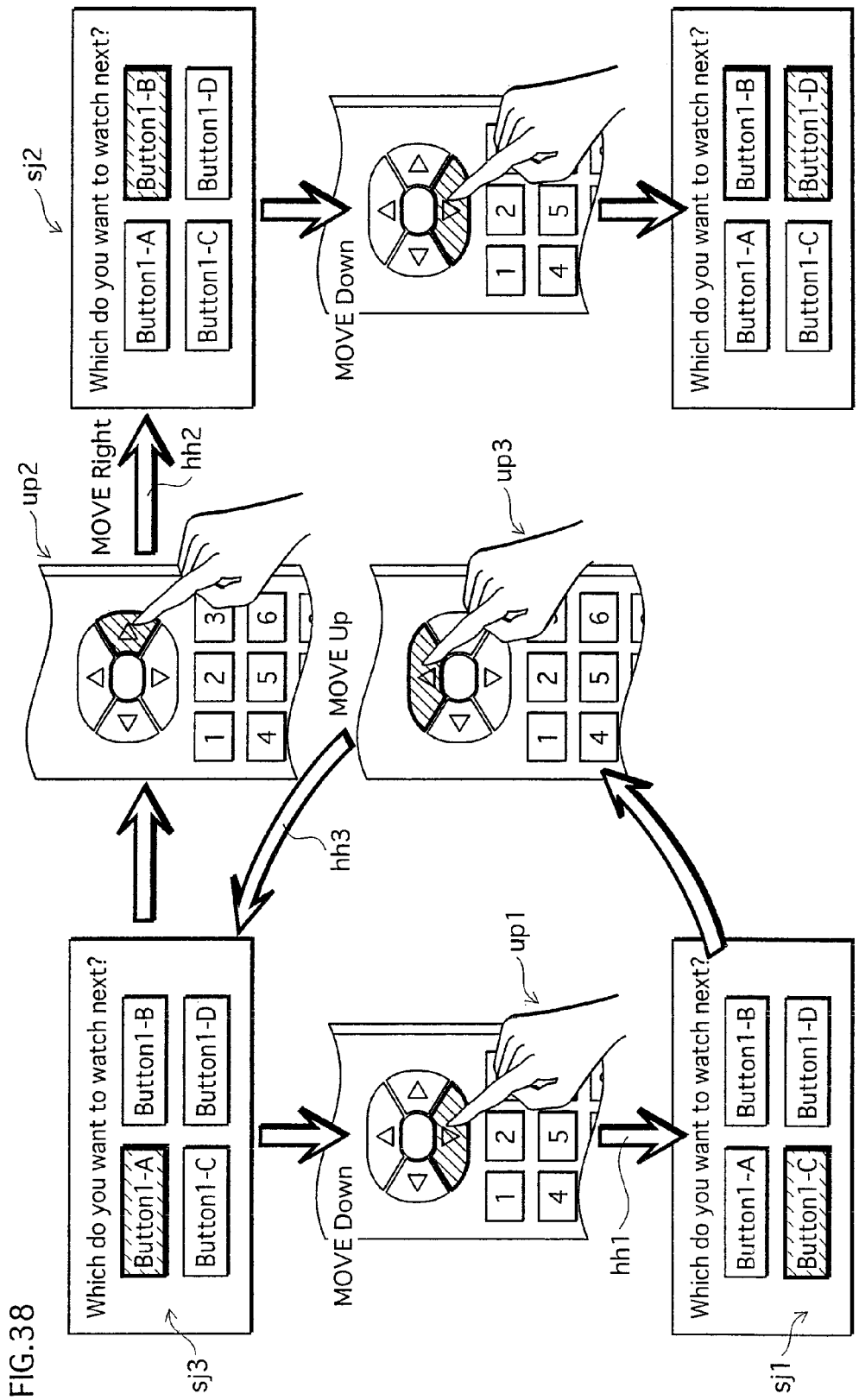
FIG. 38 shows status transitions of Buttons 1-A to 1-D.
Figure 39:
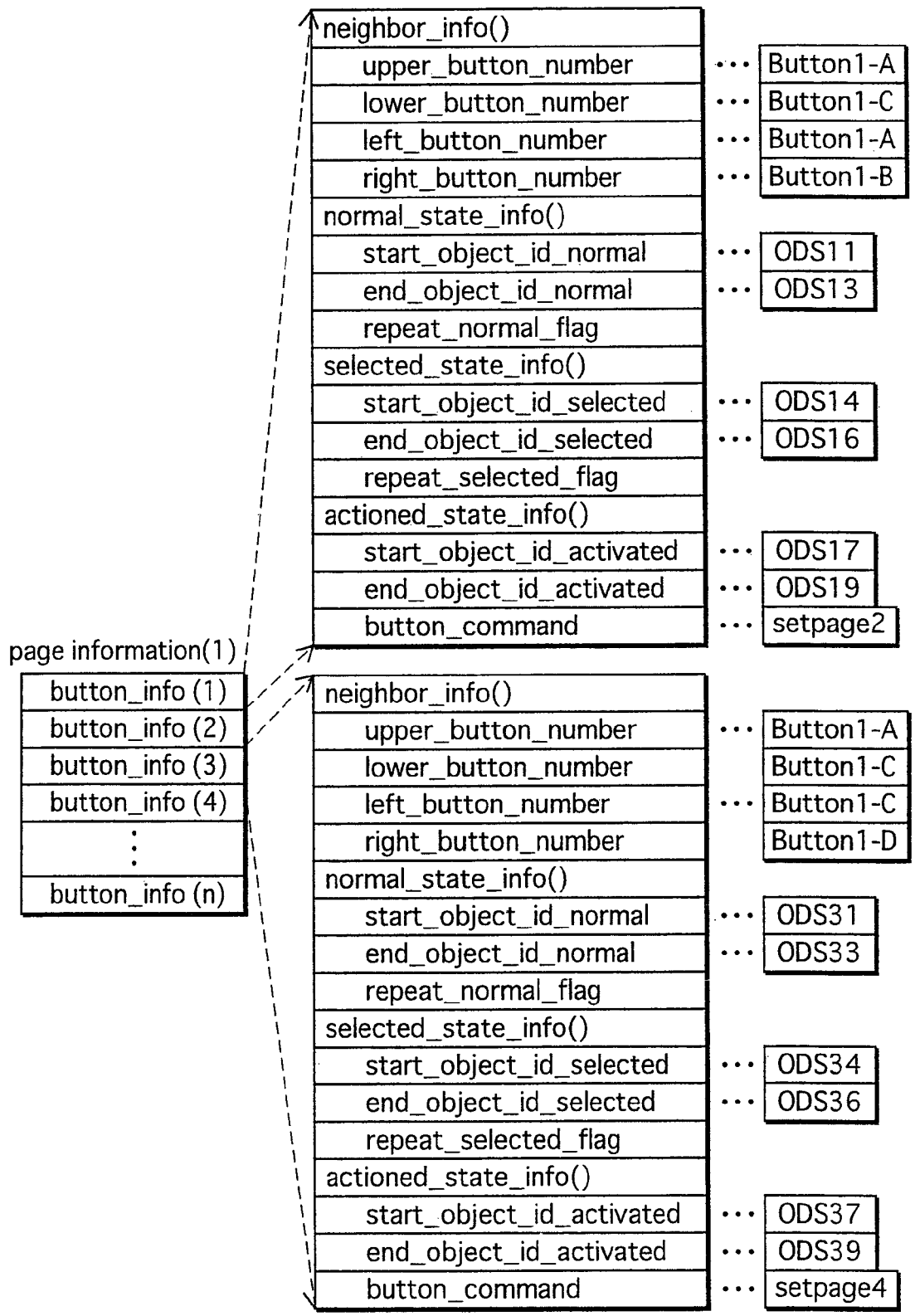
FIG. 39 shows an example of settings of button_info in an ICS.

FIG. 39 shows an example of ICS description for defining status transitions of Buttons 1-A to 1-D shown in FIG. 38. Arrows hh1 and hh2 in FIG. 38 represent status transitions defined by neighbor_info( ) in button_info(1), which is associated with Button 1-A. The lower_button_number field in the neighbor_info( ) in button_info(1) is set to specify Button 1-C. Accordingly, when a user operation of pressing the Move Down key is made while Button 1-A is in the selected state (up1 in FIG. 38), Button 1-C receives the selected state (sj1 in FIG. 38). The right_button_number field in the neighbor_info( ) in button_info(1) is set to specify Button 1-B. Accordingly, when a user operation of pressing the Move Right key is made while Button 1-A is in the selected state (up2 in FIG. 38), Button 1-B receives the selected state (sj2 in FIG. 38).

Figure 40:
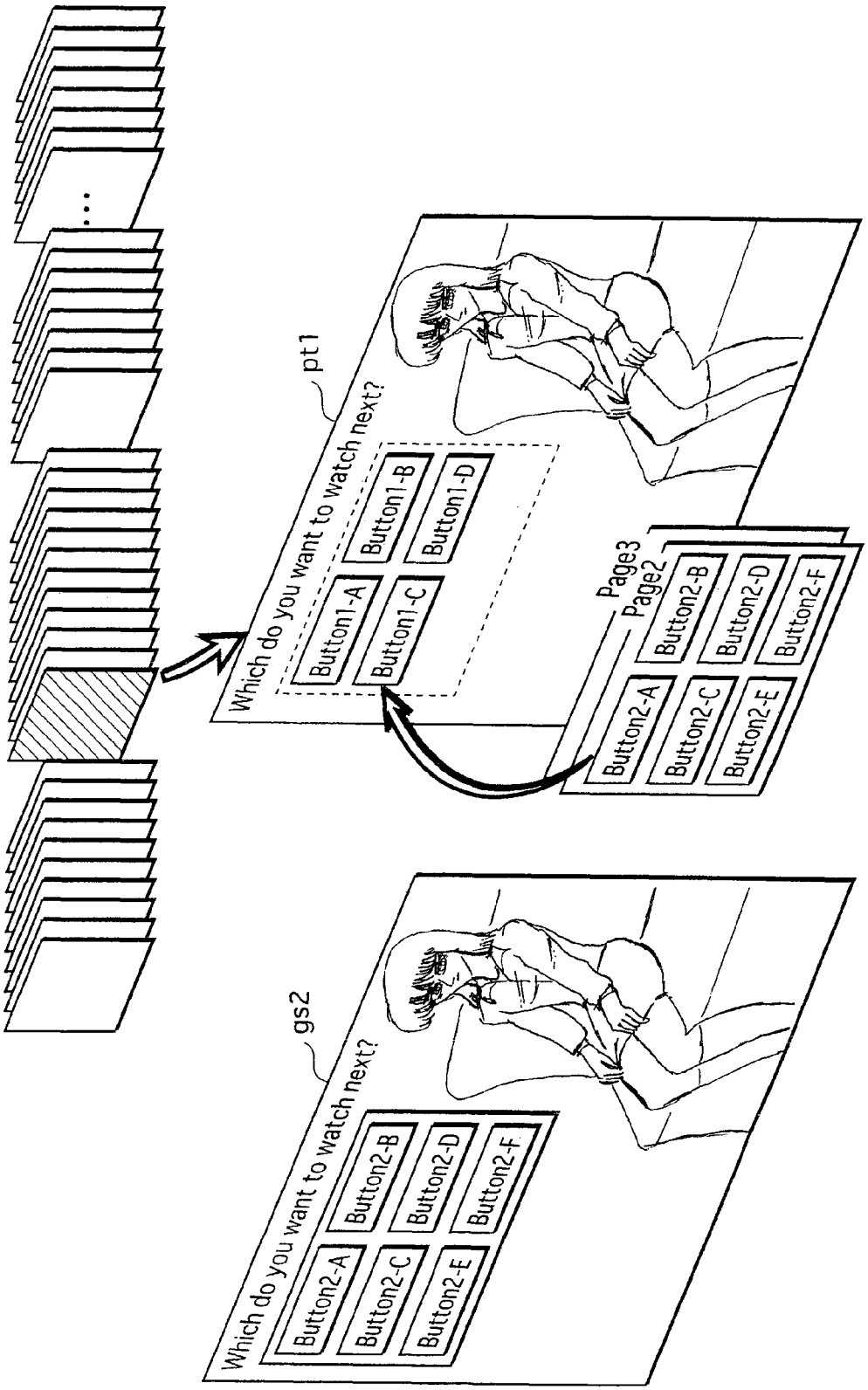
FIG. 40 shows display switching from Page 1 to Page 2.

Arrow hh3 in FIG. 38 indicates control of a status transition defined by neighbor_info( ) in button_info(3). The upper_button_number field in the neighbor_info( ) in button_info (3), which is associated with Button 1-C, is set to specify Button 1-A. Accordingly, when a user operation of pressing the Move Up key is made while Button 1-C is in the selected state (up3 in FIG. 38), Button 1-A is put back to the selected state (sj3 in FIG. 38). Button 1-A corresponds to a button command "Set Page 2". This command instructs the playback apparatus to switch to Page 2. Upon activation of Button 1-A, this command is executed, as a result of which Page 1 is switched to Page 2 as shown in FIG. 40.

<Playback Apparatus>

This concludes the description of the improvements in the recording medium of the third embodiment. The following describes the playback apparatus of the third embodiment. Of the plurality of PSRs in the playback apparatus, PSR0, PSR11, and PSR10 relate to the interactive function. PSR0, PSR10, and PSR11 are explained below, with reference to FIG. 41.

PSR0 specifies one of a plurality of IG streams which are listed as entries in the STN_table of the current PlayItem.

PSR11 specifies, when the IG stream specified by PSR0 contains a plurality of Pages available for presentation, one of the plurality of Pages.

PSR10 specifies, when the Page specified by PSR11 has a plurality of Buttons, one of the plurality of Buttons.

Figure 42A:
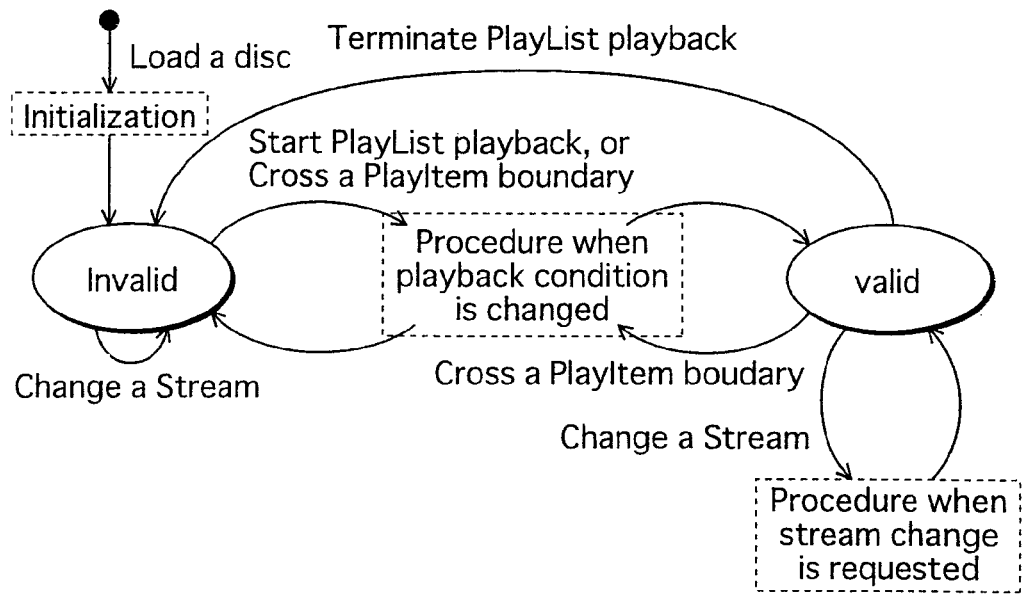
FIG. 42A shows status transitions that can be made by PSR0.
Figure 42B:
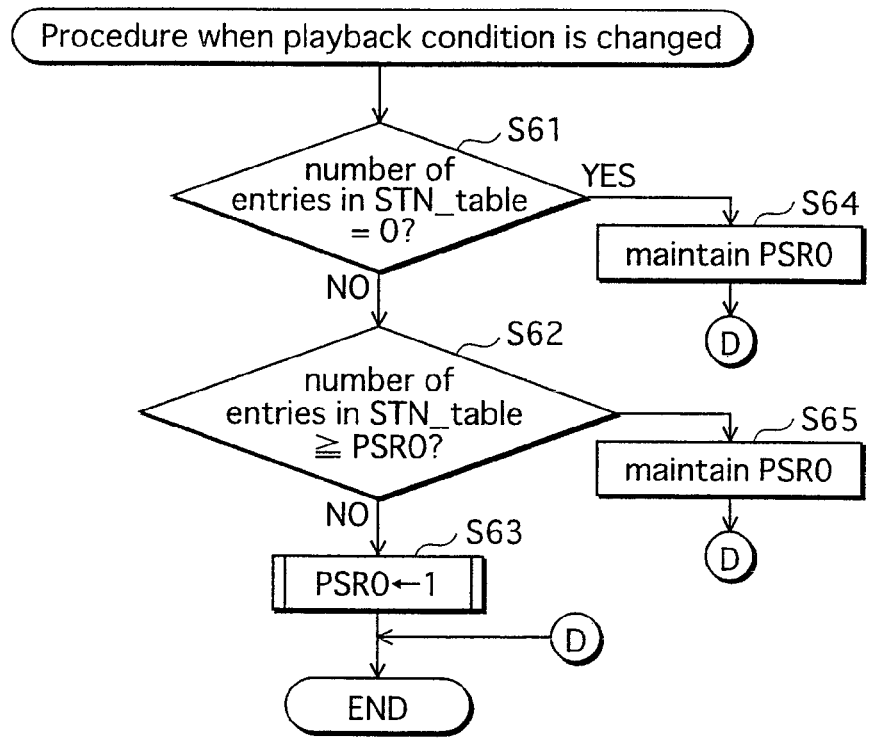
FIG. 42B is a flowchart of "Procedure when playback condition is changed" for PSR0.
Figure 43:
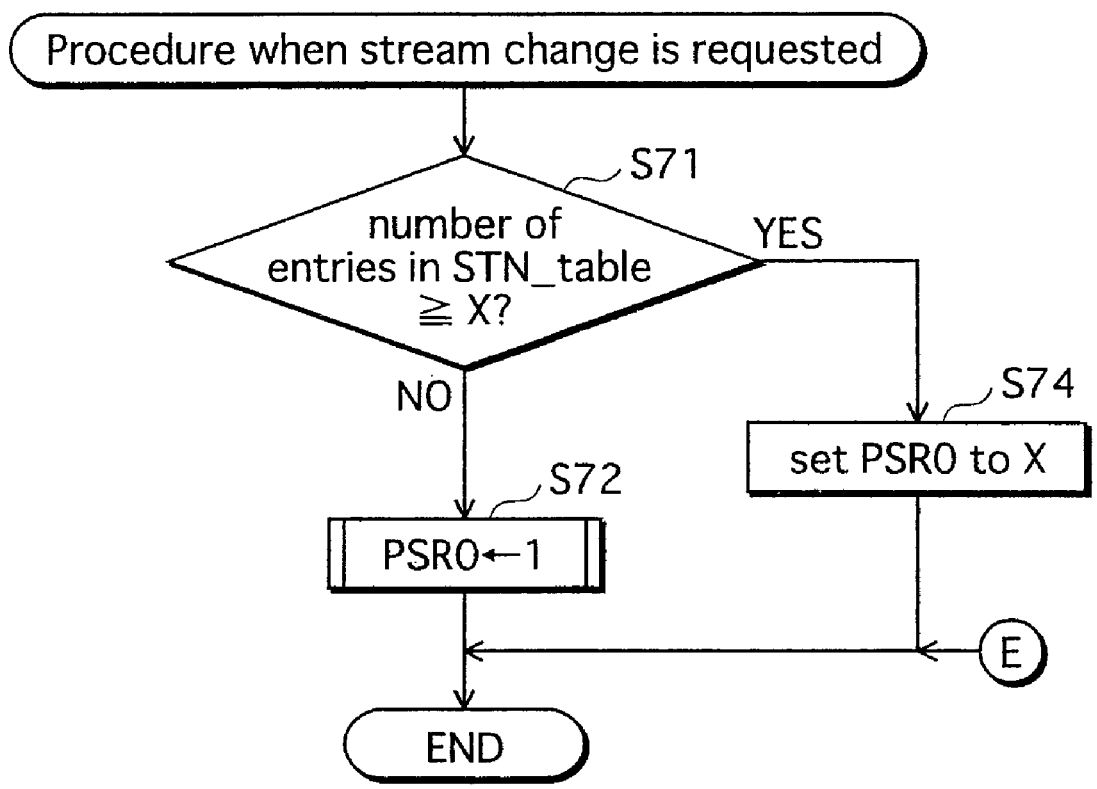
FIG. 43 is a flowchart of "Procedure when change is requested" for PSR0.

To realize the interactive function, PSR0 makes the following status transitions. PSR0 is initially set at 1, and can be set to any of the values 2 to 32 by the playback apparatus. FIG. 42A shows status transitions that can be made by PSR0. FIG. 42B is a flowchart of "Procedure when playback condition is changed" for PSR0. FIG. 43 is a flowchart of "Procedure when change is requested" for PSR0. These status transitions and flowcharts are same as those of PSR1 and PSR2 described in the first embodiment. As in the case of audio streams and PG_textST_streams, when IG streams corresponding to multiple languages are multiplexed in the AV Clip, one of the IG streams that matches the language setting of the playback apparatus is selected and played back. Here, the playback apparatus selects the IG stream depending on the order of entries in the STN_table. Therefore, by adjusting the order of entries in the STN_table, the author can control which IG stream is to be selected. This concludes the description of the status transitions of PSR0.

PSR10 and PSR11 make status transitions similar to those described in the first and second embodiments, too. This will be described in detail later.

The following describes a construction of the playback apparatus of the third embodiment. PSR0 specifies the IG stream to be played. This being so, the control unit 24 and the Demultiplexer 3 perform the following processing.

The control unit 24 extracts a PID from one of the entry-attribute combinations of IG streams in the STN_table that is specified by PSR0, and sets the PID in the Demultiplexer 3.

The Demultiplexer 3 outputs, from among TS packets read from the BD-ROM and the HD, TS packets having the PID set by the control unit 24, to the Interactive Graphics Decoder 13. Hence an ICS, a PDS, and an ODS are fed to the Interactive Graphics Decoder 13.

<Internal Construction of the Interactive Graphics Decoder 13>

Figure 44:
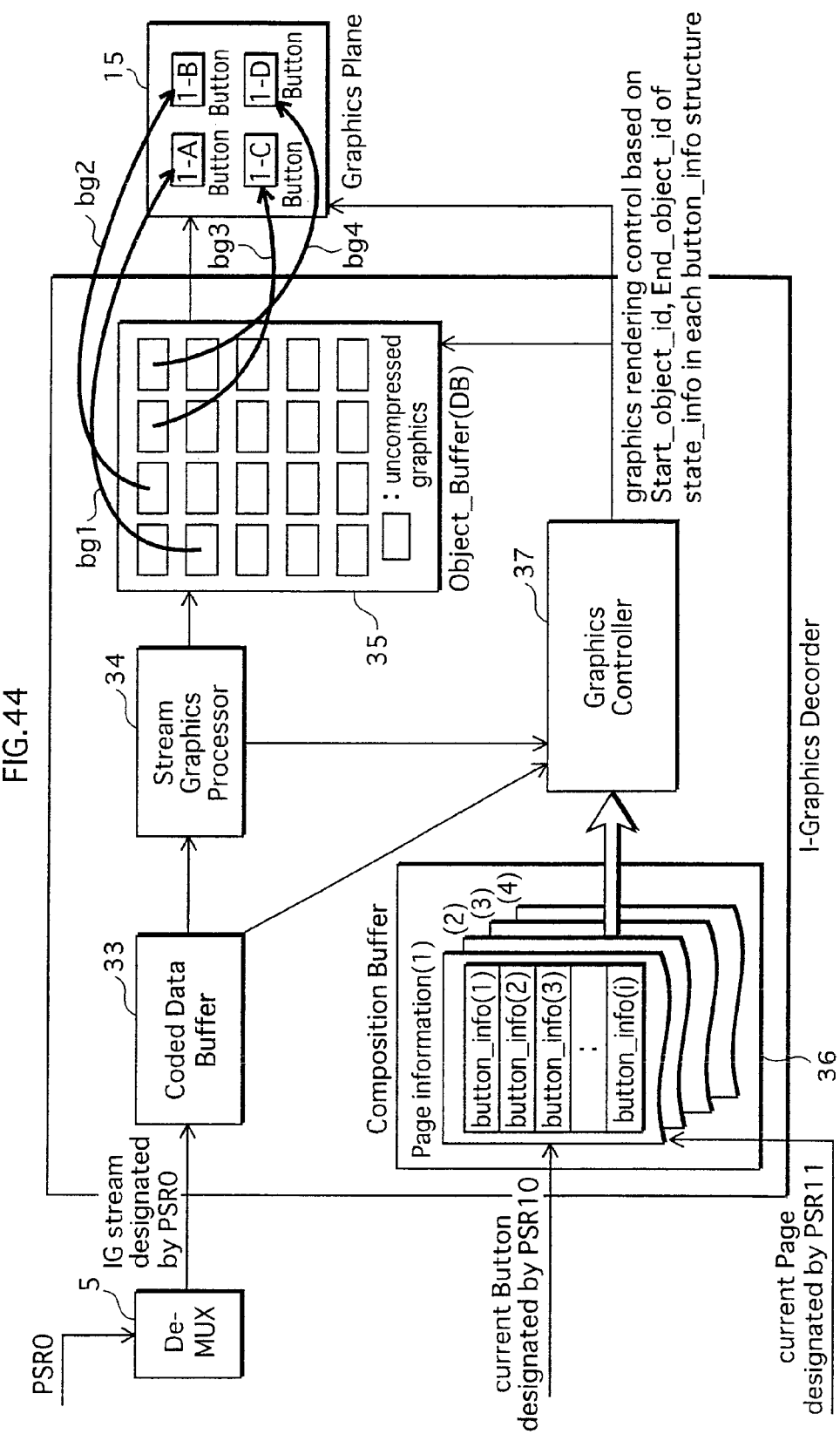
FIG. 44 shows an internal structure of an Interactive Graphics Decoder 13.

An internal construction of the Interactive Graphics Decoder 13 is described below, with reference to FIG. 44. As shown in the drawing, the Interactive Graphics Decoder 13 includes a Coded Data Buffer 33, a Stream Graphics Processor 34, an Object Buffer 35, a Composition Buffer 36, and a Graphics Controller 37.

The Coded Data Buffer 33 is a buffer for temporarily storing an ICS, a PDS, and an ODS together with DTSs and PTSs.

The Stream Graphics Processor 34 decodes the ODS to obtain uncompressed graphics, and writes the uncompressed graphics to the Object Buffer 35.

The Object Buffer 35 is a buffer for storing a plurality of sets of uncompressed graphics (represented by the rectangles in the drawing) generated by the Stream Graphics Processor 34.

The Composition Buffer 36 is a memory for storing an ICS. The Composition Buffer 36 outputs a plurality of sets of page information in the ICS and a plurality of button_info structures in each set of page information, to the Graphics Controller 37.

The Graphics Controller 37 refers to each button_info structure in page information specified by PSR11 (current page information) out of the plurality of sets of page information in the ICS stored in the Composition Buffer 36, and renders graphics. In detail, the Graphics Controller 37 reads graphics specified by a start_object_id_normal field value and an end_object_id_normal field value of normal_state_info of each button_info structure in the current page information from the Object Buffer 35, and writes the read graphics to the Interactive Graphics Plane 15. Regarding a button_info structure specified by PSR10, the Graphics Controller 37 reads graphics specified by a start_object_id_selected field value and an end_object_id_selected field value of selected_state_info of the button_info structure from the Object Buffer 35, and writes the read graphics to the Interactive Graphics Plane 15. Arrows bg1, bg2, bg3, and bg4 in FIG. 44 represent the rendering of the graphics by the Graphics Controller 37. As a result of the rendering, a Page including Buttons 1-A to 1-D is stored on the Interactive Graphics Plane 15 and overlaid on a moving picture.

This concludes the rough description of the procedure to be performed by the Graphics Controller 37. FIGS. 45 to 51 show the procedure to be performed by the Graphics Controller 37 in greater detail.

Figure 45:
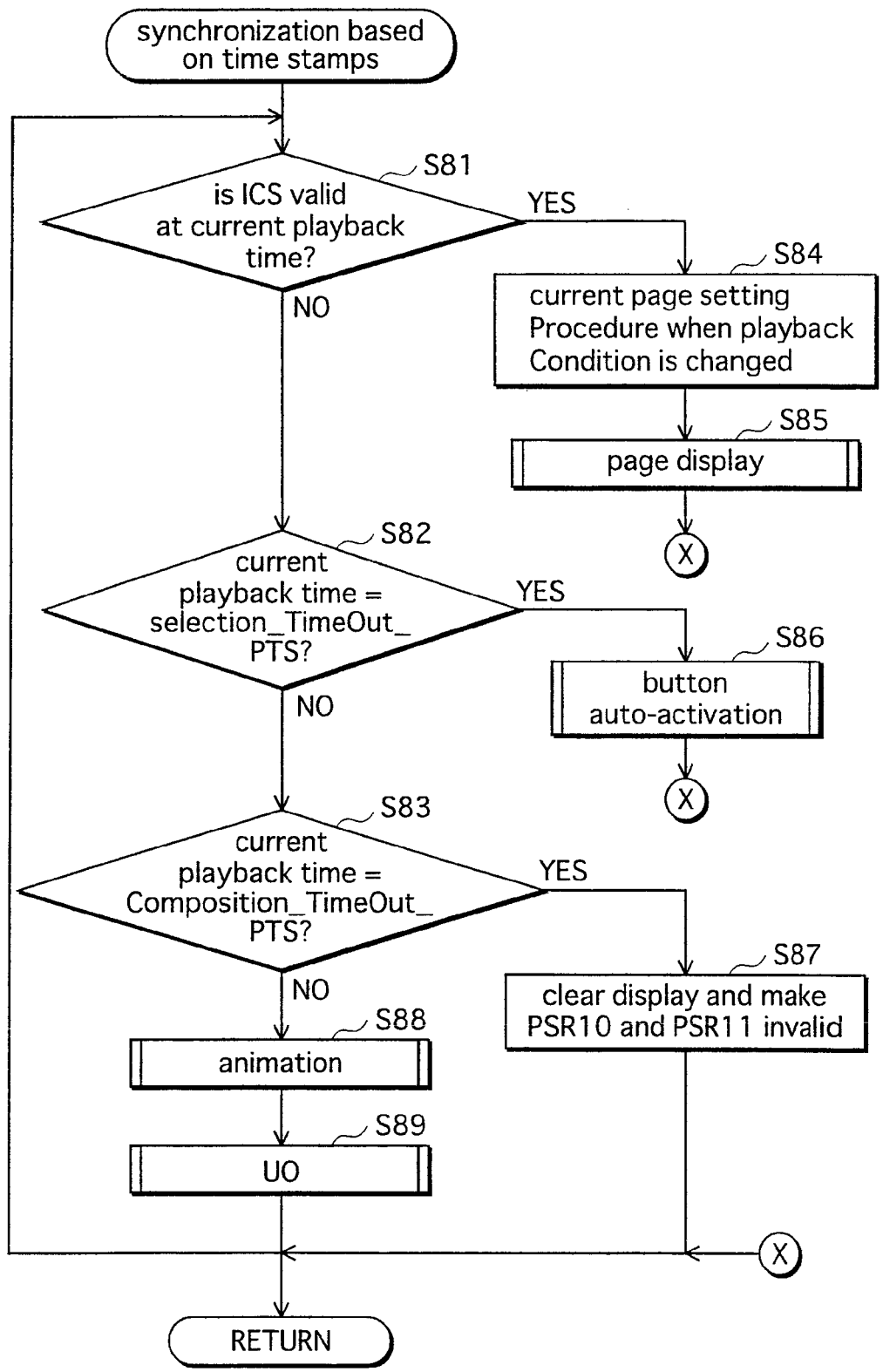
FIG. 45 is a flowchart of a synchronous control procedure using time stamps.

FIG. 45 is a flowchart of a main routine of the procedure performed by the Graphics Controller 37. In this flowchart, while conducting step S88 (an animation procedure) and step S89 (an UO procedure), judgments are made in steps S81, S82, and S83 as to whether specific events have occurred. If any of the events has occurred, corresponding steps are performed and the procedure returns to the main routine.

A judgment is made as to whether the current playback time has reached a point when the ICS becomes valid (S81). If the judgment in step S81 is YES, PSR10 is set to specify first page information in the ICS (S84). After this, a current page display procedure is carried out (S85).

A judgment is made as to whether the current playback time has reached a point shown by the selection_time_out_pts (S82). If the judgment in step S82 is YES, a button activation procedure is carried out (S86).

A judgment is made as to whether the current playback time has reached a point shown by the composition_time_out_pts (S83). If the judgment in step S83 is YES, the Interactive Graphics Plane 15 is cleared and PSR10 and PSR11 are changed to Invalid (S87). This completes the synchronization procedure using time stamps. In this synchronization procedure, steps S85 and S86 are performed by calling subroutines. A procedure of the subroutine of step S85 is described below, with reference to FIG. 46.

Figure 46:
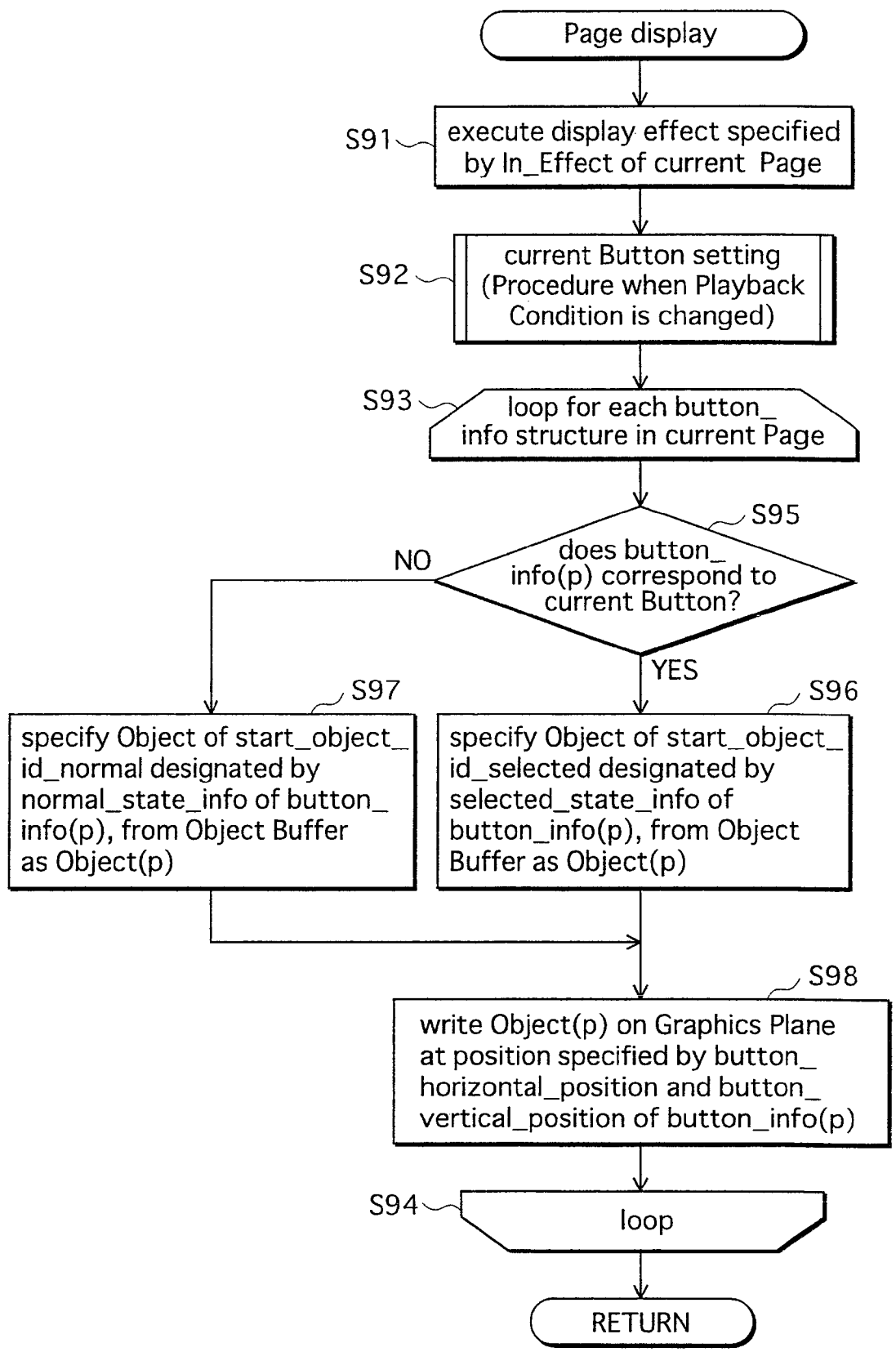
FIG. 46 is a flowchart of an initial display procedure.

FIG. 46 is a flowchart of an initial display procedure. A display effect specified by the in_effects field of the current page information is executed (S91). After this, a current button setting procedure is performed (S92). The current Button is specified by PSR10. Accordingly, "Procedure when playback condition is changed" for PSR10 is performed to determine the current Button. Once the current Button has been determined as a result of step S92, the procedure advances to steps S93 to S98.

Steps S93 to S98 form a loop that is performed for each button_info structure in the current Page (S93 and S94). Button-info to be processed in this loop is called button_info(p).

A judgment is made as to whether button_info(p) corresponds to the current Button (S95). If the judgment in step S95 is YES, the procedure advances to step S96. If the judgment in step S95 is NO, the procedure advances to step S97.

In step S96, a graphics Object specified by a start_object_id_selected field value of selected_state_info in button_info(p) is designated as graphics Object(p) in the Object Buffer 35.

In step S97, a graphics Object specified by a start_object_id_normal field value of normal_state_info in button_info(p) is designated as graphics Object(p) in the Object Buffer 35.

Once graphics Object(p) has been designated as a result of step S96 or S97, graphics Object(p) is written onto the Interactive Graphics Plane 15 at a position specified by a button_horizontal_position field value and a button_vertical_position field value in button_info(p) (S98). As a result of performing this operation for each button_info structure in the current Page, among a plurality of graphics Objects associated with each button state, an initial graphics Object is rendered for each Button to the Interactive Graphics Plane 15.

A procedure of the subroutine of step S86 is explained next, with reference to FIG. 47.

Figure 47:
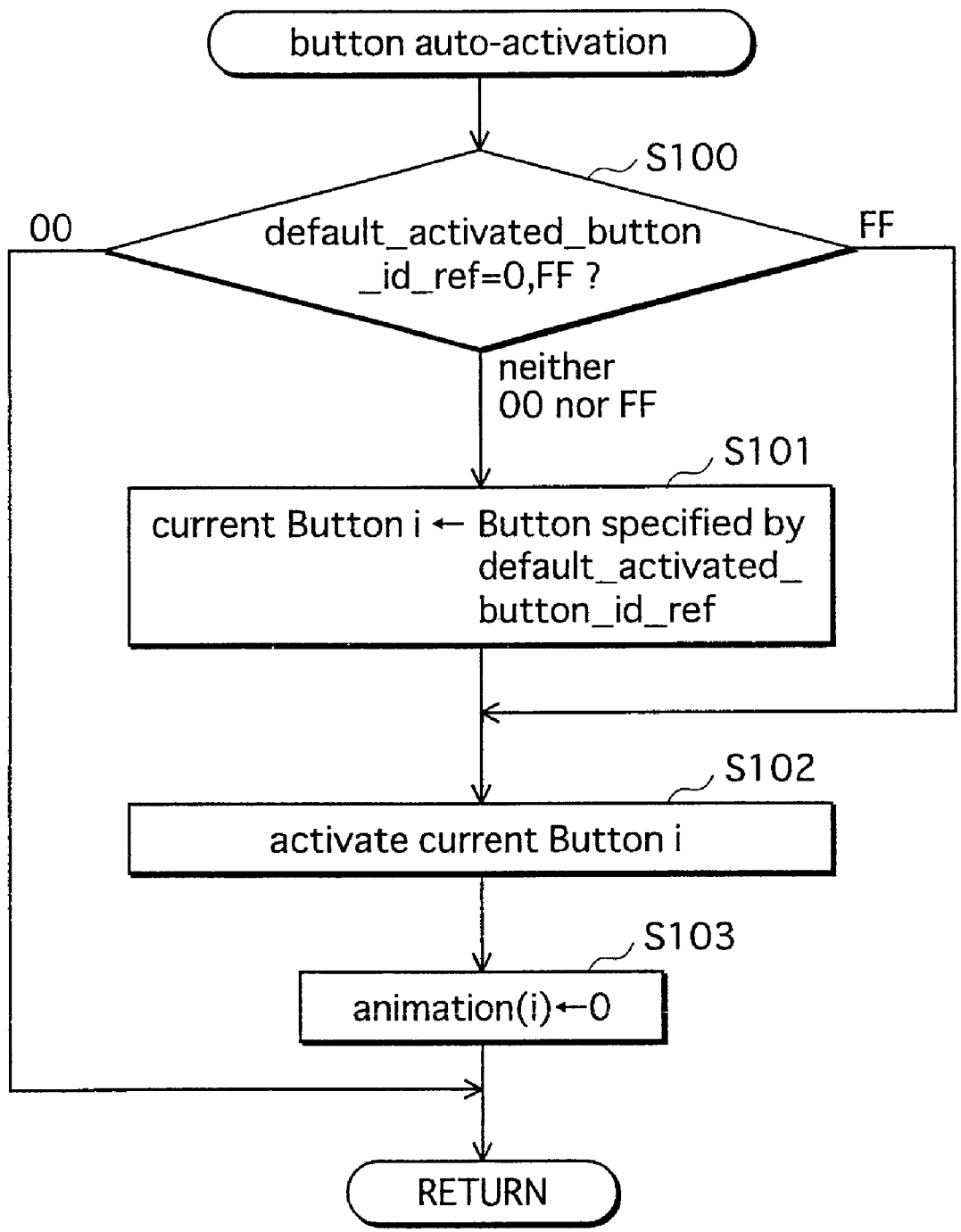
FIG. 47 is a flowchart of an auto-activation procedure.

FIG. 47 is a flowchart of a button auto-activation procedure. A judgment is made as to whether a default_activated_button_id_ref is 00 or FF (S100). If the default_activated_button_id_ref is 00, the procedure returns to the main routine without performing any step. If the default_activated_button_id_ref is FF, current Button i is activated (S102).

Following this, variable animation(i) corresponding to current Button i is set to 0. The procedure then returns to the main routine (S103).

If the default_activated_button_id_ref is neither 00 nor FF, a Button specified by the default_activated_button_id_ref is set as current Button i (S101), and current Button i is activated (S102). Following this, animation(i) corresponding to current Button i is set to 0. The procedure then returns to the main routine (S103).

As a result of the above procedure, a Button in the selected state is activated after a predetermined time period. This concludes the description of the flowchart of FIG. 47.

Figure 48:
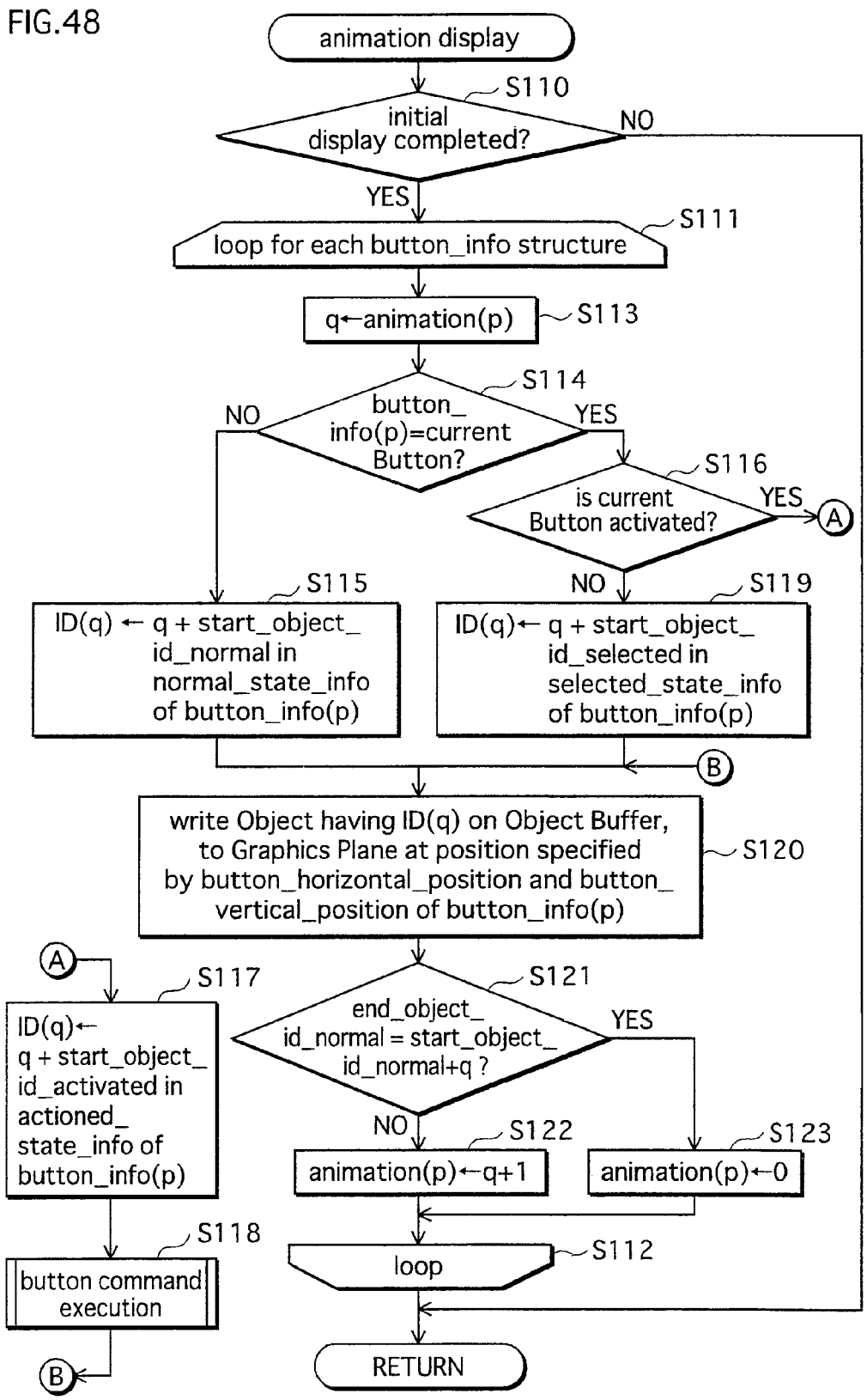
FIG. 48 is a flowchart of an animation display procedure.

The following describes a procedure of animation display on a Page. FIG. 48 is a flowchart of the animation display procedure.

The initial display is presented by writing the graphics Object specified by the start_object_id_normal in the normal_ state_info or the start_object_id_selected in the selected_ state_info in each button_info structure, onto the Interactive Graphics Plane 15. Animation means an operation of updating each Button image by overwriting the Interactive Graphics plane 15 with an arbitrary one of a sequence of graphics Objects (qth graphics Object) associated with the Button, in each repetition of the main routine. That is to say, each Button is presented in animation by rendering a sequence of graphics Objects associated with the normal_ state_info or selected_state_info provided within each button_info structure, one by one to the Interactive Graphics Plane 15. Here, variable q is used to specify an individual graphics Object associated with the normal_state_info or selected_state_info provided within each button_info structure.

The animation display procedure is described below, by referring to FIG. 48. For simplicity's sake, this flowchart is based on a premise that the repeat_normal_flag and the repeat_selected_flag in each button_info structure in the ICS are set to indicate that the continuous repetition is required.

A judgment is made as to whether the initial display has been performed (S110) If the initial display is not yet performed, the procedure returns to the main routine without performing any step. If the initial display has been performed, the procedure advances to steps S111 to S123. Steps S111 to S123 form a loop in which steps S113 to S123 are performed for each button_info structure (button_info(p)) of the current page information in the ICS (S111 and S112).

Variable q is set to the value of animation(p) corresponding to button_info(p) (S113). As a result, variable q represents the current frame number for button_info(p).

A judgment is made as to whether button_info(p) corresponds to the current Button, i.e. the Button which is currently in the selected state (S114).

If the judgment in step S144 is NO, a value obtained by adding variable q to the start_object_id_normal of the normal_state_info in button_info(p) is set as ID(q) (S115).

If the judgment in step S114 is YES, the procedure advances to step S116.

In step S116, a judgment is made as to whether the current Button is in the activated state. If the current button is in the activated state, a value obtained by adding variable q to the start_object_id_activated of the actioned_state_info in button_info(p) is set as ID(q) (S117). After this, one of button commands in button_info(p) is executed (S118).

If the current Button is not in the activated state, a value obtained by adding variable q to the start_object_id_selected of the selected_state_info in button_info(p) is set as ID(q) (S119).

Once ID(q) has been determined in this way, graphics Object(q) identified by ID(q) is read from the Object Buffer 35 and written to the Interactive Graphics Plane 15 at a position shown by the button_horizontal_position and the button_vertical_position in button_info(p) (S120).

As a result, the qth graphics Object in the sequence of graphics Objects representing the selected state (or the activated state) of the current Button or the normal state of any of the other Buttons in animation is obtained on the Interactive Graphics Plane 15.

A judgment is made as to whether the sum of the start_object_id_normal and variable q has reached the end_object_id_normal in button_info(p) (S121). If the judgment in step S121 is NO, variable q is incremented by 1 and assigned to animation(p) (S122). If the judgment in step S121 is YES, animation(p) is initialized to 0 (S123). The above operation is repeated for each button_info structure of the current page information in the ICS (S111 and S112). Once the operation has been completed for all button_info structures, the procedure returns to the main routine.

As a result of steps S110 to S123, each Button image on the Interactive Display is updated using a new graphics Object each time the main routine is performed. Repeating the main routine over and over again enables the Button images to be presented in animation. When presenting the Buttons in animation, the Graphics Controller 37 adjusts the duration for presenting each graphics Object so as to maintain the animation_frame_rate_code.

Figure 49:
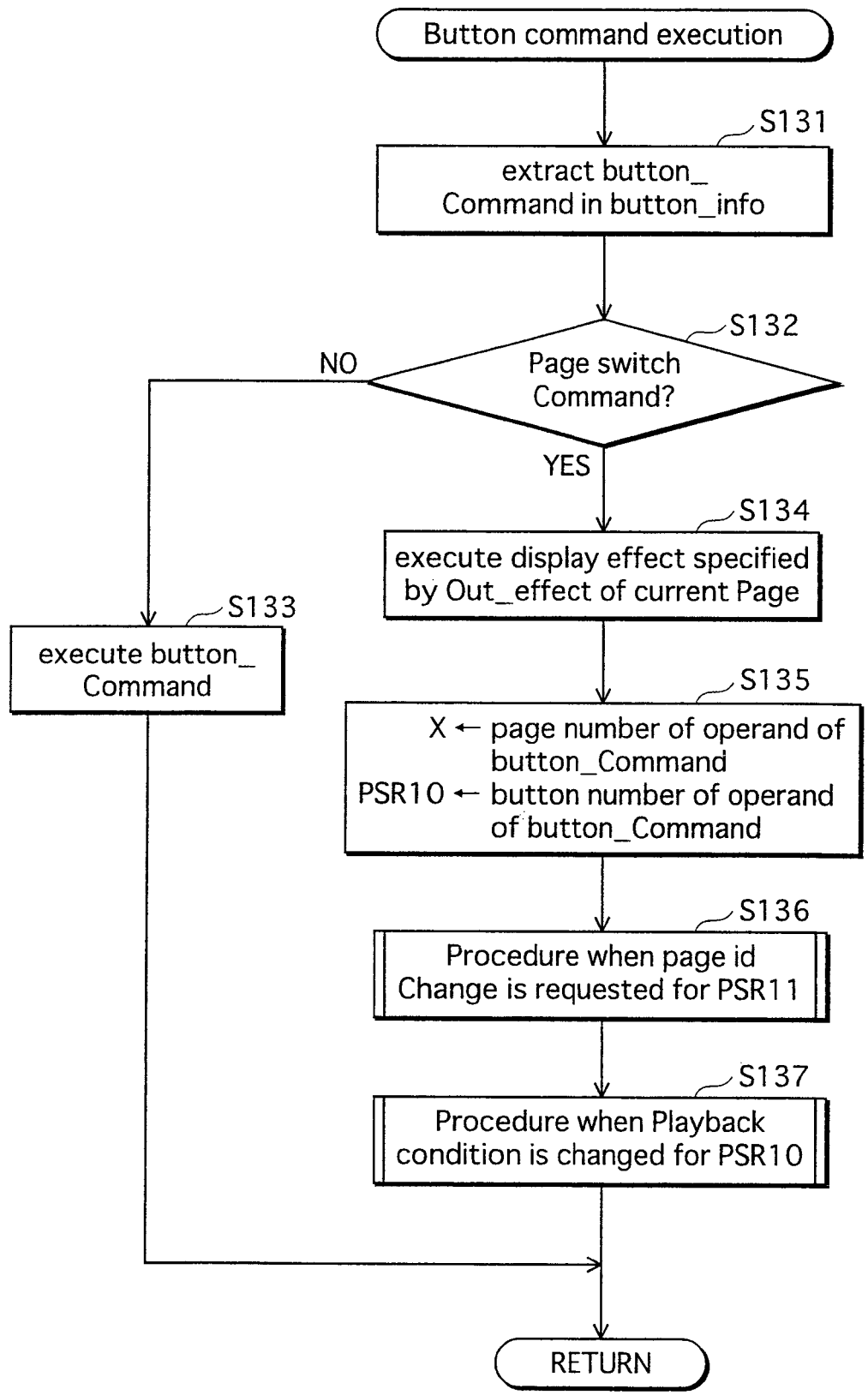
FIG. 49 is a flowchart of a button command execution procedure.

A button command execution procedure is explained below, with reference to a flowchart of FIG. 49. One button_command is extracted from in the button_info (S131). A judgment is made as to whether the button_command is a Page switching command (S132). If the button_command is not a Page switching command, the button_command is executed (S133). If the button_command is a Page switching command, a display effect specified by the out_effects in the current Page is executed (S134). Following this, a switching destination page number specified by an operand of the button_command is set as X, and a button number specified by an operand of the button_command is set in PSR10 (S135). After this, "Procedure when change is requested" for PSR11 is performed (S136). PSR11 specifies the current Page. By performing "Procedure when change is requested" for such PSR11, the current Page is determined. After this, "Procedure when playback condition is changed" is performed for PSR10. This completes the button command execution procedure.

This concludes the description of the button command execution procedure. The following describes an UO procedure in step S89 of the main routine, with reference to FIG. 50.

Figure 50:
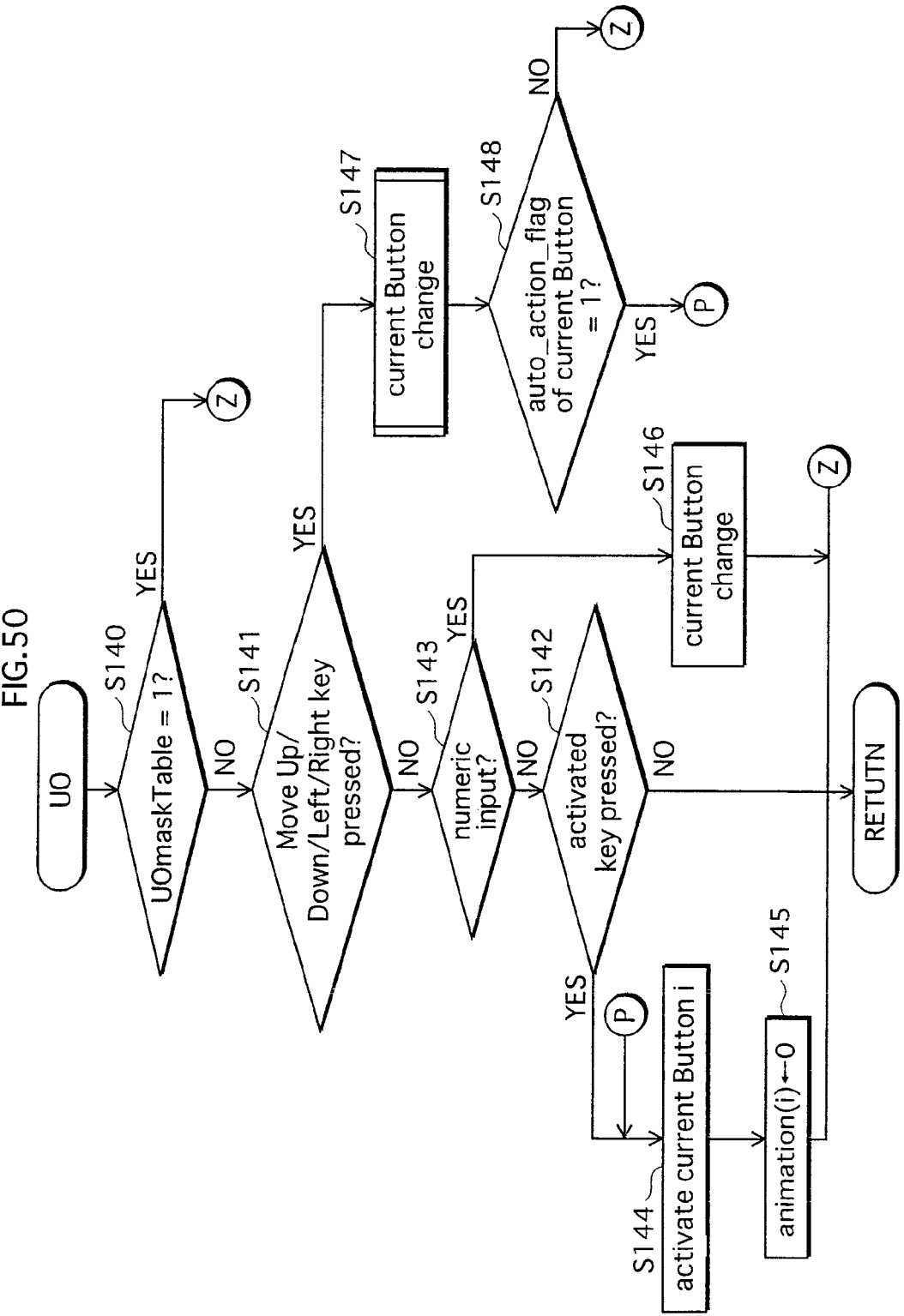
FIG. 50 is a flowchart of an UO procedure.

FIG. 50 is a flowchart of the UO procedure. In this flowchart, steps S140 to S143 are performed to judge whether specific events have occurred. If any of the events has occurred, corresponding steps are performed and then the procedure returns to the main routine. A judgment is made as to whether the UO_mask_table in the current Page is set to 1 (S140). If the judgment in step S140 is YES, the procedure returns to the main routine without performing any step.

A judgment is made as to whether any of the Move Up key, the Move Down key, the Move Left key, and the Move Right key has been pressed (S141). If the judgment in step S141 is YES, a current Button change procedure is performed (S147), and a judgment is made as to whether the auto_action_flag of the current Button is 01 (S148). If the judgment in step S148 is NO, the procedure returns to the main routine. If the judgment in step S148 is YES, the procedure advances to step S144.

A judgment is made as to whether a numeric input has been made (S143). If the numeric input has been made, a numeric input operation is performed (S146). After this, the procedure returns to the main routine.

Figure 51:
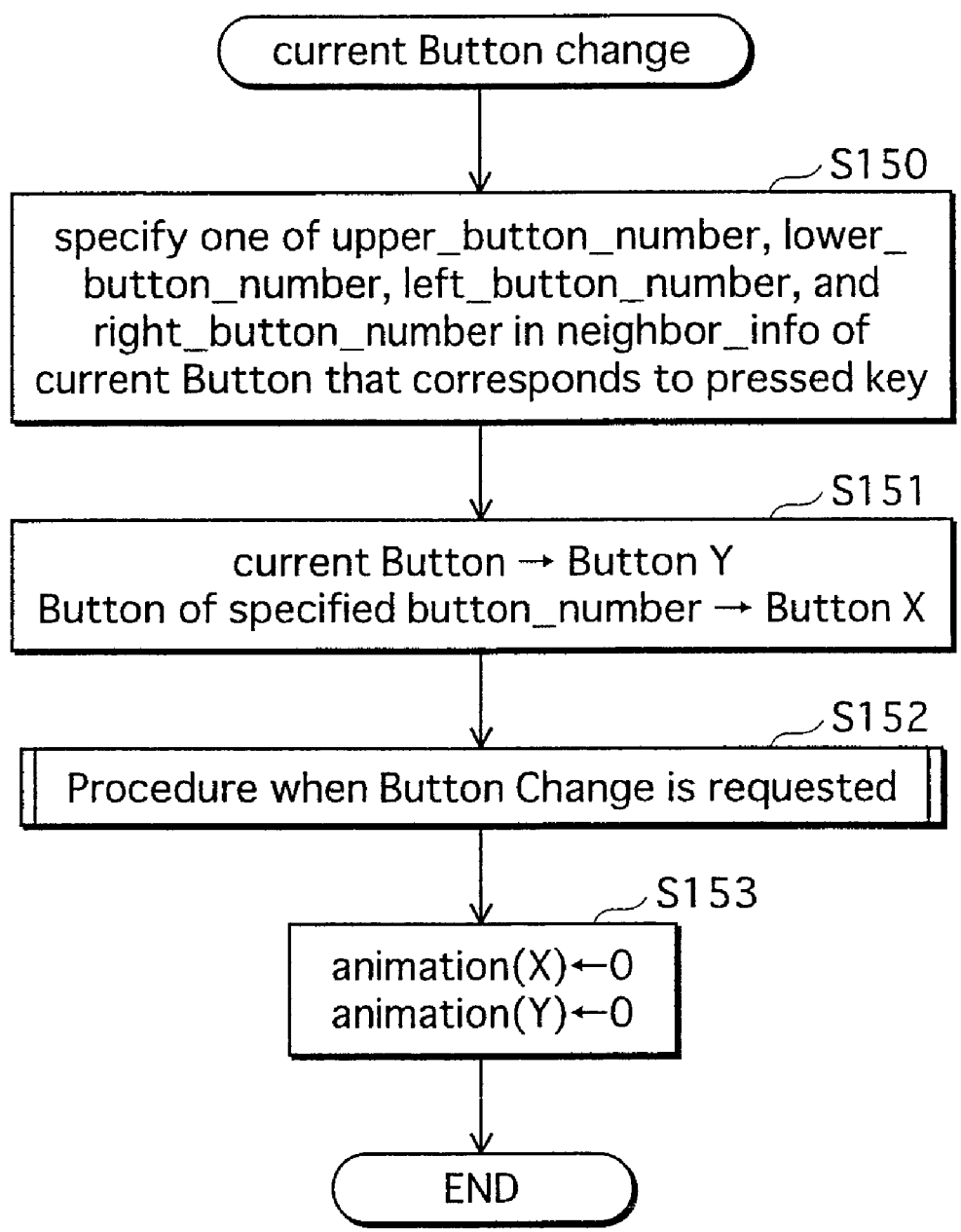
FIG. 51 is a flowchart of a current button switching procedure.

A judgment is made as to whether the Activated key has been pressed (S142). If the judgment in step S142 is YES, current Button i is activated (S144). After this, animation(i) is set to 0 (S145). In the procedure shown in FIG. 50, step S147 is performed by calling a subroutine. FIG. 51 shows a procedure of this subroutine.

FIG. 51 is a flowchart of a current button change procedure. First, from the upper_button_number, the lower_button_number, the left_button_number, and the right_button_ number in the neighbor_info associated with the current Button, a button number that corresponds to the pressed key is specified (S150).

The current Button is set as button Y, and a new Button identified by the specified button number is set as Button X (S151). To set PSR10 to X, "Procedure when change is requested" is performed (S152).

After the setting, animation(X) and animation(Y) are set to 0. The procedure then returns to the main routine (S153).

This concludes the description of the procedures performed by the Interactive Graphics Decoder 13.

SPECIFIC EXAMPLES OF FOCUS SHIFT

In the above Page switching, the author decides which Button in the switch destination Page is to be set in the selected state. This raises an issue of how to perform a focus shift. A focus referred to here indicates a Button which is in the selected state. A focus shift is to dynamically or statically change the Button in the selected state in accordance with Page switching, using the aforementioned button command or default selected button.

The following describes a focus shift for aiding the viewing of a package medium on which a plurality of sets of content such as a drama series are recorded. In the package medium recording the drama series, content corresponding to each of the episodes such as the first to fourth episodes is contained in one disc. In this case, playback is generally performed in the order of episodes, i.e. the first episode→the second episode→the third episode→the fourth episode. This being so, it is troublesome for the user to perform, on a selection menu, an operation of selecting the next episode each time playback of one episode ends.

Figure 52:
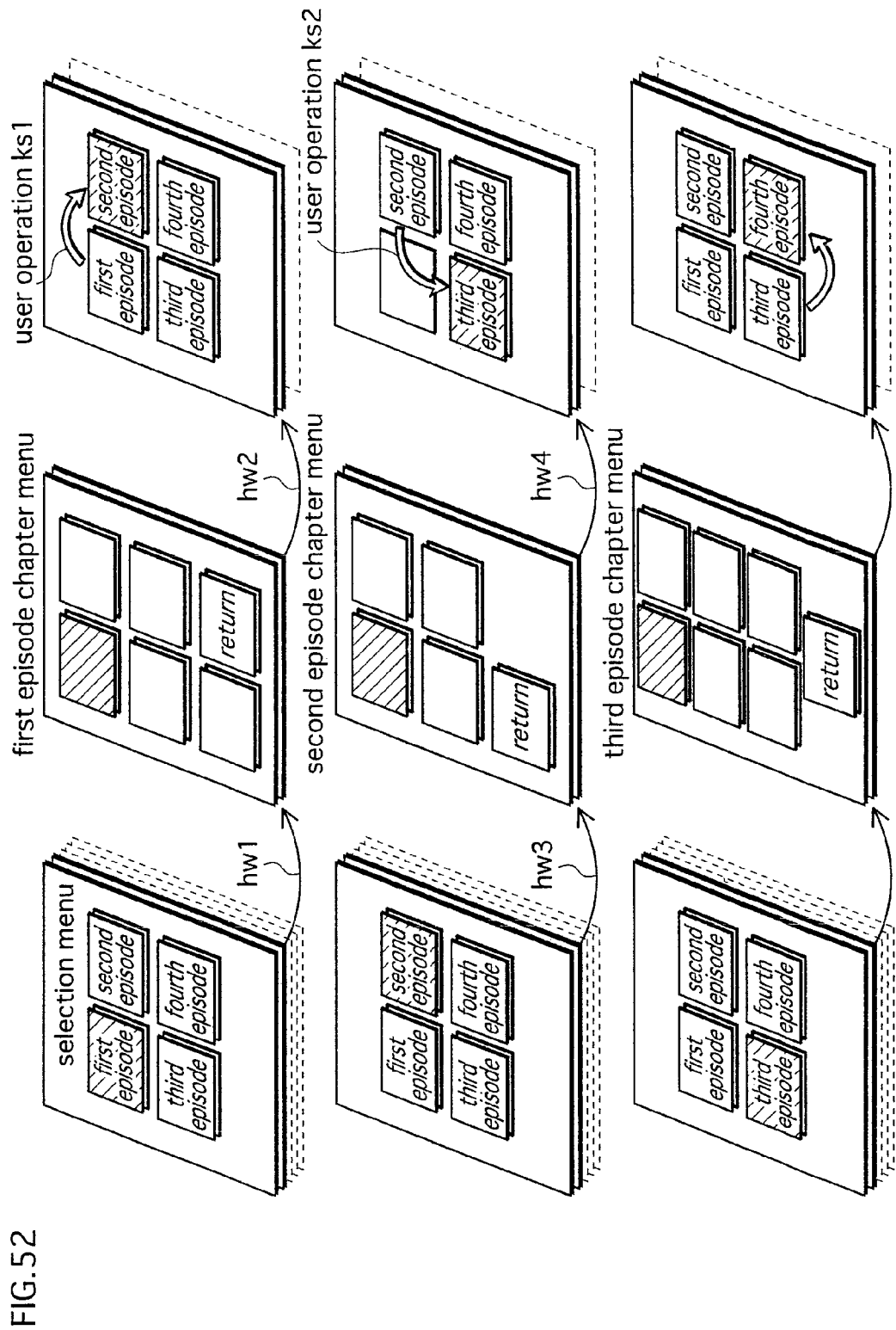
FIG. 52 shows key operations performed by the user when viewing a drama series.

FIG. 52 shows a specific example of this selection operation. In the drawing, the selection menu has Buttons corresponding to the first to fourth episodes. When the selection of one Button is confirmed, a chapter menu for an episode corresponding to that Button is displayed. After the display of the chapter menu, the selection menu is displayed again. On this selection menu, the user needs to perform a key operation to select the next episode. In detail, when a chapter menu of the first episode is displayed (hw1) and then the selection menu is displayed again (hw2), the user needs to perform a key operation (ks1) to select the second episode.

Also, when a chapter menu of the second episode is displayed (hw3) and then the selection menu is displayed again (hw4), the user needs to perform a key operation (ks2) to select the third episode.

Figure 53:
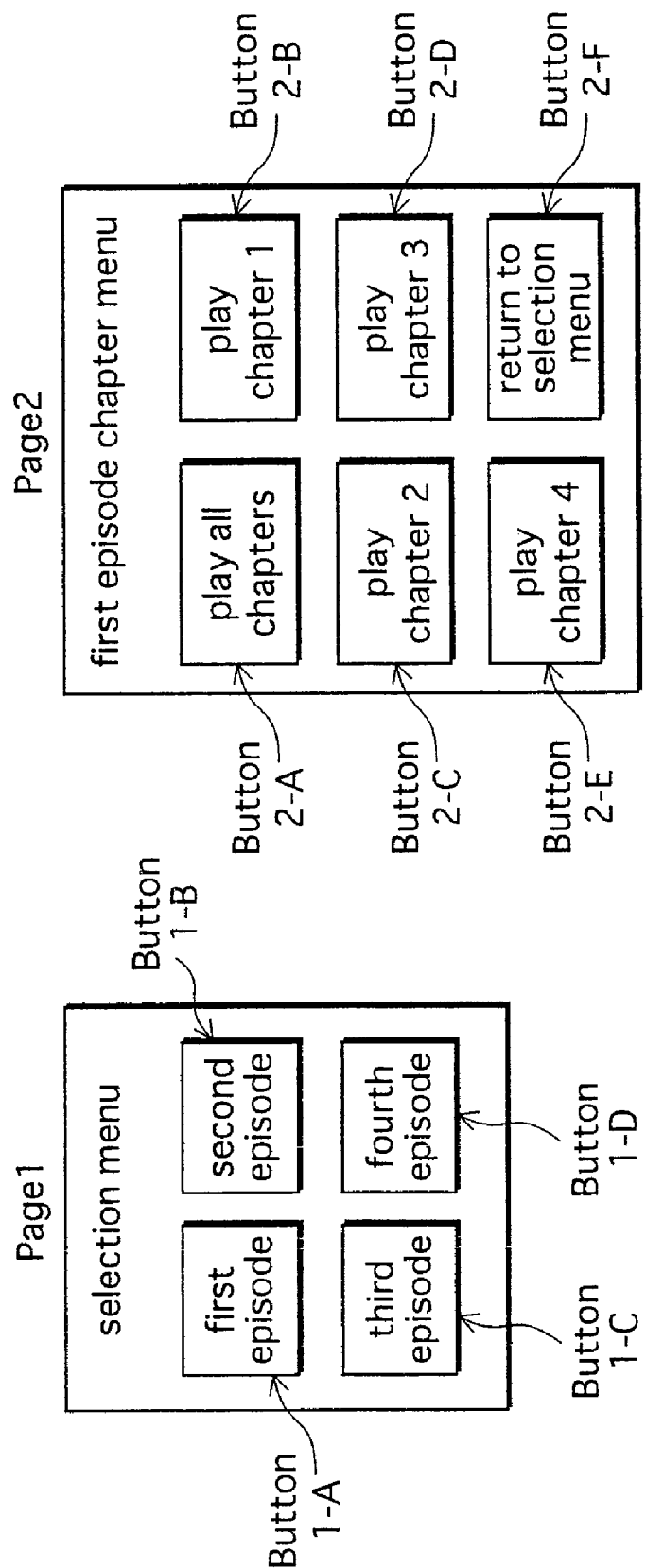
FIG. 53 shows how Pages 1 to 4 shown in FIG. 52 are assigned to a selection menu and a chapter menu.

A focus shift alleviates such a trouble of having to perform key operations. The following describes a procedure of performing a focus shift. FIG. 53 shows how Pages 1 to 4 shown in FIG. 52 are assigned to the selection menu and the chapter menus. Here, Page 1 is assigned to the selection menu, Page 2 is assigned to the chapter menu of the first episode, Page 3 is assigned to the chapter menu of the second episode, and Page 4 is assigned to the chapter menu of the third episode.

Also, Buttons 1-A to 1-D on Page 1 are assigned respectively to selection Buttons for the first to fourth episodes in the selection menu, and Buttons 2-A to 2-F on Page 2 are assigned respectively to selection Buttons for chapters 1 to 5 and a return Button in the chapter menu of the first episode. The return Button referred to here is a Button for accepting a user operation of displaying the selection menu again.

Figure 54:
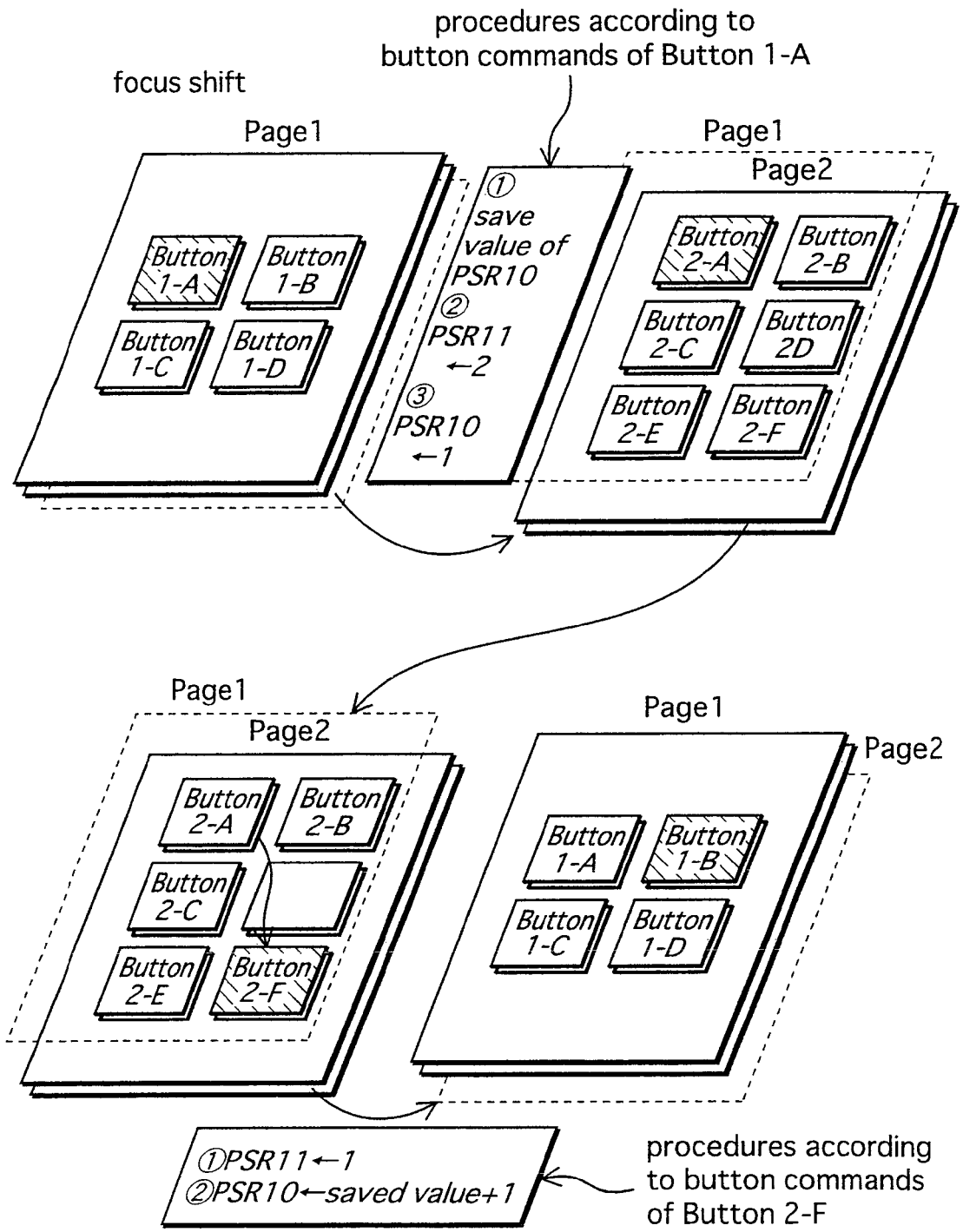
FIG. 54 shows procedures defined by button commands to achieve focus shifts.

This being the case, button commands of Button 1-A on Page 1 and button commands of Button 2-F on Page 2 define procedures such as those shown in FIG. 54. Procedures defined by the button commands of Button 1-A are the following. When the selection of Button 1-A is confirmed, (1) the value of PSR10 is saved to a GPR, (2) PSR11 is set to 2, and (3) PSR10 is set to 1.

By setting the PSRs in this way, the chapter menu of the first episode is displayed with Button 2-A being in the selected state.

Meanwhile, procedures defined by the button commands of Button 2-F are the following. When the selection of Button 2-F is confirmed, (1) PSR11 is set to 1, and (2) PSR10 is set to a sum of 1 and the value saved to the GPR.

Figure 55:
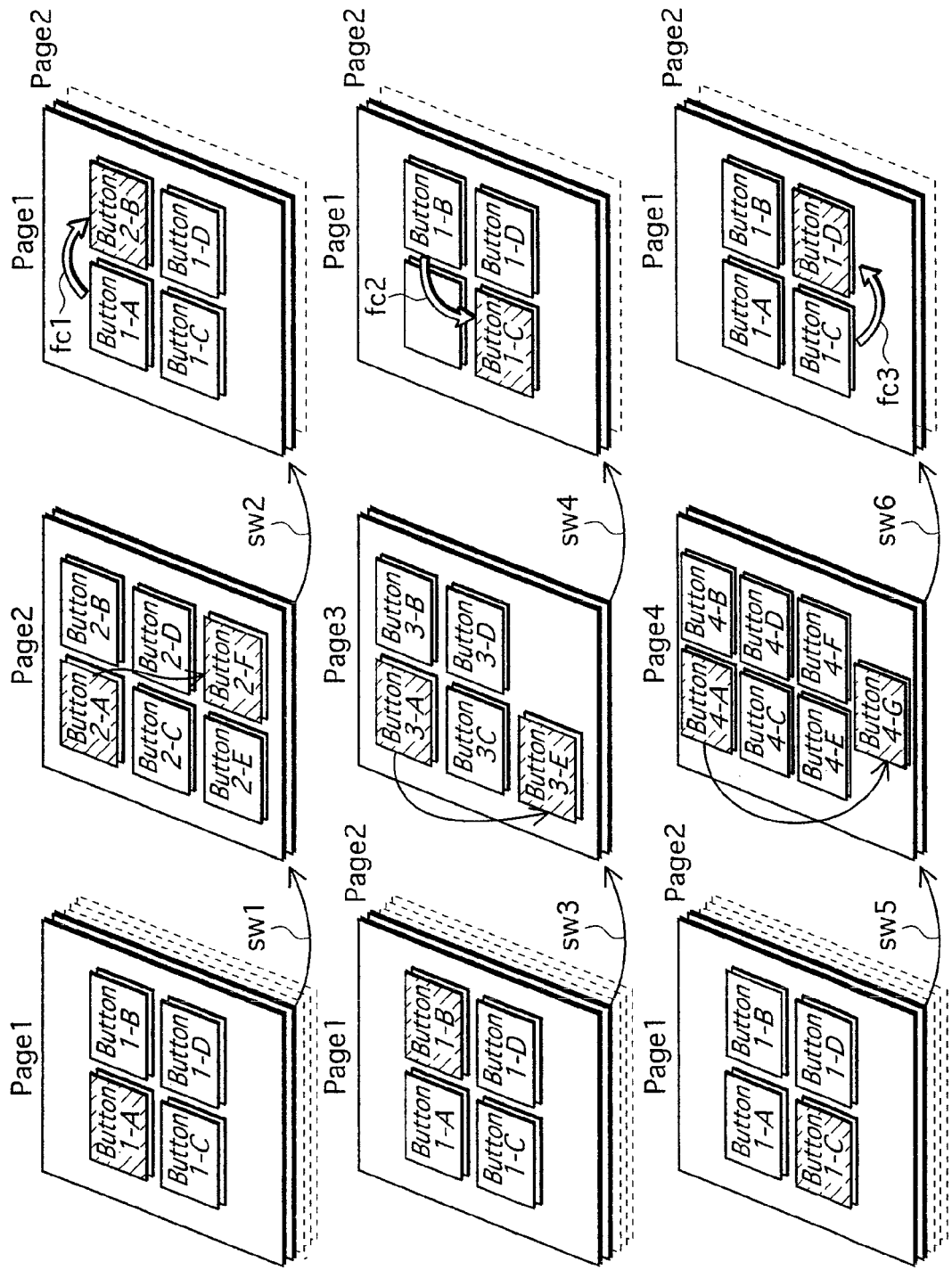
FIG. 55 shows focus shifts performed according to focus positions on previous Pages.

According to these procedures defined by the button commands of Button 1-A on Page 1 and Button 2-F on Page 2, when the display of the chapter menu of the first episode ends and the selection menu is displayed again, the focus is automatically shifted from the Button for the first episode to the Button for the second episode on the selection menu. By defining button commands of Buttons 1-B to 1-D on Page 1 and the Buttons of the other Pages in a similar way, focus shifts such as those shown in FIG. 55 can be realized.

With the aid of such focus shifts, the user can easily search the drama series made up of a number of sets of content, for a chapter which he or she wants to view.

To realize the above focus shifts, it is necessary to define button commands for each individual Button. This being so, if there are many Pages and Buttons, a bug may occur. This raises the need for conducting a test to find bugs.

Figure 56:
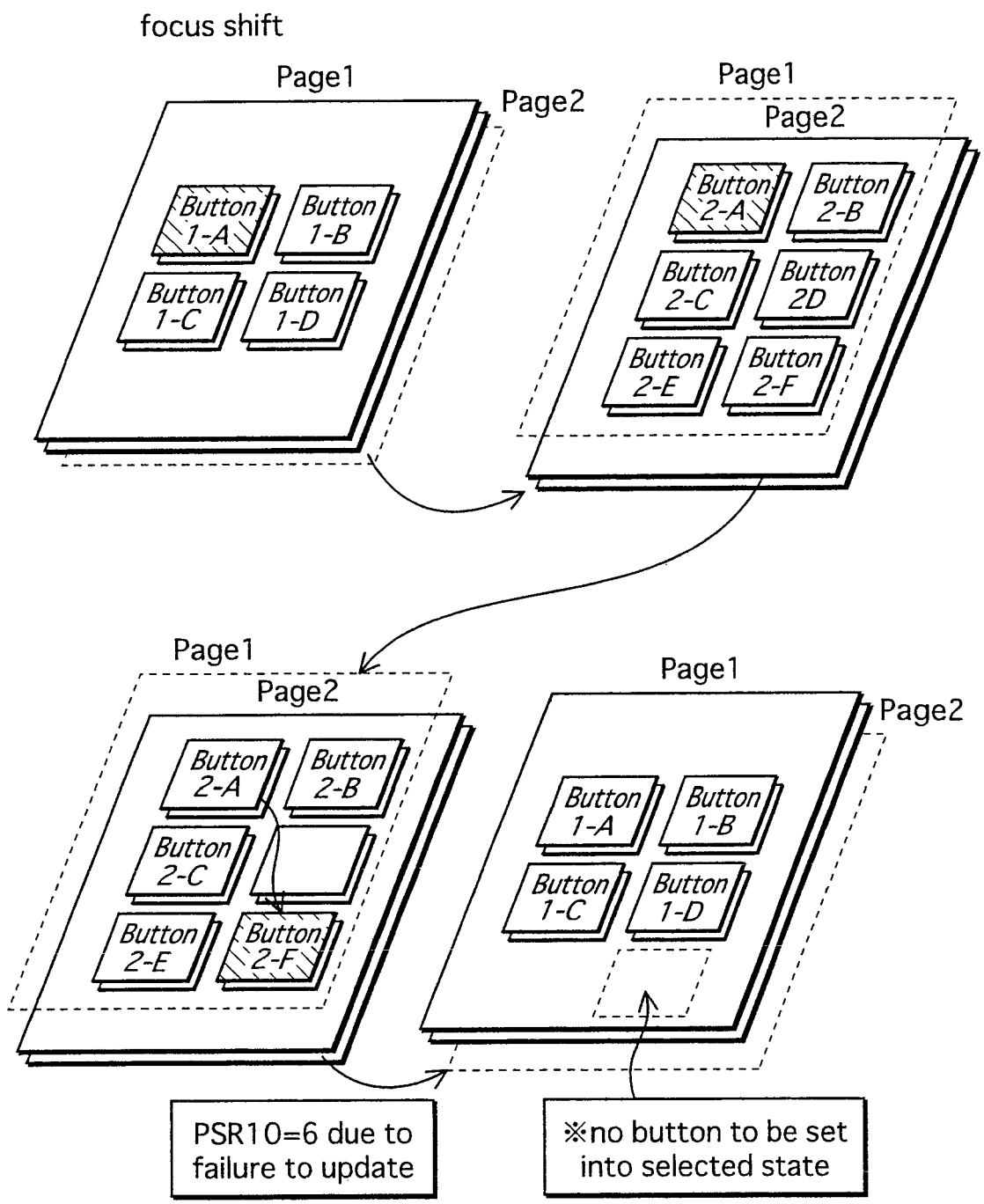
FIG. 56 shows bugs that can occur in focus shifts.

Bugs likely to occur in focus shifts are as follows. When displaying Page 1, if the above procedures are performed while Button 1-D is in the selected state, a button number (=5) obtained by adding 1 to a button number of Button 1-D is written to PSR10 upon switching from Page 1, Page 2, and back to Page 1. Since Page 1 does not have a fifth Button, the focus will end up being shifted to a nonexistent Button on Page 1. Also, there may be a case where after the sixth Button (Button 1-F) on Page 2 is set in the selected state, Page 1 is displayed again without updating PSR10, as shown in FIG. 56. In this case too, the focus will end up being shifted to a nonexistent Button on Page 1. Thus, when the number of Buttons on each Page is different, a bug of putting a nonexistent Button on a switch destination Page into the selected state can occur frequently. Such defects need be corrected upon shipment of content. Accordingly, the author must perform a debug test to ensure normal operations, as in the case of shipment of programs. However, the imperative for the author to perform such a debug test as being conducted by a software house may adversely affect the content production that is the core business of the author.

In view of this, the third embodiment of the present invention applies status transitions through "Procedure when playback condition is changed" and "Procedure when change is requested", to PSR10 and PSR11 in the same way as PSR1, PSR2, and PSR3.

<Status Transitions of PSR11>

Figure 57A:
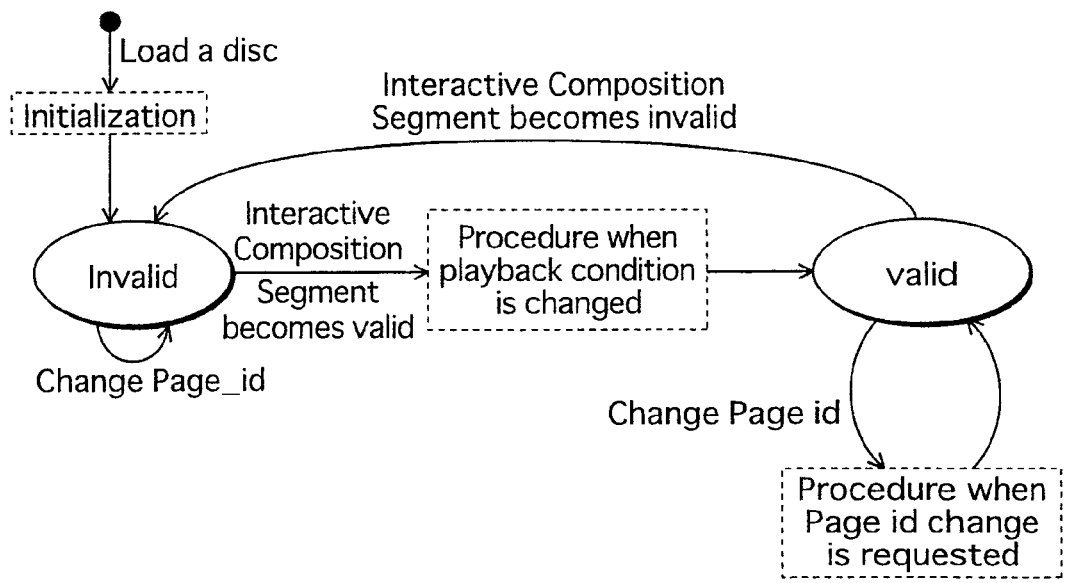
FIG. 57A shows status transitions that can be made by PSR11.

PSR11 specifies a Page which is currently displayed among a plurality of Pages included in the IG stream (current Page). PSR11 takes one of the values 00 to FF, and the playback apparatus displays the Page specified by PSR11. FIG. 57A shows status transitions that can be made by PSR11. When comparing this drawing with FIG. 15A, it can be seen that there is no status transition triggered by the "Cross a PlayItem boundary" event. Also, an event that triggers a status transition from Invalid to Valid has been changed from "Start PlayList playback" to "Interactive Composition Segment becomes Valid", and an event that triggers a status transition from Valid to Invalid has been changed from "Terminate PlayList playback" to "Interactive Composition Segment becomes Invalid". Also, "Procedure when change is requested" has been changed from "stream change is requested" to "page change is requested. Apart from these differences, FIG. 57A is same as FIG. 15A.

"Interactive Composition Segment becomes Invalid" includes an event that the current playback time has reached a point specified by the composition_time_out_pts in an ICS, an event that an ICS has changed, and an event that PlayList playback ends. The number of audio streams differs for each PlayItem. Accordingly, when PlayList playback starts and each time a PlayItem boundary is crossed, "Procedure when playback condition is changed" needs to be performed to set PSR1. However, PSR11 is used only in a playback section where an ICS is multiplexed, and so there is no need to perform "Procedure when playback condition is changed" each time a PlayItem boundary is crossed. Therefore, a status transition from Invalid to Valid of PSR11 is triggered by an event that an ICS becomes Valid.

Figure 57B:
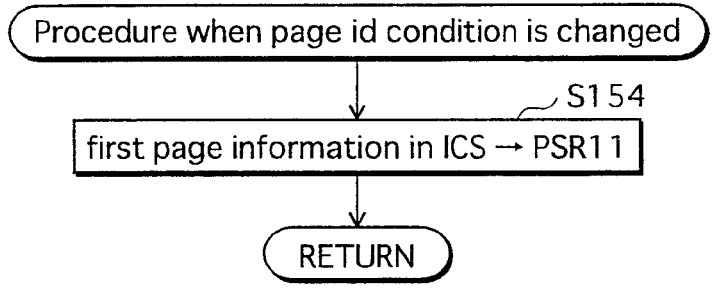
FIG. 57B is a flowchart of "Procedure when playback condition is changed" for PSR11.

"Procedure when playback condition is changed" for PSR11 is explained below. FIG. 57B is a flowchart of "Procedure when playback condition is changed" for PSR11. In "Procedure when playback condition is changed", first page information in the ICS is set in PSR11 (S154).

Figure 57C:
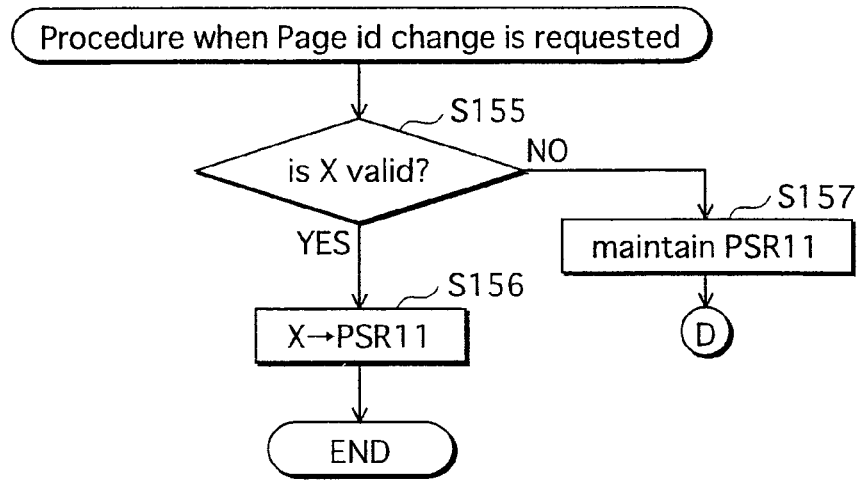
FIG. 57C is a flowchart of "Procedure when change is requested" for PSR11.

FIG. 57C is a flowchart of "Procedure when change is requested" for PSR11. A judgment is made as to whether X is Valid (S155). If X is Valid, X is assigned to PSR11 (S156). If X is Invalid, the value of PSR11 is maintained (S157). This concludes the description of PSR11.

<Status Transitions of PSR10>

Figure 58A:
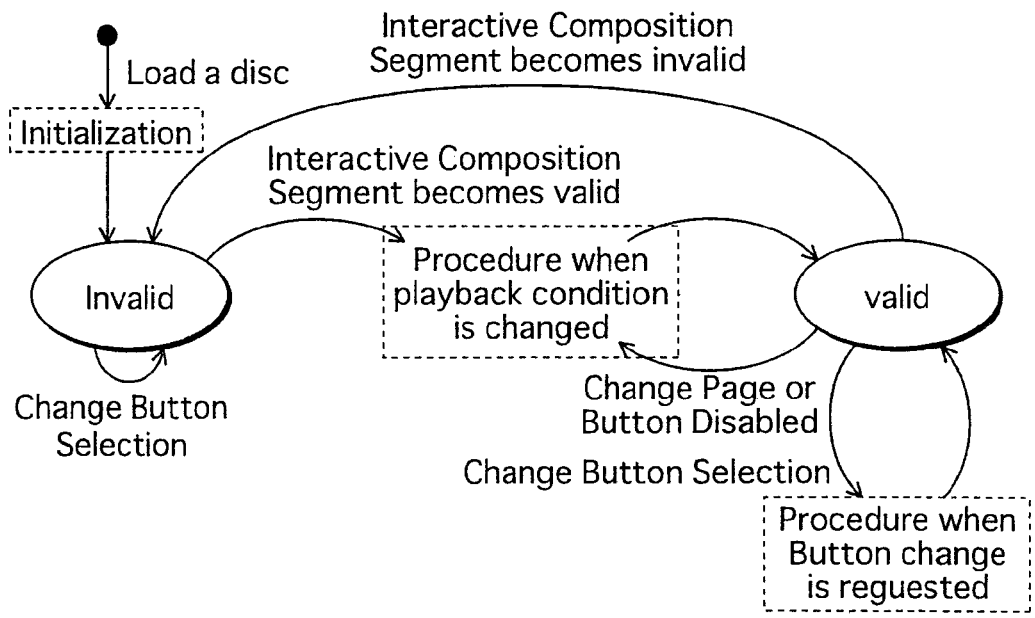
FIG. 58A shows status transitions that can be made by PSR10.

The following describes status transitions of PSR10. FIG. 58A shows status transitions that can be made by PSR10. This drawing is same as FIG. 57A, except that a status transition triggered by an event "Change Page" or "Button Disabled" has been added. Also, "Procedure when change is requested" has been changed from "page change is requested" to "button change is requested".

"Change Page" is an event that Page switching is requested. "Button Disabled" is an event that a Button displayed on a Page is disabled. Upon the occurrence of such an event, "Procedure when playback condition is changed" is performed to set PSR10, and then PSR10 returns to Valid.

"Procedure when playback condition is changed" and "Procedure when change is requested" for PSR10 are described below.

Figure 58B:
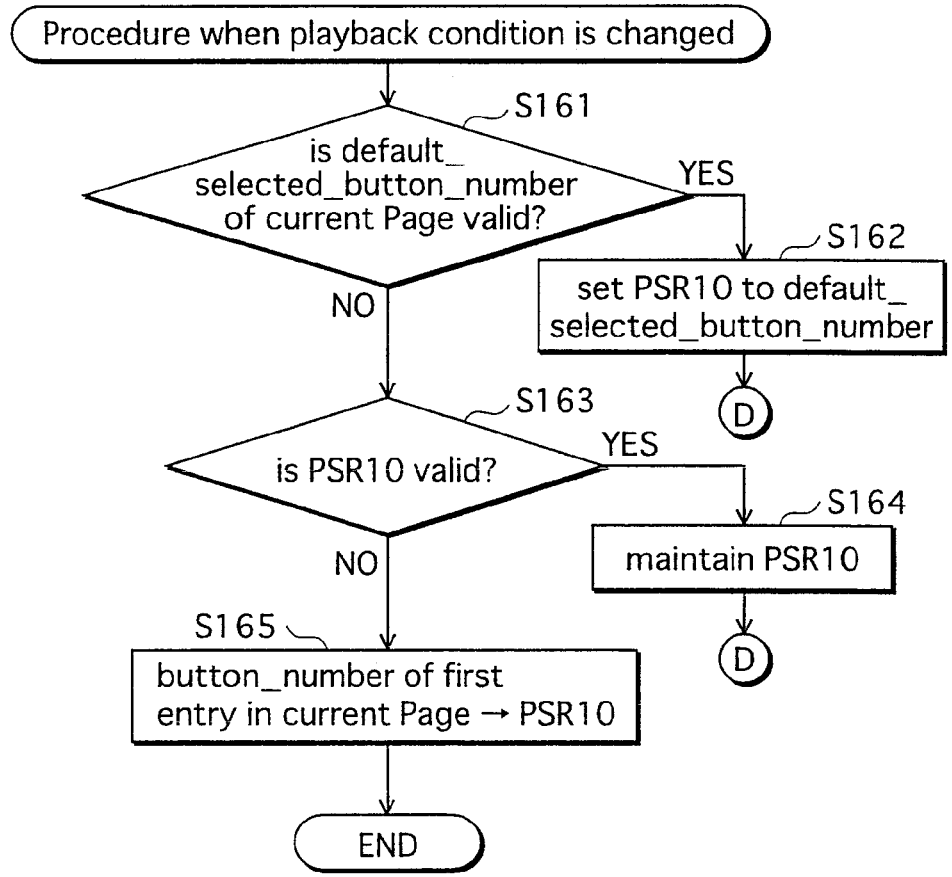
FIG. 58B is a flowchart of "Procedure when playback condition is changed" for PSR10.

FIG. 58B is a flowchart of "Procedure when playback condition is changed" for PSR10.

A judgment is made as to whether the default_selected_button_id_ref in the current Page is Valid (S161). If the judgment in step S161 is YES, PSR10 is set to the default_selected_button_id_ref (S162).

If the judgment in step S161 is NO, a judgment is made as to whether PSR10 is Valid (S163). If PSR10 is Valid, the value of PSR10 is maintained (S164). If PSR10 is Invalid, PSR10 is set to a button number of the first button_info structure in the current Page (S165).

Figure 59:
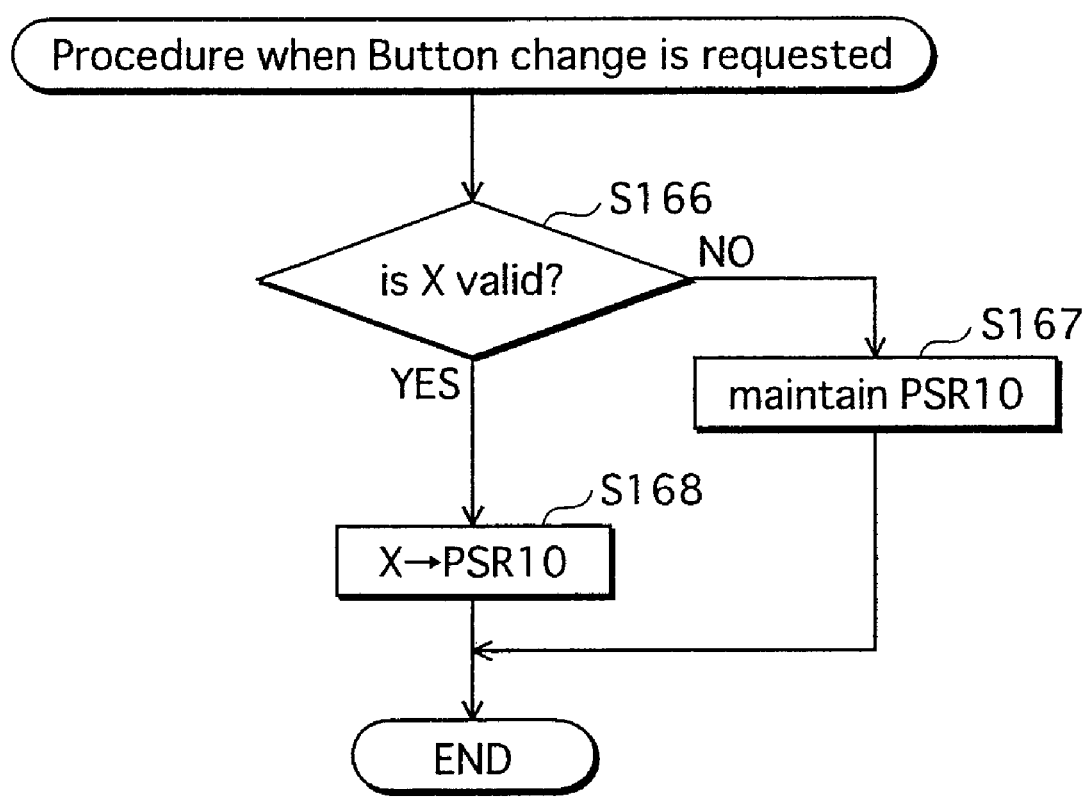
FIG. 59 is a flowchart of "Procedure when change is requested" for PSR10.

FIG. 59 is a flowchart of "Procedure when change is requested" for PSR10. First, a judgment is made as to whether X is Valid (S166). If X is Valid, PSR10 is set to X (S168). If X is Invalid, the value of PSR10 is maintained (S167).

According to the above procedures, when PSR10 is Invalid, PSR10 is set so that the Button specified by the first button_info structure of the current Page is set in the selected state. Accordingly, even if the author designates a button number of a Button which does not exist in a switch destination Page, a process of changing the wrong button number to a correct button number is automatically performed. Thus, even if a button command for realizing a focus shift has a defect, such a defect can be automatically corrected. This reduces the burden on the author.

Modifications

Though the present invention has been described by way of the above embodiments, the present invention is not limited to such. The present invention can be realized with any of modifications (A) to (M) given below. The invention of each of the claims of this application includes extension and generalization of the above embodiments and their modifications below. The degree of extension and generalization depends upon the state of the art in the technical field of the present invention at the time of filing of this application.

(A) The above embodiments describe the case where the BD-ROM is used as the recording medium according to the present invention. Main features of the present invention, however, lie in a graphics stream recorded on the recording medium, which does not rely on physical characteristics of BD-ROMs. Therefore, the present invention is applicable to any recording medium that is capable of recording a graphics stream. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive, and a nonremovable hard disk drive.

(B) The above embodiments describe the case where the playback apparatus decodes an AV Clip on the BD-ROM and outputs the decoded AV Clip to the television. As an alternative, the playback apparatus may be equipped with only a BD-ROM drive, with the remaining construction elements being provided in the television. In this case, the playback apparatus and the television can be incorporated in a home network connected with an IEEE 1394 connector. The above embodiments describe the case where the playback apparatus is connected to the television, but the playback apparatus may instead be integrated with a display device. Also, the playback apparatus may include only the system LSI (integrated circuit) which constitutes an essential part of processing. The playback apparatus and the integrated circuit are both an invention described in this specification.

Accordingly, regardless of whether the playback apparatus or the integrated circuit is concerned, an act of manufacturing a playback apparatus based on the internal construction of the playback apparatus described in the first embodiment is an act of working of the present invention. Also, any act of assigning with charge (i.e. for sale) or without charge (i.e. as a gift), leasing, and importing the playback apparatus is an act of working of the present invention. Likewise, an act of offering for assignment or lease of the playback apparatus using storefront displays, catalogs, or brochures is an act of working of the present invention.

(C) Information processing using the programs shown in the flowcharts is actually realized using hardware resources. Accordingly, the programs which describe the operational procedures shown in the flowcharts are themselves an invention. The above embodiments describe the case where the programs are incorporated in the playback apparatus, but the programs can be used independently of the playback apparatus. Acts of working of the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) The time elements of the steps which are executed in a time series in each of the flowcharts can be regarded as the necessary elements of the present invention. This being so, a playback method shown by these flowcharts is an invention. If the processing shown in each flowchart is carried out by performing the steps in a time series so as to achieve the intended aim and the intended effect, this is an act of working of the recording method of the present invention.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EX TS packets") are grouped in units of 32 packets, and each group is written to three sectors. One group made up of 32 EX TS packets has 6,144 bytes (=32H 192), which is equivalent to a size of three sectors that is 6144 bytes (=2048H 3). The 32 EX TS packets contained in the three sectors are called an Aligned Unit.

In a home network connected with an IEEE 1394 connector, the playback apparatus transmits an Aligned Unit in the following manner. The playback apparatus removes a TP_extra_header from each of the 32 EX TS packets in the Aligned Unit, encrypts the body of each TS packet according to the DTCP Specification, and outputs the encrypted TS packets. When outputting the TS packets, the playback apparatus inserts an isochronous packet between adjacent TS packets. A position where the isochronous packet is inserted is based on a time shown by an arrival_time_stamp of the TP_extra_header. The playback apparatus outputs a DTCP_descriptor, as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected with the IEEE 1394 connector, the TS packets from being recorded to other devices.

(F) The above embodiments describe the case where an AV Clip of the Blu-ray Disc Read-Only Format is used as a digital stream, but the present invention can also be realized with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, an MP3 audio stream, or an MPEG-AAC audio stream.

(G) The movie content described in the above embodiments may be obtained by encoding an analog image signal broadcast by analog broadcasting. Also, the movie content may be stream data made up of a transport stream broadcast by digital broadcasting.

Alternatively, an analog/digital image signal recorded on a videotape may be encoded to obtain content. Also, an analog/digital image signal directly captured by a video camera may be encoded to obtain content. A digital work distributed by a distribution server is applicable too.

(H) Graphics Objects described in the above embodiments is run-length encoded raster data. Run-length encoding is used for compression/encoding of graphics Objects, because the run-length encoding is most suitable for compression and decompression of subtitles. Subtitles have a property in that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. For the purpose of providing a decoding construction common to subtitles and Buttons, the compression and decompression method used for subtitles is also employed for Buttons. Nevertheless, the use of run-length encoding for graphics Objects is not a limitation of the present invention. For example, graphics Objects may be PNG data. Also, graphics Objects may be vector data instead of raster data. Further, graphics Objects may be transparent patterns.

(I) Subtitle graphics selected according to a display setting of the playback apparatus may be subjected to display effects of PCSs. For example, graphics of various display modes such as wide screen, pan and scan, and letterbox are recorded on the BD-ROM, and the playback apparatus selects one of these display modes according to a display setting of the television connected with the playback apparatus and displays corresponding graphics. Since the display effects of PCSs are applied to such subtitle graphics, viewability increases. As a result, display effects achieved by using characters which are contained within the body of video can be realized with subtitle graphics displayed according to the display setting. This contributes to high practicality.

(J) The above embodiments describe the case where the playback apparatus includes a Graphics Plane. Alternatively, the playback apparatus may include a line buffer for storing uncompressed pixels of one line. Since conversion to an image signal is performed for each horizontal row (line), conversion to an image signal can equally be performed with the line buffer.

(K) The third embodiment describes the case where button commands for setting PSR10 and PSR11 are written in an ICS, but button commands for setting PSR1, PSR2, and PSR3 may be written in the ICS too. For example, if PSR2 specifies English subtitles, button commands for selecting Japanese subtitles may be provided.

(L) A default Button may be provided on each of an audio selection menu and a subtitle selection menu used for receiving an audio stream selection and a subtitle stream selection. Button information corresponding to such a default Button has button commands for setting PSR1 or PSR2 to an undefined value. If the default Button is activated and these button commands are executed, PSR1 or PSR2 is set to the undefined value, and "Procedure when playback condition is changed" is performed to select an optimal audio stream or PG_textST_stream.

(M) The first embodiment describes the case where the three conditions (a) to (c) are used, but the number of conditions may be four or more.

Industrial Applicability

The above embodiments disclose the internal construction of the playback apparatus to which the present invention relates, and the playback apparatus can be manufactured in volume based on the disclosed internal construction. In other words, the playback apparatus are capable of being industrially used. Hence the playback apparatus has industrial applicability.

NUMERICAL REFERENCES

1 . . . BD drive
2 . . . Read Buffer
3 . . . Demultiplexer
4 . . . Video Decoder
5 . . . Video Plane
9 . . . Presentation Graphics Decoder
10 . . . Presentation Graphics Plane
11 . . . adder
12 . . . Font Generator
13 . . . Interactive Graphics Decoder
14 . . . switch
15 . . . Interactive Graphics Plane
16 . . . adder
17 . . . Controller
18 . . . Read Buffer
19 . . . Demultiplexer
20 . . . Audio Decoder
21 . . . switch
22 . . . switch
23 . . . scenario memory
24 . . . control unit
25 . . . switch
26 . . . CLUT unit
27 . . . CLUT unit
28 . . . PSR set
29 . . . operation reception unit
30 . . . transition control unit
200 . . . playback apparatus
300 . . . television
400 . . . remote control

The invention claimed is:

1. A playback apparatus for playing back a graphics stream and a video stream, wherein
the graphics stream includes one or more interactive control segments and one or more graphics data pieces,
each interactive control segment includes page information and time-out information,
each page information includes one or more button information pieces,
each button information piece realizes an interactive screen structure by displaying each graphics data piece as a state of a corresponding graphics button material,
the time-out information indicates a time on a playback time axis of the video stream at which the interactive screen structure is ended,
the playback apparatus comprises:
a plane memory storing therein graphics to be played back;
a decoding unit (i) obtaining a page including a plurality of graphics button materials by decoding the graphics stream, and (ii) writing the obtained page to the plane memory;
a page number register storing therein a page number of a current page; and
a button number register storing therein a button number of a current button, which is one of the button materials in a selected state on the current page,
when a selection of one of the button materials on the current page is confirmed, the decoding unit executes a set command that sets a new button number in the button number register,
the button number stored in the button number register becomes invalid when a current playback time has reached the time indicated by the time-out information, and
the invalidation of the button number is performed by the decoding unit deleting the written page from the plane memory.

2. A program stored on a non-transitory computer readable medium, the program causing a computer to perform processing of playing back a graphics stream and a video stream, wherein
the graphics stream includes one or more interactive control segments and one or more graphics data pieces,
each interactive control segment includes page information and time-out information,
each page information includes one or more button information pieces,
each button information piece realizes an interactive screen structure by displaying each graphics data piece as a state of a corresponding graphics button material,
the time-out information indicates a time on a playback time axis of the video stream at which the interactive screen structure is ended,
the computer comprises:
a plane memory storing therein graphics to be played back;
a page number register storing therein a page number of a current page; and
a button number register storing therein a button number of a current button, which is one of the button materials in a selected state on the current page,
the program causes the computer to execute a decoding step of (i) obtaining a page including a plurality of graphics button materials by decoding the graphics stream, and (ii) writing the obtained page to the plane memory,
when a selection of one of the button materials on the current page is confirmed, the program further causes the computer to execute a set command, which sets a new button number in the button number register, in the decoding step,
the button number stored in the button number register becomes invalid when a current playback time has reached the time indicated by the time-out information, and
the invalidation of the button number is performed by the decoding unit deleting the written page from the plane memory.

3. A method used on a computer for playing back a graphics stream and a video stream, wherein
the graphics stream includes one or more interactive control segments and one or more graphics data pieces,
each interactive control segment includes page information and time-out information,
each page information includes one or more button information pieces,
each button information piece realizes an interactive screen structure by displaying each graphics data piece as a state of a corresponding graphics button material,
the time-out information indicates a time on a playback time axis of the video stream at which the interactive screen structure is ended, the computer comprises:

a plane memory storing therein graphics to be played back;

a page number register storing therein a page number of a current page; and a button number register storing therein a button number of a current button, which is one of the button materials in a selected state on the current page, the method comprises a decoding step of, on the computer, (i) obtaining a page including a plurality of graphics button materials by decoding the graphics stream and (ii) writing the obtained page to the plane memory, when a selection of one of the button materials on the current page is confirmed, a set command is further executed in the decoding step, the set command setting a new button number in the button number register, the button number stored in the button number register becomes invalid when a current playback time has reached the time indicated by the time-out information, and the invalidation of the button number is performed by the decoding unit deleting the written page from the plane memory.

* * * * *